United States Patent
Fujii

(10) Patent No.: US 7,260,246 B2
(45) Date of Patent: Aug. 21, 2007

(54) PATTERN-CENTER DETERMINATION APPARATUS AND METHOD AS WELL AS MEDIUM ON WHICH PATTERN-CENTER DETERMINATION PROGRAM IS RECORDED, AND PATTERN-ORIENTATION DETERMINATION APPARATUS AND METHOD AS WELL AS MEDIUM ON WHICH PATTERN-ORIENTATION DETERMINATION PROGRAM IS RECORDED, AS WELL AS PATTERN ALIGNMENT APPARATUS AND PATTERN VERIFICATION APPARATUS

(75) Inventor: Yusaku Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 629 days.

(21) Appl. No.: 09/816,232

(22) Filed: Mar. 26, 2001

(65) Prior Publication Data

US 2002/0061125 A1    May 23, 2002

(30) Foreign Application Priority Data

Sep. 29, 2000   (JP) ............................. 2000-301129

(51) Int. Cl.
G06K 9/00 (2006.01)
G06K 9/74 (2006.01)

(52) U.S. Cl. .................. 382/124; 356/71; 340/5.83; 902/3

(58) Field of Classification Search ................ 382/115, 382/124–127, 209, 218, 294
See application file for complete search history.

(56) References Cited

U.S. PATENT DOCUMENTS 3,560,928 A * 2/1971 Berger et al. ............... 382/124
5,040,224 A * 8/1991 Hara ........................... 382/124
5,140,642 A * 8/1992 Hsu et al. .................... 382/124
5,337,369 A * 8/1994 Shibuya ...................... 382/125
5,555,314 A * 9/1996 Nakajima .................... 382/124
5,848,176 A * 12/1998 Hara et al. ................... 382/124
6,241,288 B1 * 6/2001 Bergenek et al. ............. 283/67
6,282,302 B1 * 8/2001 Hara ........................... 382/116

FOREIGN PATENT DOCUMENTS

JP    52-82165    7/1977
JP    52-82166    7/1977

(Continued)

Primary Examiner—Bhavesh M Mehta
Assistant Examiner—Charles Kim
(74) Attorney, Agent, or Firm—Staas & Halsey LLP

(57) ABSTRACT

The invention provides an apparatus for determining a reference orientation (pattern orientation) to a fingerprint-like pattern, formed with a number of curves, accurately in a short time. The apparatus includes a pattern-center determination section for determining a reference center to the pattern, a reference-circle generation section for generating a reference circle centered at the pattern center, a reference-circle-intersecting-point calculation section for calculating intersecting points of the reference circle and the curves of the pattern, a reference-point determination section for determining a reference point for the pattern orientation based on a relationship between directions of the reference circle and directions of the pattern curves at the intersecting points, and a pattern-orientation determination section for determining the pattern orientation based on the pattern center and the reference point. The apparatus can be applied to a system which performs personal authentication using biometric information, such as a fingerprint, or a like system.

66 Claims, 48 Drawing Sheets

FOREIGN PATENT DOCUMENTS

| | | |
|---|---|---|
| JP | 52-85841 | 7/1977 |
| JP | 60-134386 | 7/1985 |
| JP | 2-178781 | 7/1990 |
| JP | 3-260778 | 11/1991 |
| JP | 4-43469 | 2/1992 |
| JP | 4-357570 | 12/1992 |
| JP | 5-108806 | 4/1993 |
| JP | 2551191 | 8/1996 |
| JP | 9-114978 | 5/1997 |
| JP | 10-124667 | 5/1998 |
| JP | 2949787 | 7/1999 |

* cited by examiner

● : MINUTIAE OF FINGERPRINT A

○ : MINUTIAE OF FINGERPRINT B

: THRESHOLD AREA FOR COINCIDENCE OF MINUTIAE

C8, C9: PERMISSIBLE ROTATION ANGLE RANGES
CORRSPONDING TO COINCIDING MINUTIA
PAIRS (A8, B8), (A9, B9) IN COLLATION,
RESPECTIVELY

■ □ : PERIPHERAL MINUTIAE

■ : CENTER "O" OF FINGERPRINT

FIG. 39

| DIRECTION 0 | DIRECTION 1 | DIRECTION 2 | DIRECTION 3 | DIRECTION 4 | DIRECTION 5 | DIRECTION 6 | DIRECTION 7 |
|---|---|---|---|---|---|---|---|
| — | ╱ | ╱ | ╱ | │ | ╲ | ╲ | ╲ |

PATTERN-CENTER DETERMINATION APPARATUS AND METHOD AS WELL AS MEDIUM ON WHICH PATTERN-CENTER DETERMINATION PROGRAM IS RECORDED, AND PATTERN-ORIENTATION DETERMINATION APPARATUS AND METHOD AS WELL AS MEDIUM ON WHICH PATTERN-ORIENTATION DETERMINATION PROGRAM IS RECORDED, AS WELL AS PATTERN ALIGNMENT APPARATUS AND PATTERN VERIFICATION APPARATUS

BACKGROUND OF THE INVENTION

1) Field of the Invention

This invention relates generally to a system which performs personal authentication using biometric information such as a fingerprint or a like system, and particularly to a pattern-center determination apparatus and method for determining a reference center (hereinafter referred to as a pattern center) of a fingerprint-like pattern as well as a medium on which a pattern-center determination program is recorded, and a pattern-orientation determination apparatus and method for determining a reference orientation (hereinafter referred to as a pattern orientation) of a fingerprint-like pattern as well as a medium on which a pattern-orientation determination program is recorded, as well as a pattern alignment apparatus for aligning two fingerprint-like patterns and a pattern verification apparatus for verifying a group of object minutiae extracted from an object fingerprint-like pattern for verification with a group of registered minutiae extracted in advance from a registered fingerprint-like pattern, for use with a system of the type mentioned.

2) Description of the Related Art

In recent years, as extensive introduction of the computer into the social system proceeds, the concern is concentrated upon the security. Conventionally, an ID card or a password is used as means for identifying the person itself to allow entry into a computer room or utilization of a terminal. However, such identification means still have many subjects to be solved in terms of the security.

Attention is paid to a personal identification technique which makes use of biometric information as means for identifying the person itself which is higher in reliability than the password. Identification of the person itself using biometric information unique to the person provides very high reliability.

One of several kinds of biometric information which can be utilized for identification of the person itself is a fingerprint. The fingerprint has the two significant characteristics that "it is different among different people" and that "it does not change till the end of the person's life" and is considered powerful measures for identification of the person itself. In recent years, much effort has been directed to investigations and developments on personal authentication which uses a fingerprint.

A fingerprint is a fine convex and concave geometry at a fingertip of a human being. A connection of convex portions is called ridge or ridgeline. Such ridges form various patterns unique to individual persons. If a ridge is traced, then a point (bifurcation) at which it is bifurcated or another point (end point) beyond which it does not extend any more is reached. The distribution of such bifurcations or end points is quite different among different people, and therefore, such bifurcations and/or end points are called minutiae of a fingerprint. Verification of the distribution of such minutiae is used as effective means for specifying an individual person. Upon fingerprint verification, attributes of minutiae such as positions, types and orientations of minutiae are compared between the fingerprints to detect whether or not the attributes coincide with each other thereby to discriminate whether or not the two fingerprints are the same as each other.

A system which performs personal authentication using a fingerprint has fingerprint data of individual persons registered in advance therein. In particular, a user (individual person) of the system inputs its raw fingerprint information such as a fingerprint image by means of a predetermined apparatus, and fingerprint data such as minutia data are extracted from the raw fingerprint data by and registered into the system. Then, when a fingerprint image is inputted from a fingerprint sensor for the object of verification, the system extracts minutia data as fingerprint data from the inputted fingerprint image and verifies the fingerprint data with the fingerprint data registered in advance therein as described above.

Generally, a fingerprint pattern is picked up in the form of a fingerprint image using various fingerprint sensors such as a CCD camera which picks up an image obtained with a finger contacted with a special optical system or an electric capacity sensor which detects only convex portions of the skin. However, even if two or more fingerprint images are picked up from the same finger, the fingerprint patterns of the fingerprint images exhibit different positions or orientations (directions) depending upon the place or the angle at or in which the finger is placed when the finger is positioned with respect to the fingerprint sensor. Therefore, same fingerprint images are seldom obtained. In other words, each time a fingerprint image is picked up, the position and the orientation of the fingerprint pattern of the fingerprint image differ in accordance with the positional relationship and the orientational (directional) relationship of the finger with respect to the fingerprint sensor when the fingerprint image is picked up.

Accordingly, in order for a system, which performs personal authentication using a fingerprint, to compare attributes of a group of minutiae extracted from a registered fingerprint with attributes of a group of minutiae extracted from an input fingerprint, alignment of the fingerprint patterns of the two fingerprint images must be performed first. In particular, the positional relationship and the orientational relationship between the two fingerprints are detected, and at least one of the fingerprint images is shifted based on the relationships to make the two fingerprint images overlap appropriately with each other. Thereafter, attributes of the two groups of minutiae of the two fingerprint images are compared with each other.

Conventionally, several methods have been proposed for aligning two fingerprint images to make them overlap appropriately with each other. Of the methods, a method is popularly used wherein an amount of parallel shift and an amount of rotation shift to be applied to one of two fingerprints are calculated based on the positional relationship and the orientational relationship between the two fingerprints.

According to an available method for calculation of the amount of parallel shift, a group of minutiae of the fingerprint pattern are extracted from each of two fingerprint images in advance, and one of the fingerprint images is successively shifted by a small distance parallelly in various orientations and overlapped with the other fingerprint image while the two groups of minutiae of the two fingerprint images are collated for each distance and for each orientation of the shift to detect and adopt the distance and orientation of shift which exhibit the best collation result as the parallel shift. According to another available method for calculation of the amount of parallel shift, a reference center (hereinafter referred to as pattern center) of the fingerprint pattern of each of two fingerprint images is determined using a method which is hereinafter described, and the positions of the pattern centers of the fingerprint patterns are compared with each other to calculate the parallel shift.

Meanwhile, according to a method for calculation of the rotation shift, a group of minutiae of the fingerprint pattern are extracted from each of two fingerprint images in advance, and the two fingerprint images are overlapped with each other based on a parallel shift determined in advance. And one fingerprint image is successively rotated by a small angle with respect to the other fingerprint image around a center of rotation, which is generally the pattern center determined using a method hereinafter described, and at each rotation angle, the two groups of minutiae are collated between the two fingerprint images. Then, the rotation angle at which the best collation result is obtained is adopted as the rotation angle amount.

By the way, it is a popular technique to use the pattern center as a reference for aligning of fingerprint images as described above. In order to perform such alignment, the pattern center is determined advance as a common reference for the position of each of a plurality of fingerprint patterns for a plurality of fingerprint images.

In order to determine the pattern center, several methods have been proposed including a method wherein curvatures of curves (hereinafter referred to as pattern curves) of ridges which form a fingerprint pattern at different positions on a fingerprint image are determined and a point at which the greatest curvature is exhibited is searched out as the pattern center and another method wherein directions (orientations) of segments of pattern curves at different positions on a fingerprint image are determined and the pattern center is determined using the directions of the pattern-curve segments.

Of the two methods, the latter method wherein the pattern center is determined using directions of pattern-curve segments is described with reference to FIGS. 37 to 40. FIG. 37 is a diagrammatic view schematically showing an example of a distribution of directions of pattern-curve segments on a fingerprint image and illustrating a method of determining the pattern center using the directions; FIG. 38 is a diagrammatic view showing a representative distribution of directions of pattern-curve segments in the proximity of the center of the fingerprint pattern and showing an example of a template used for determination of the pattern center; FIG. 39 is a diagrammatic view illustrating different kinds of directions of the pattern-curve segments; and FIGS. 40(A), 40(B) and 40(C) are diagrams illustrating a method of comparing the directions of two pattern-curve segments.

In FIG. 37, it is shown that a fingerprint image is divided into square blocks of several pixels and the direction of a segment of a major one pattern curve crossing each of the blocks is indicated for each block. It is to be noted that the direction of the pattern-curve segment in each of the blocks in FIG. 37 is indicated representatively by one of such 8 units (from direction 1 to direction 8) obtained by equally dividing 180 degrees as seen in FIG. 39. In particular, the direction nearest to the direction of the pattern-curve segment which crosses each block is selected from among the 8 different directions 1 to 8 shown in FIG. 39, and the selected direction is indicated as representing the direction of the pattern-curve segment crossing each block.

It is known that the directions of pattern-curve segments in the proximity of the center of a fingerprint pattern have a unique distribution configuration. In the proximity of the center of a fingerprint pattern, fingerprint curves (pattern curves) have great curvatures, and therefore, the directions of pattern-curve segments have great variations and exhibit a unique distribution as seen in FIG. 38. Also in FIG. 38, the direction of pattern-curve segment in each block is indicated in a similar manner as in FIG. 37. The dark square indicated at the center of FIG. 38 represents the center O of the fingerprint pattern.

Then, in order to determine the pattern center of the fingerprint pattern of the fingerprint image shown in FIG. 37, a place having a distribution of the directions of pattern-curve segments similar to the representative distribution of the directions of pattern-curve segments in the proximity of the center of the fingerprint pattern shown in FIG. 38 should be searched for. More particularly, a template (matrix having 6×10 blocks) having the representative direction distribution of pattern-curve segments in the proximity of the center of the fingerprint pattern shown in FIG. 38 is prepared and the fingerprint image is scanned as indicated by arrow marks in FIG. 37 with the template TP. In particular, the template TP is successively overlapped with the fingerprint image while the position of the template TP is successively shifted so that blocks of the template TP and blocks of the fingerprint image may just overlap with each other, and at each of such positions of the template TP, a sum total of the differences between the directions of the pattern-curve segments of the blocks of the fingerprint image and the directions of the pattern-curve segments of the corresponding blocks of the template TP is determined.

More particularly, the difference between the direction of a pattern-curve segment in each block of the fingerprint image and the direction of a pattern-curve segment in each corresponding block of the template TP both represented in a unit of ⅛ of 180 degrees described hereinabove with reference to FIG. 39 is determined now in a unit of ¼ of 90 degrees. For example, FIG. 40(A) illustrates comparison between a curve segment 11 of the direction 0 and another curve segment 12 of the direction 1, and in this instance, the difference between the directions is determined to be 1. Similarly, in FIG. 40(B) the value of 4 is determined as the difference between the direction 0 of a curve segment 13 and the direction 4 of another curve segment 14. Further, in FIG. 40(C), a curve segment 15 of the direction 0 and another curve segment 16 of the direction 7 are compared with each other. In this instance, the difference between the directions is determined as a value corresponding to a smaller one of intersecting angles, that is, 1.

The difference between the direction of the pattern-curve segment in each block of a fingerprint image and the direction of the fingerprint-curve segment (pattern-curve segment) in each corresponding block of the template TP determined at each position of the template TP is determined using the technique described above, and such differences are totaled with regard to all blocks of the template TP. The point on the fingerprint image overlapping with a pattern-center candidate point of the template TP (the dark square indicated at the center of the template TP) at the position of the template TP which exhibits the lowest total value of the differences between the directions of the pattern-curve segments of the blocks of the template TP and the directions of the pattern-curve segments of the corresponding blocks of the fingerprint image is determined as the center of the fingerprint pattern of the fingerprint image.

However, since the conventional pattern-center determination method requires determination of the curvatures and the directions of pattern-curve segments at various positions of the fingerprint image, a large amount of complicated calculation is required and much time is required for the arithmetic operation. Accordingly, where the pattern-center determination method is used to perform alignment or collation of fingerprint images, much time and labor is required for the alignment or collation.

Thus, it is estimated that, if some common reference to a plurality of fingerprint images can be set not only for the position, such as the pattern center, but also for the orientation of each of the fingerprint images, alignment or collation of the fingerprint images can be performed in a shorter time based on the reference orientation. From this object, it is demanded to make it possible to clearly define an orientational reference of each of fingerprint images for aligning the fingerprint images, so as to calculate the orientation of each of the fingerprint images accurately in a short time.

On the other hand, in the conventional calculation method for the parallel shift of a fingerprint image used in an alignment method, a collation method or a verification method for fingerprint images, a fingerprint image is parallelly shifted successively by a small distance to perform collation many times to search for an optimum parallel shift, or the curvatures or the directions of pattern-curve segments at various positions on a fingerprint image is determined to calculate a parallel shift, as described hereinabove. Therefore, a large amount of complicated calculation is required and much time is required for the arithmetic operation.

Also in the conventional calculation method for a rotation shift of a fingerprint image used in an alignment method, a collation method or a verification method of fingerprint images, a fingerprint image is rotationally shifted successively by a small angle to perform fingerprint collation many times to search for an optimum rotation shift. Therefore, a large amount of complicated calculation is required and much time is required for the arithmetic operation.

Accordingly, the conventional alignment method, collation method or verification method for fingerprint images, in which the parallel shift or the rotation shift is calculated to perform alignment of the fingerprint images using such conventional techniques as described above, has a subject to be solved in that too much arithmetic-operation time is required for aligning or collating or verification of fingerprint images.

Further, in order to perform verification or synthesis with certainty with regard to a plurality of fingerprint images, the fingerprint images must be positioned (aligned) as accurately as possible. Accordingly, a method is demanded by which a result of alignment of a plurality of fingerprint images performed using some technique can be corrected comparatively accurately using a technique as simple as possible.

SUMMARY OF THE INVENTION

It is a first object of the present invention to make it possible to determine a reference center of a fingerprint-like pattern accurately in a short time.

It is a second object of the present invention to make it possible to determine a reference orientation of a fingerprint-like pattern accurately in a short time.

It is a third object of the present invention to make it possible to perform alignment or verification of a plurality of fingerprint-like patterns accurately in a short time.

In order to attain the objects described above, according to an aspect of the present invention, there is provided a pattern-center determination apparatus for determining a pattern center of a fingerprint-like pattern, which is formed with a number of pattern curves, said apparatus comprising: an auxiliary-line generation section for generating two or more auxiliary lines extending continuously from an outer circumference side one of the pattern curves of the fingerprint-like pattern toward an inner circumference side one of the pattern curves so that each of the two or more auxiliary lines intersects each of the pattern curves perpendicularly or substantially perpendicularly; and a pattern-center determination section for determining the pattern center based on one or more intersecting points of the two or more auxiliary lines generated by said auxiliary-line generation section.

According to another aspect of the present invention, there is provided a pattern-center determination method for determining a pattern center of a fingerprint-like pattern, which is formed with a number of pattern curves, said method comprising the steps of: generating two or more auxiliary lines extending continuously from an outer circumference side one of the pattern curves of the fingerprint-like pattern toward an inner circumference side one of the pattern curves so that each of the two or more auxiliary lines intersects each of the pattern curves perpendicularly or substantially perpendicularly; and determining the pattern center based on one or more intersecting points of the two or more auxiliary lines.

According to a further aspect of the present invention, there is provided a computer-readable recording medium on which a pattern-center determination program is recorded for instructing a computer to function as the pattern-center determination apparatus described above.

With the pattern-center determination apparatus, the pattern-center determination method and the computer-readable recording medium on which the pattern-center determination program is recorded, two or more auxiliary lines extending continuously from an outer circumference side one of the pattern curves of the fingerprint-like pattern toward an inner circumference side one of the pattern curves are generated so that each of the auxiliary lines intersects each of the pattern curves perpendicularly or substantially perpendicularly, and the pattern center is determined based on one or more intersecting points of the two or more auxiliary lines. Therefore, contents of processes needed for determining the pattern center can be limited to repetitions of simple arithmetic operations with regard to local configurations of a fingerprint-like pattern. Consequently, the calculation amount for the determination process of the pattern center can be reduced significantly compared with that by the conventional technique, and the pattern center of the fingerprint-like pattern can be determined certainly at a high speed.

Where an intersecting point of two auxiliary lines is determined as the pattern center, the pattern center can be determined at a high speed through simple processing. Meanwhile, where a most crowded point at which one or more intersecting points of two or more auxiliary lines are most crowded is determined as the pattern center, an accurate pattern center which have a comparatively small error can be determined.

Where a line segment is generated repetitively by repeating a series of processes including setting of a start point, generation of a reference circle, calculation of intersecting points and calculation of an end point so that each auxiliary line is generated as a number of successive line segments (a continuous set of line segments), the auxiliary lines can be generated by repetitions of a limited kinds of simple arithmetic operation. Consequently, the pattern center of the fingerprint-like pattern can be determined certainly at a high speed with a reduced amount of calculation. In this instance, where two intersecting points of the reference circle and the pattern curves are extracted based on angle differences between the normal directions to the reference circle and the tangential directions to the pattern curves at the intersecting points, further reduction of the calculation amount can be achieved.

Also where a first line segment and a second line segment are alternately generated repetitively by repeating a series of processes including setting of first-auxiliary-points, calculation of a start point, generation of a perpendicular bisector, calculation of intersecting points, generation of a straight line, calculation of second auxiliary points and calculation of an end point so that the auxiliary line is generated as a number of alternately successive first and second line segments (a set of such first line segments and second line segments which are connected alternately), or where a line segment is generated repetitively by repeating a series of processes including setting of a start point, calculation of auxiliary points, generation of an auxiliary-line segment, generation of a straight line and calculation of an end point so that each auxiliary line is generated as a number of successive line segments, the auxiliary lines can be generated by repetitions of a limited number of kinds of simple arithmetic operation. Consequently, the pattern center can be determined certainly at a high speed through a reduced mount of calculation.

According to a still further aspect of the present invention, there is provided a pattern-orientation determination apparatus for determining a pattern orientation of a fingerprint-like pattern, which is formed with a number of pattern curves, said apparatus comprising: a pattern-center determination section for determining a pattern center of the fingerprint-like pattern; a reference-circle generation section for generating a reference circle of a predetermined radius centered at the pattern center determined by said pattern-center determination section; a reference-circle-intersecting-point calculation section for calculating intersecting points of the reference circle generated by said reference-circle generation section and the pattern curves of the fingerprint-like pattern; a reference-point determination section for determining a reference point for the pattern orientation based on a relationship between directions of the reference circle and directions of the pattern curves at the intersecting points calculated by said reference-circle-intersecting-point calculation section; and a pattern-orientation determination section for determining the pattern orientation based on the pattern center determined by said pattern-center determination section and the reference point determined by said reference-point determination section.

According to a yet further aspect of the present invention, there is provided a pattern-orientation determination method for determining a pattern orientation of a fingerprint-like pattern, which is formed with a number of pattern curves, said method comprising the steps of: determining a pattern center of the fingerprint-like pattern; generating a reference circle of a predetermined radius centered at the pattern center; calculating intersecting points of the reference circle and the pattern curves of the fingerprint-like pattern; determining a reference point for the pattern orientation based on a relationship between directions of the reference circle and directions of the pattern curves at the calculated intersecting points; and determining the pattern orientation based on the pattern center and the reference point.

According to a still further aspect of the present invention, there is provided a computer-readable recording medium on which a pattern-orientation determination program is recorded for instructing a computer to function as the pattern-orientation determination apparatus described above.

With the pattern-orientation determination apparatus, the pattern-orientation determination method and the computer-readable recording medium on which the pattern-orientation determination program is recorded, a reference circle of a predetermined radius centered at the pattern center is generated, and a reference point for the pattern orientation is determined based on a relationship between directions of the reference circle and directions of the pattern curves at the intersecting points of the reference circle and the pattern curves, and then the direction of a reference straight line which passes the reference point and the pattern center is determined as the pattern orientation. Consequently, the pattern orientation for reference to an orientation common to the fingerprint-like pattern images can be determined certainly at a high speed through repetitions of simple arithmetic operation for local configurations of the fingerprint-like patterns.

Where a middle point of those two of the intersecting points of the reference circle and the pattern curves which satisfy a predetermined condition is calculated as the reference point, the direction of the fingerprint-like pattern can be determined with certainty by simple calculation. In this instance, where two intersecting points are extracted based on angle differences between normal directions to the reference circle and tangential directions to the pattern curves at the intersecting points, the two intersecting points which are used for calculation of the reference point can be determined with certainty through simple arithmetic operation. Therefore, the pattern orientation can be determined certainly at a higher speed.

Where, upon determination of the pattern orientation, the pattern center is corrected (rectified) based on the directions of the pattern curves in the proximity of the pattern center, and the direction of the reference straight line which passes both the corrected position of the pattern center and the reference point is determined as the pattern orientation, even where there is the possibility that an error of the pattern orientation may be caused by an error in determining the pattern center or the like, the pattern orientation can be determined with a very high degree of accuracy through addition of simple arithmetic operation.

Where the direction of the reference straight line which passes both the pattern center and the reference point is determined as the pattern orientation, the pattern orientation can be determined with certainty by simple arithmetic operation. In this instance, where the pattern orientation is corrected based on the position of an arbitrary point on the reference straight line other than the reference point and the pattern curves present around the arbitrary point, even if the accuracy of the pattern center to be used for determination of the pattern orientation is not very high, the pattern orientation can be corrected through addition of simple arithmetic operation, and an accurate pattern orientation can be determined efficiently.

Where two or more auxiliary lines extending continuously from an outer circumference side one of the pattern curves of the fingerprint-like pattern toward an inner circumference side one of the pattern curves are generated so that each of the auxiliary lines intersects each of the pattern curves perpendicularly or substantially perpendicularly and the pattern center is based on one or more intersecting points of the two or more auxiliary lines thus generated, contents of processes needed for determining the pattern center can be limited to repetitions of simple arithmetic operation and the calculation amount can be reduced compared with those by the conventional technique. The pattern center of the fingerprint-like pattern can therefore be determined certainly at a high speed and, consequently, the time required for determination of the pattern orientation can be reduced.

According to a still further aspect of the present invention, there is provided a pattern alignment apparatus for aligning two fingerprint-like patterns, each of which is formed with a number of pattern curves, said apparatus comprising: an alignment-reference determination section for determining one or more alignment references for each of the fingerprint-like patterns; and an alignment section for aligning the two fingerprint-like patterns so that the alignment references of the two fingerprint-like patterns determined by said alignment-reference determination section coincide with each other; said alignment-reference determination section including a pattern-center determination section for determining a pattern center of each of the fingerprint-like patterns as one of the alignment references, said pattern-center determination section having an auxiliary-line generation section for generating two or more auxiliary lines extending continuously from an outer circumference side one of the pattern curves of each said fingerprint-like pattern toward an inner circumference side one of the pattern curves so that each of the auxiliary lines intersects each of the pattern curves perpendicularly or substantially perpendicularly, and a pattern-center determination section for determining the pattern center based on one or more intersecting points of the two or more auxiliary lines generated by said auxiliary-line generation section.

According to a yet further aspect of the present invention, there is provided a pattern alignment apparatus for aligning two fingerprint-like patterns, each of which is formed with a number of pattern curves, said apparatus comprising: an alignment-reference determination section for determining one or more alignment references for each of the fingerprint-like patterns; and an alignment section for aligning the two fingerprint-like patterns so that the alignment references of the two fingerprint-like patterns determined by said alignment-reference determination section coincide with each other; said alignment-reference determination section including a pattern-orientation determination section for determining a pattern orientation of each of the fingerprint-like patterns as one of the alignment references, said pattern-orientation determination section having a pattern-center determination section for determining a pattern center of each said fingerprint-like patterns as the alignment reference, a reference-circle generation section for generating a reference circle of a predetermined radius centered at the pattern center determined by said pattern-center determination section, a reference-circle-intersecting-point calculation section for calculating intersecting points of the reference circle generated by said reference-circle generation section and the pattern curves of each said fingerprint-like pattern, a reference-point determination section for determining a reference point for the pattern orientation based on a relationship between directions of the reference circle and directions of the pattern curves at the intersecting points calculated by said reference-circle-intersecting-point calculation section, and a pattern-orientation determination section for determining the pattern orientation based on the pattern center determined by said pattern-center determination section and the reference point determined by said reference-point determination section.

With the pattern alignment apparatus, two or more auxiliary lines extending continuously from an outer circumference side one of the pattern curves of the fingerprint-like pattern toward an inner circumference side one of the pattern curves are generated so that each of the auxiliary lines intersects each of the pattern curves perpendicularly or substantially perpendicularly, and the pattern center is determined based on one or more intersecting points of the two or more auxiliary lines thus generated and is used as an alignment reference. Therefore, contents of processes needed for determining the pattern center can be limited to repetitions of simple arithmetic operations for local configurations of the fingerprint-like patterns. Therefore, the pattern center can be determined certainly at a high speed as an alignment reference. Further, alignment of two fingerprint-like patterns can be preformed efficiently.

Where a reference circle of a predetermined radius centered at the pattern center is generated and a reference point for indication of a pattern orientation is determined based on the directions of the reference circle and the directions of pattern curves at intersecting points of the reference circle and the pattern curves and then the pattern orientation is determined based on the reference point and the pattern center and is used as the alignment reference, the pattern orientation for reference to an orientation common to the fingerprint-like pattern images can be determined certainly at a high speed as the alignment reference. Further, alignment of the two fingerprint-like patterns can be preformed efficiently using the alignment reference.

When the two fingerprint-like patterns is aligned using the pattern center and the pattern orientation, where shifts (a parallel shift and a rotation angle) of one of the fingerprint-like patterns with respect to the other of the fingerprint-like patterns are calculated and the alignment of the patterns are adjusted based on the parallel shifts, the two fingerprint-like patterns can be aligned efficiently with a simple construction.

According to a further aspect of the present invention, there is provided a pattern verification apparatus for verifying a group of object minutiae for verification extracted from an object fingerprint-like pattern for verification with a group of registered minutiae extracted in advance from a registered fingerprint-like pattern, each of the object fingerprint-like pattern and the registered fingerprint-like pattern being formed with the number of pattern curves, said apparatus comprising: a pattern inputting section for inputting the object fingerprint-like pattern; an alignment-reference determination section for determining one or more alignment references of the object fingerprint-like pattern inputted by said pattern inputting section; a minutia extraction section for extracting the group of object minutiae from the object fingerprint-like pattern inputted by said pattern inputting section; a registration-data obtaining section for obtaining registration data regarding the registered fingerprint-like pattern, said registration data including the group of registered minutiae and one or more alignment references of the registered fingerprint-like pattern; an alignment section for aligning the object fingerprint-like pattern or the group of object minutiae and the group of registered minutiae so that the alignment references of the object fingerprint-like pattern determined by said alignment-reference determination section and the alignment references of the registered fingerprint-like pattern obtained by said registration-data obtaining section coincide with each other; and a verification section for verifying the group of object minutiae with the group of registered minutiae based on the alignment by said alignment section; said alignment-reference determination section including a pattern-center determination section for determining a pattern center of the object fingerprint-like pattern as one of the alignment references of the object fingerprint-like pattern, the alignment references of the registered fingerprint-like pattern including a pattern center of the registered fingerprint-like pattern; said pattern-center determination section including an auxiliary-line generation section for generating two or more auxiliary lines extending continuously from an outer circumference side one of the pattern curves of the fingerprint-like pattern toward an inner circumference side one of the pattern curves so that each of the auxiliary lines intersects each of the pattern curves perpendicularly or substantially perpendicularly, and a pattern-center determination section for determining the pattern center based on one or more intersecting points of the two or more auxiliary lines generated by said auxiliary-line generation section.

According to a yet further aspect of the present invention, there is provided a pattern verification apparatus for verifying a group of object minutiae extracted from an object fingerprint-like pattern for verification with a group of registered minutiae extracted in advance from a registered fingerprint-like pattern, each of the object fingerprint-like pattern and the registered fingerprint-like pattern being formed with the number of pattern curves, said apparatus comprising: a pattern inputting section for inputting the object fingerprint-like pattern; an alignment-reference determination section for determining one or more alignment references of the object fingerprint-like pattern inputted by said pattern inputting section; a minutia extraction section for extracting the group of object minutiae from the object fingerprint-like pattern inputted by said pattern inputting section; a registration-data obtaining section for obtaining registration data regarding the registered fingerprint-like pattern, said registration data including the group of registered minutiae and one or more alignment references of the registered fingerprint-like pattern; an alignment section for aligning the object fingerprint-like pattern or the group of object minutiae and the group of registered minutiae so that the alignment references of the object fingerprint-like pattern determined by said alignment-reference determination section and the alignment references of the registered fingerprint-like pattern obtained by said registration-data obtaining section coincide with each other; and a verification section for verifying the group of object minutiae with the group of registered minutiae based on the alignment by said alignment section; said alignment-reference determination section including a pattern-orientation determination section for determining a pattern orientation of the object fingerprint-like pattern as one of the alignment references, the registered alignment references of the registered fingerprint-like pattern including a pattern orientation of the registered fingerprint-like pattern; said pattern-orientation determination section including a pattern-center determination section for determining a pattern center of the object fingerprint-like pattern, a reference-circle generation section for generating a reference circle of a predetermined radius centered at the pattern center of the object fingerprint-like pattern determined by said pattern-center determination section, a reference-circle-intersecting-point calculation section for calculating intersecting points of the reference circle generated by said reference-circle generation section and the pattern curves of the object fingerprint-like pattern, a reference-point determination section for determining a reference point for the pattern orientation based on a relationship between directions of the reference circle and directions of the pattern curves at the intersecting points calculated by said reference-circle-intersecting-point calculation section, and a pattern-orientation determination section for determining the pattern orientation based on the pattern center determined by said pattern-center determination section and the reference point determined by said reference-point determination section.

With the pattern verification apparatus, upon determination of alignment references, auxiliary lines are generated making use of directions of local pattern curves and the pattern center is determined based on the auxiliary lines. Contents of process needed for determining the pattern center can therefore be limited to repetitions of simple arithmetic operations for local configurations of the fingerprint-like patterns and, consequently, the calculation amount required for the determination process of the pattern center can be reduced significantly. Further, the pattern center can be determined certainly at a high speed as an alignment reference, and verification of the group of object minutiae with the group of registered minutiae can be performed efficiently.

Further, upon determination of the alignment reference, a reference circle of a predetermined radius centered at the pattern center is generated and a reference point for indication of a pattern orientation is determined based on the relationship between the directions of the reference circle and the directions of pattern curves at intersecting points of the reference circle and the pattern curves, and then the direction of a reference straight line which passes the reference point and the pattern center is determined as a pattern orientation. Consequently, a pattern orientation as a reference to the direction common to the fingerprint-like pattern images can be determined certainly at a high speed through repetitions of simple arithmetic operations for local configurations of the fingerprint-like patterns. Further, verification of the group of object minutiae with the group of registered minutiae can be preformed efficiently.

Where also the registered fingerprint-like pattern is subject to processes of image inputting, determination of alignment references and minutia extraction which are common to the processes for the object fingerprint-like pattern for verification, processing of the registered fingerprint-like pattern can be performed efficiently making the most of an existing construction used for the object fingerprint-like pattern for verification.

When the two fingerprint-like patterns is aligned using the pattern center and the pattern orientation, where shifts (a parallel shift and a rotation angle) of one of the fingerprint-like patterns with respect to the other of the fingerprint-like patterns are calculated and the alignment of the patterns are adjusted based on the shifts, the two fingerprint-like patterns can be aligned efficiently with a simple construction.

According to an additional aspect of the present invention, there is provided a pattern alignment apparatus for aligning two fingerprint-like patterns, each of which is formed with a number of pattern curves, while adjusting the alignment of the two fingerprint-like patterns, comprising: an alignment section for aligning the two fingerprint-like patterns; a minutia extraction section for extracting a group of minutiae from each of the fingerprint-like patterns; a collation section for collating the two group of minutiae extracted from the two fingerprint-like patterns by said minutia extraction section based on the alignment by said alignment section; an adjustment-shift calculation section for calculating an adjustment shift by which at least one of the two fingerprint-like patterns is to be shifted for adjusting the alignment of the two fingerprint-like patterns, based on a result of the collation by said collation section so that the alignment of the two fingerprint-like patterns is improved; and an alignment adjusting section for shifting at least one of the two fingerprint-like patterns by the adjustment shift calculated by said adjustment-shift calculation section so as to adjust a result of the alignment by said alignment section.

In the pattern alignment apparatus, two fingerprint-like patterns are aligned and a group of minutiae are extracted from each of the fingerprint-like patterns, and the two groups of minutiae extracted from the two fingerprint-like patterns are collated based on a result of the alignment. Further, an adjustment shift by which at least one of the two fingerprint-like patterns is to be shifted so that the alignment of the two fingerprint-like patterns may be improved is calculated based on a result of the collation, and at least one of the two fingerprint-like patterns is shifted by the calculated adjustment shift to perform adjustment of a result of the alignment.

With the pattern alignment apparatus, since an adjustment shift which improve the alignment result of the two fingerprint-like patterns by the alignment section is determined based on the alignment result and the alignment of the two fingerprint-like patterns is adjusted by shifting one of the two fingerprint-like patterns based on the adjustment shift, alignment of the two group of minutiae extracted from the two fingerprint-like patterns can be performed with a higher degree of accuracy through addition of simple arithmetic operation for local configurations of the fingerprint-like patterns. Accordingly, when verification or authentication of biometric information such as a fingerprint is performed on a fingerprint verification/authentication system or a like system, two fingerprint patterns based on the same fingerprint can be collated efficiently for verification/authentication.

Where a permissible shift range is determined first, the permissible shift range being a shift range within which, when one or more minutiae of one of the two fingerprint-like patterns has been discriminated to coincide with one or more minutiae of the other of the two fingerprint-like patterns respectively, one of the two fingerprint-like patterns can be shifted with respect to the other of the two fingerprint-like patterns while at least some of the one or more pairs of coinciding minutiae (coinciding minutia pairs) maintain the coincidence relationship, and then an adjustment shift is determined within the permissible shift range, such an adjustment shift as to improve the alignment result can be determined with certainty without decreasing the number of coinciding minutia pairs.

Furthermore, since an adjustment shift with which the number of coinciding minutia pairs be greatest is determined within the permissible shift range, the number of coinciding minutia pairs can be increased with certainty, and the alignment result of the two fingerprint-like patterns can be improved most efficiently.

Further, since the permissible shift range is calculated based on a predetermined threshold value (coincidence criterion) for the distance between a pair of minutiae to be collated so as to discriminate coincidence, when the two group of minutiae extracted from the two fingerprint-like patterns is collated, even if some error is involved in the positional relationship in either of the groups of minutiae extracted from the fingerprint-like patterns, the alignment result of the two fingerprint-like patterns can be improved with certainty.

Where the adjustment shift is a rotation angle by which one of the two fingerprint-like patterns is to be rotated around a predetermined point with respect to the other of the two fingerprint-like patterns or a shift by which one of the two fingerprint-like patterns is to be parallelly shifted with respect to the other of the two fingerprint-like patterns, even if the alignment result of the two fingerprint-like patterns exhibits some displacement in the relative angle or the relative position between the fingerprints, the alignment result of the two fingerprint-like patterns can be improved most efficiently through addition of a small amount of arithmetic operation processing.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 39 is a diagrammatic view showing different kinds of the direction of a pattern-curve segment.

DESCRIPTION OF THE PREFERRED EMBODIMENTS

In the following, embodiments of the present invention are described.

[1] Pattern Center Determination Apparatus as an Embodiment of the Invention

Figure 1:
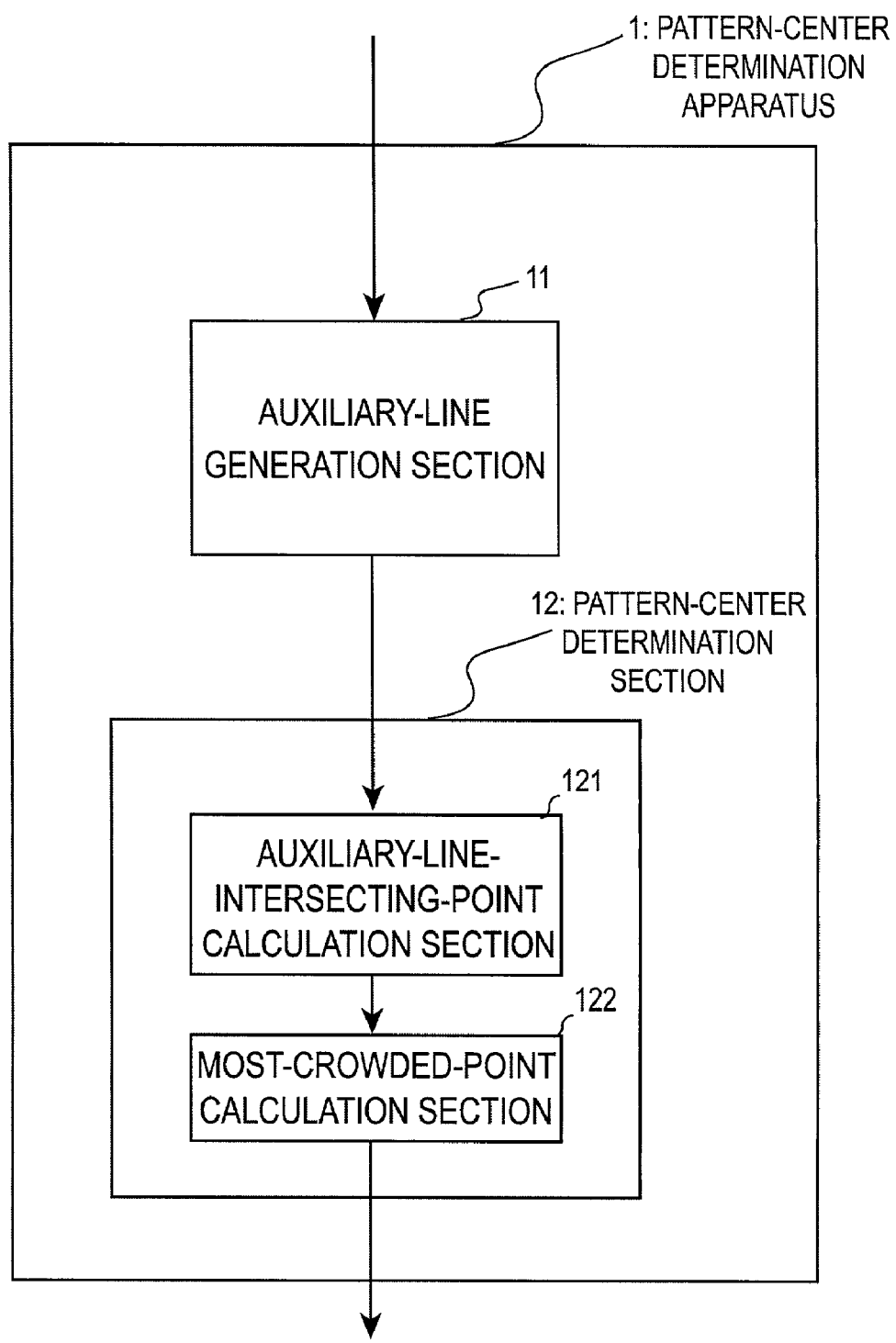
FIG. 1 is a block diagram showing a functional construction of a pattern-center determination apparatus as an embodiment of the present invention.

[1-1] Structure of the Pattern Center Determination Apparatus of the Embodiment FIG. 1 is a block diagram showing a functional construction of a pattern-center determination apparatus as an embodiment of the present invention. Referring to FIG. 1, the pattern-center determination apparatus 1 of the present embodiment shown includes an auxiliary-line generation section 11 and a pattern-center determination section 12.

Figure 2:
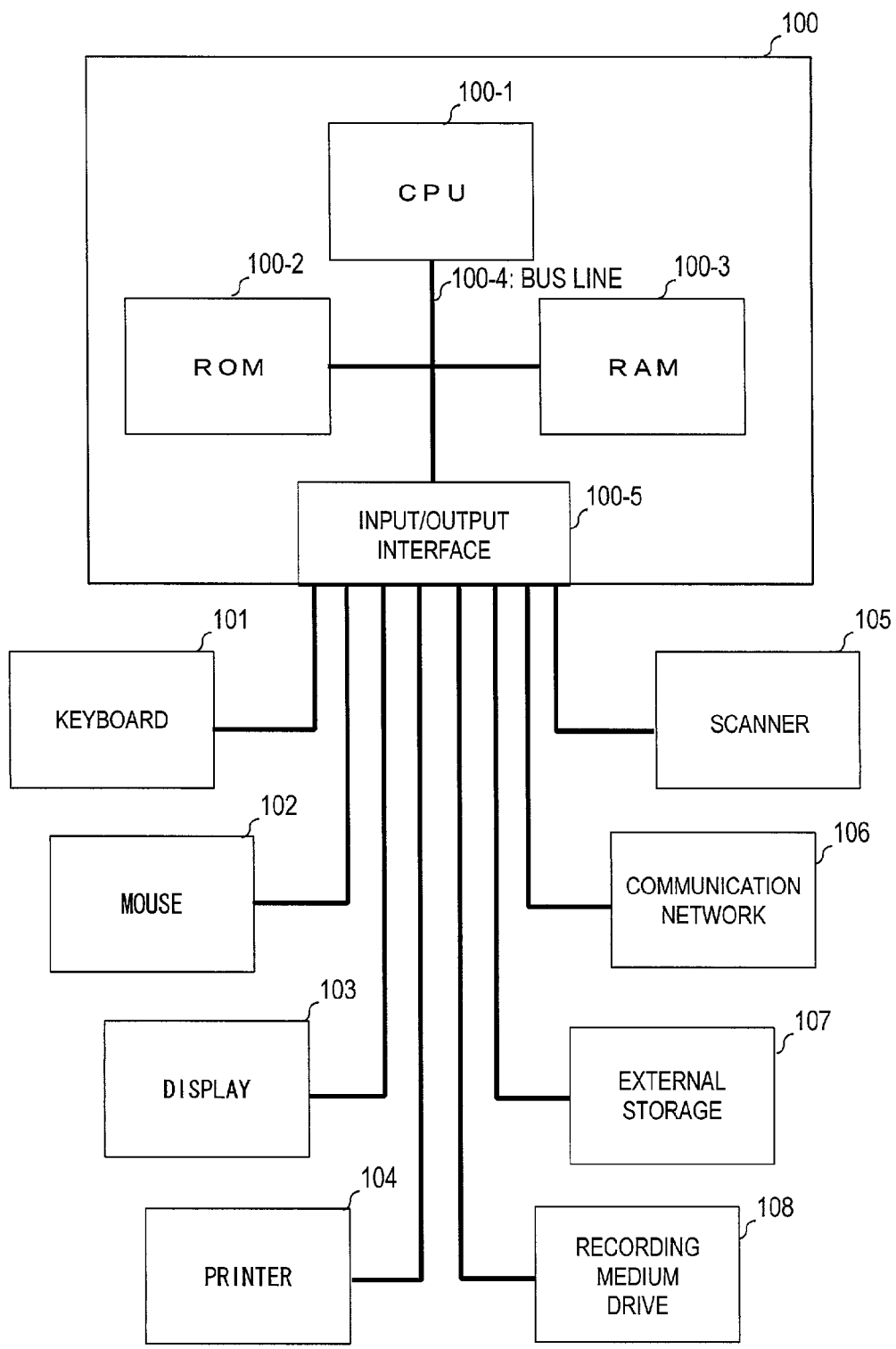
FIG. 2 is a block diagram showing a functional construction of a system by which the pattern-center determination apparatus, a pattern-orientation determination apparatus, a pattern alignment apparatus and a pattern verification apparatus as embodiments of the present invention are implemented.

The pattern-center determination apparatus 1 of the present embodiment may be implemented by such a computer system as a personal computer shown in FIG. 2. FIG. 2 is a block diagram showing a functional construction of a system from which a pattern-center determination apparatus, a pattern-orientation determination apparatus, a pattern alignment apparatus and a pattern verification apparatus of embodiments of the present invention are implemented. Referring to FIG. 2, the computer system 100 shown includes a central processing unit (CPU) 100-1, a read-only memory (ROM) 100-2, a random access memory (RAM) 100-3, a bus line 100-4, and an input/output interface 100-5. A keyboard 101, a mouse 102, a display unit 103, a printer 104, a scanner 105, a communication network 106, an external storage apparatus 107, and a recording medium drive 108 are connected to the computer system 100 through the input/output interface 100-5.

An application program for implementing the auxiliary-line generation section 11 and the pattern-center determination section 12 is stored in the RAM 100-3. The CPU 100-1 executes the application program to implement functions, which are hereinafter described, of the auxiliary-line generation section 11 and the pattern-center determination section 12 thereby to implement the pattern-center determination apparatus 1 of the present embodiment.

The program for implementing the pattern-center determination apparatus 1 of the present embodiment is provided in the form of a computer-readable recording medium such as, for example, a flexible disk or a CD-ROM on which it is recorded. The computer reads the program from the recording medium through the recording medium drive 108 such as a flexible disk drive or a CD-ROM drive and transfers and stores the program to and into an internal storage apparatus such as the ROM 100-2 or the RAM 100-3 or the external storage apparatus 107 so as to enable use of the program. Alternatively, the program may be stored, for example, in another storage apparatus connected to the computer system 100 through the communication network 106 and provided from the storage apparatus to the computer system 100 through the communication network 106.

Where the functions of the pattern-center determination apparatus 1 of the present embodiment are implemented by a computer, the program stored in the internal storage apparatus such as the ROM 100-2 or the RAM 100-3 is executed by a microprocessor such as, for example, the CPU 100-1 of the computer. In this instance, the program recorded on the recording medium may alternatively be read by the microprocessor through the recording medium drive 108 so that the microprocessor may directly execute the program.

It is to be noted that, in the present embodiment, the term "computer" is used as a concept including hardware and an operation system and signifies hardware which operates under the control of the operation system. However, where no operation system is required and an operation program by itself operates hardware, the hardware itself corresponds to the computer. The hardware at least includes a microprocessor such as a CPU and means for reading a computer program recorded on a recording medium.

The application program includes program codes for allowing the computer described above to implement functions of the auxiliary-line generation section 11 and the pattern-center determination section 12. However, part of the functions may be implemented not by the application program but by the operation system.

Further, for the recording medium in the present embodiment, various computer-readable media can be utilized including, in addition to a flexible disk, a CD-ROM, a magnetic disk, an optical disk and a magneto-optical disk mentioned hereinabove, an IC card, a ROM cartridge, a magnetic tape, a punched card, an internal storage apparatus (memory such as a RAM or a ROM), an external storage apparatus and so forth of a computer, and a printed matter on which codes such as bar codes are printed. In addition to such various kinds of recording media, drives for various recording media can be utilized for the recording medium drive 108.

Referring back to FIG. 1, the pattern-center determination apparatus 1 shown determines a reference center (hereinafter referred to as pattern center) of a fingerprint-like pattern in a system which performs personal verification/authentication using biometric information or a like system.

The term "fingerprint-like pattern" signifies a pattern which is biometric information used for personal identification of a human being or an animal such as a fingerprint pattern formed with fingerprint curves (pattern curves) and has a configuration unique to each individual. The configuration signifies a set of a plurality of elliptical curves and/or wave-shaped curves which include a set of at least partially substantially elliptical arcuate curves juxtaposed concentrically with each other.

The center of a fingerprint-like pattern can be defined as a point which corresponds substantially to the center of concentric circles of a set of arcuate curves juxtaposed substantially concentrically with each other. Naturally, the definition is not necessarily precise. This is because, since the fingerprint-like pattern has a unique configuration which is different among different individuals as described above, even a set of arcuate curves juxtaposed substantially concentrically is so great in dispersion of the configuration of the arcuate curves that the configurations cannot be called accurate concentric circles. However, since the pattern center can be defined decisively for the same fingerprint-like pattern, it can be determined always at a substantially same position. Since the pattern center determined by the present embodiment is utilized for determination of a pattern orientation (whose definition is hereinafter given) and alignment of two fingerprint-like patterns, if it is determined usually at a substantially same position for the same fingerprint-like pattern, then the functions can be sufficiently achieved therewith.

A fingerprint-like pattern which is an object of determination of the pattern center by the pattern-center determination apparatus 1 of the present embodiment is picked up in the form of a fingerprint by the scanner 105 connected to the computer system 100 described hereinabove and inputted to the computer system 100, that is, the pattern-center determination apparatus 1, when a pattern-image inputting program stored in the internal storage apparatus such as the ROM 100-2 or the RAM 100-3 or the external storage apparatus 107 shown in FIG. 2 is executed by the CPU 100-1. Alternatively, a fingerprint-like pattern may be provided in the form of a fingerprint image or data (pattern data) of a group of minutiae extracted from a fingerprint image through the communication network 106, the external storage apparatus 107 or the recording medium drive 108 described hereinabove and inputted to the computer system 100, that is, the pattern-center determination apparatus 1.

In the pattern-center determination apparatus 1 of FIG. 1 having such a construction as described above, the auxiliary-line generation section 11 generates two or more auxiliary lines which continuously extend from a pattern curve on the outer circumference side of a fingerprint-like pattern, which is an object of determination of the pattern center, toward another pattern curve on the inner circumference side so that each of the auxiliary lines intersects each of intermediate or intervening pattern curves in the normal direction or in a substantially normal direction to each of the pattern curves (perpendicularly or substantially perpendicularly to each of the pattern curves).

Figure 3:
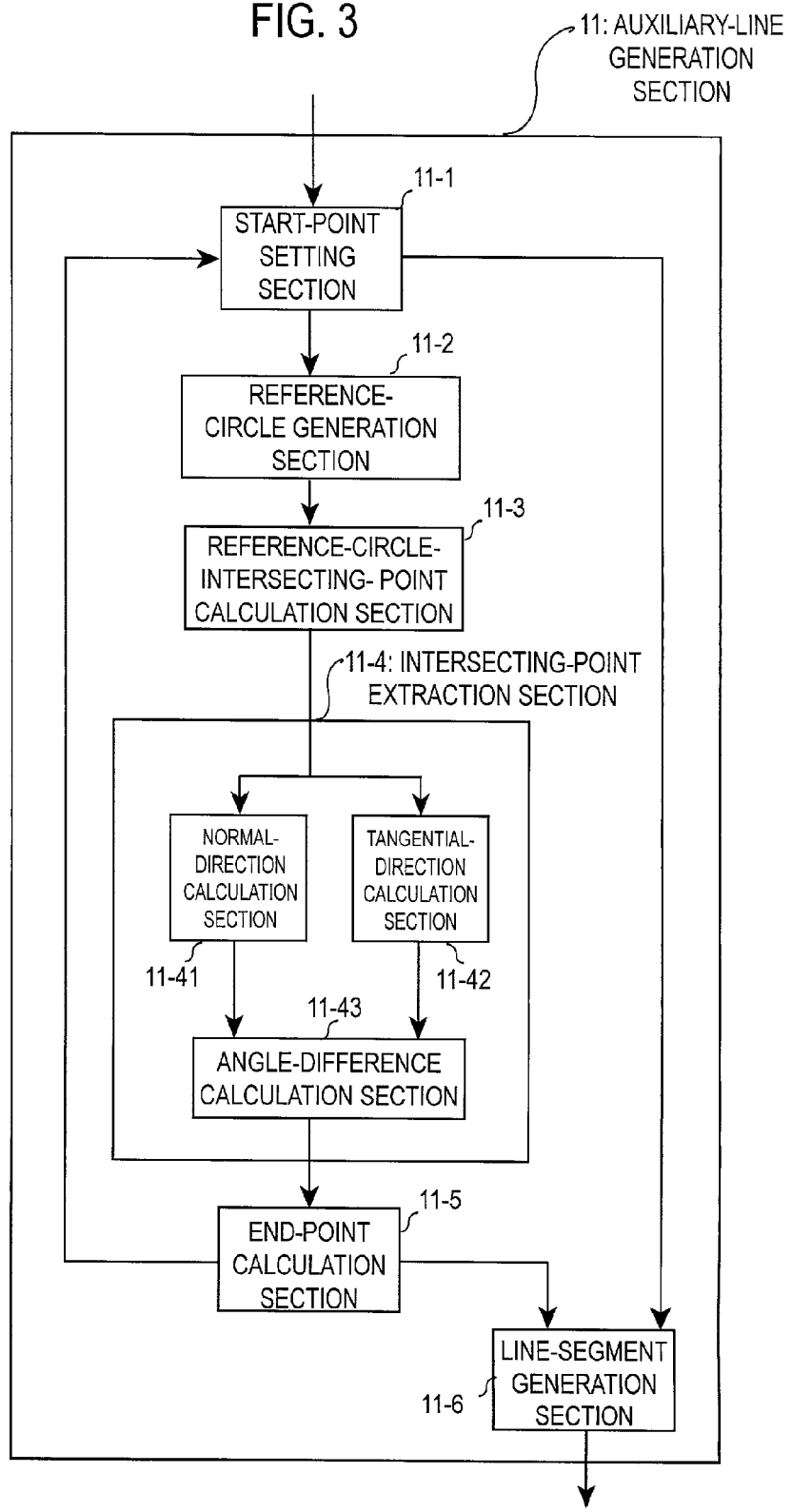
FIG. 3 is a block diagram showing a functional construction of an auxiliary-line generation section of the pattern-center determination apparatus in the embodiment.

FIG. 3 shows a functional construction of the auxiliary-line generation section 11 in the present embodiment. Referring to FIG. 3, the auxiliary-line generation section 11 includes a start-point setting section 11-1, a reference-circle generation section 11-2, a reference-circle-intersecting-point calculation section 11-3, an intersecting-point extraction section 11-4, an end-point calculation section 11-5 and a line-segment generation section 11-6.

The start-point setting section 11-1 sets an arbitrary point of a fingerprint-like pattern as a start point. The reference-circle generation section 11-2 generates a reference circle of a predetermined radius centered at the start point set by the start-point setting section 11-1. The reference-circle-intersecting-point calculation section 11-3 calculates intersecting points of the reference circle generated by the reference-circle generation section 11-2 and pattern curves which form the fingerprint-like pattern.

The intersecting-point extraction section 11-4 extracts those two of the intersecting points calculated by the reference-circle-intersecting-point calculation section 11-3 which satisfy a predetermined condition. The intersecting-point extraction section 11-4 includes a normal-direction calculation section 11-41, a tangential-direction calculation section 11-42, and an angle-difference calculation section 11-43.

The normal-direction calculation section 11-41 calculates the normal directions to the reference circle at those ones of the intersecting points calculated by the reference-circle-intersecting-point calculation section 11-3 which are positioned on the particular side with respect to the start point. The tangential-direction calculation section 11-42 calculates the tangential directions to the pattern curves at those of the intersecting points calculated by the reference-circle-intersecting-point calculation section 11-3 which are positioned on the particular side with respect to the start point. The angle-difference calculation section 11-43 calculates the angular differences between the normal directions calculated by the normal direction calculation section 11-41 and the tangential directions calculated by the tangential direction calculation section 11-42.

The intersecting-point extraction section 11-4 has such a construction as described above and extracts two such intersecting points as described above from among the intersecting points calculated by the reference-circle-intersecting-point calculation section 11-3 based on the angular differences calculated by the angle-difference detection section 11-43.

The end-point calculation section 11-5 calculates the middle point between the two intersecting points extracted by the intersecting-point extraction section 11-4 as an end point. The line-segment generation section 11-6 generates a line segment interconnecting the start point set by the start-point setting section 11-1 and the end point calculated by the end-point calculation section 11-5.

The auxiliary-line generation section 11 has such a construction as described above and repeatedly generates a new line segment, whose start point is set from the end point of the precedently generated line segment by the start-point setting section 11-1, by means of the reference-circle generation section 11-2, the reference-circle-intersecting-point calculation section 11-3, the intersecting-point extraction section 11-4, the end-point calculation section 11-5 and the line-segment generation section 11-6, thereby generating an auxiliary line as a continuous set of line segments (a number of successive line segments).

Further, the auxiliary-line generation section 11 discriminates, based on a result of the calculation of the intersecting points of the reference circle and the pattern curves, whether or not any intersecting point of the reference circle and a pattern curve is present in the particular direction with respect to the start point. If it is discriminated that an intersecting point is present, then processing by the reference-circle generation section 11-2, the reference-circle-intersecting-point calculation section 11-3, the intersecting-point extraction section 11-4, the end-point calculation section 11-5 and the line-segment generation section 11-6 is repeated to continue generation of an auxiliary line. On the contrary, if it is discriminated that no intersecting point is present, then the generation processing of an auxiliary line being generated currently is ended at the point of time.

Furthermore, the auxiliary-line generation section 11 ends the generation processing of a further auxiliary line after a given number of auxiliary lines equal to or greater than 2 are generated. Then, the auxiliary-line generation section 11 sends a result of the auxiliary line generation processing together with the fingerprint-like pattern of the object of processing to the pattern-center determination section 12 shown in FIG. 1.

Referring back to FIG. 1, the pattern-center determination section 12 determines the pattern center based on one or more intersecting points of the two or more auxiliary lines generated by the auxiliary-line generation section 11. The pattern-center determination section 12 includes an auxiliary-line-intersecting-point calculation section 121 and a most-crowded-point calculation section 122.

The auxiliary-line-intersecting-point calculation section 121 determines one or more intersecting points of the two or more auxiliary lines generated by the auxiliary-line generation section 11. The most-crowded-point calculation section 122 calculates the most crowded point, at which the intersecting points calculated by the auxiliary-line-intersecting-point calculation section 121 crowd most, as the pattern center.

[1-2] Operation of the Pattern Center Determination Apparatus of the Embodiment

Figure 4:
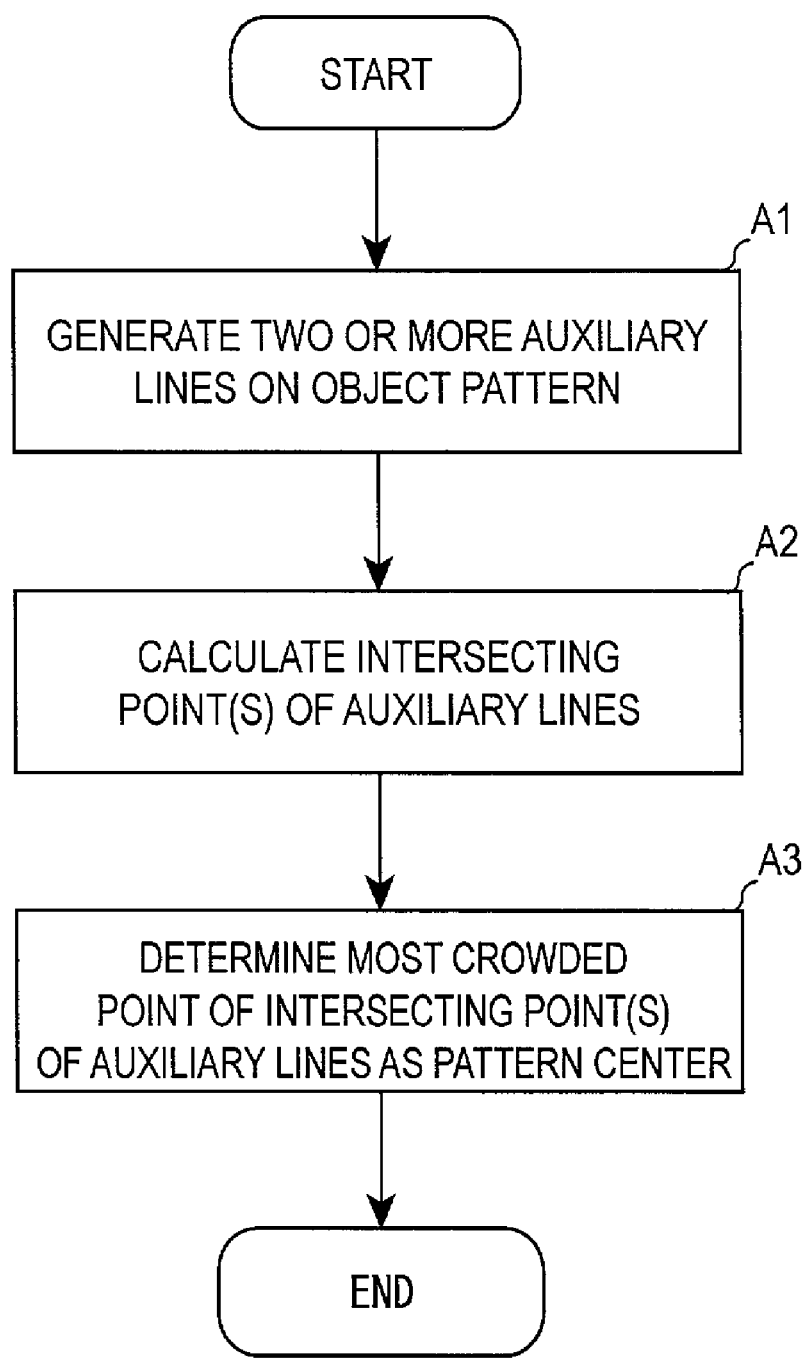
FIG. 4 is a flow chart illustrating a pattern-center determination procedure of the embodiment.

Subsequently, a pattern center determination procedure executed by the pattern-center determination apparatus of the present embodiment, that is, a pattern-center determination procedure of the present embodiment, is described with reference to a flow chart (steps A1 to A3) shown in FIG. 4.

When a fingerprint-like pattern which is an object of determination of the pattern center is inputted in the form of a pattern image or pattern data described above to the pattern-center determination apparatus 1 of the present embodiment, the auxiliary-line generation section 11 first generates two or more continuous auxiliary lines from a pattern curve on the outer circumference side of the fingerprint-like pattern toward another pattern curve on the inner circumference side so that each of the auxiliary lines intersects each of intervening pattern curves in the normal direction or in a substantially normal direction to each pattern curve (perpendicularly or substantially perpendicularly to each of the pattern curves) (step A1). Since the fingerprint-like pattern at least partially has a set of arcuate curves juxtaposed substantially concentrically with each other as described hereinabove, if a continuous auxiliary line is generated so as to intersect perpendicularly or substantially perpendicularly to each intervening pattern curve, then each of the auxiliary lines passes a proximate position to the center of the concentrical circles and hence to the pattern center with a high degree of possibility.

Figure 5:
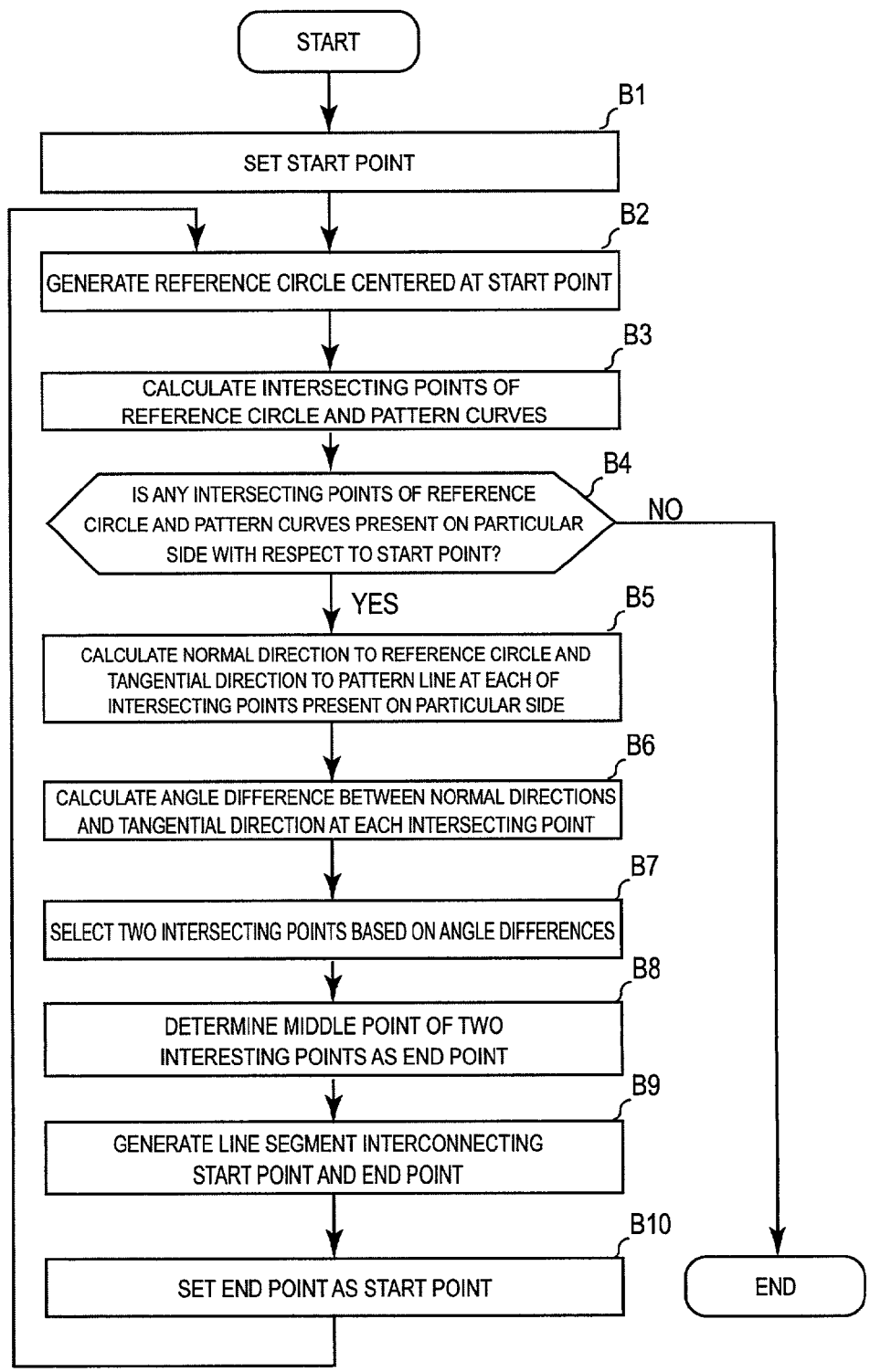
FIG. 5 is a flow chart illustrating an auxiliary-line generation procedure in the embodiment.

Here, the auxiliary line generation process (step A1) by the auxiliary-line generation section 11 is described in detail with reference to FIGS. 5, 6(A) and 6(B). FIG. 5 is a flow chart (steps B1 to B10) illustrating the auxiliary-line generation process in the present embodiment, and FIGS. 6(A) and 6(B) illustrate the auxiliary-line generation technique in the present embodiment.

Figure 6A:
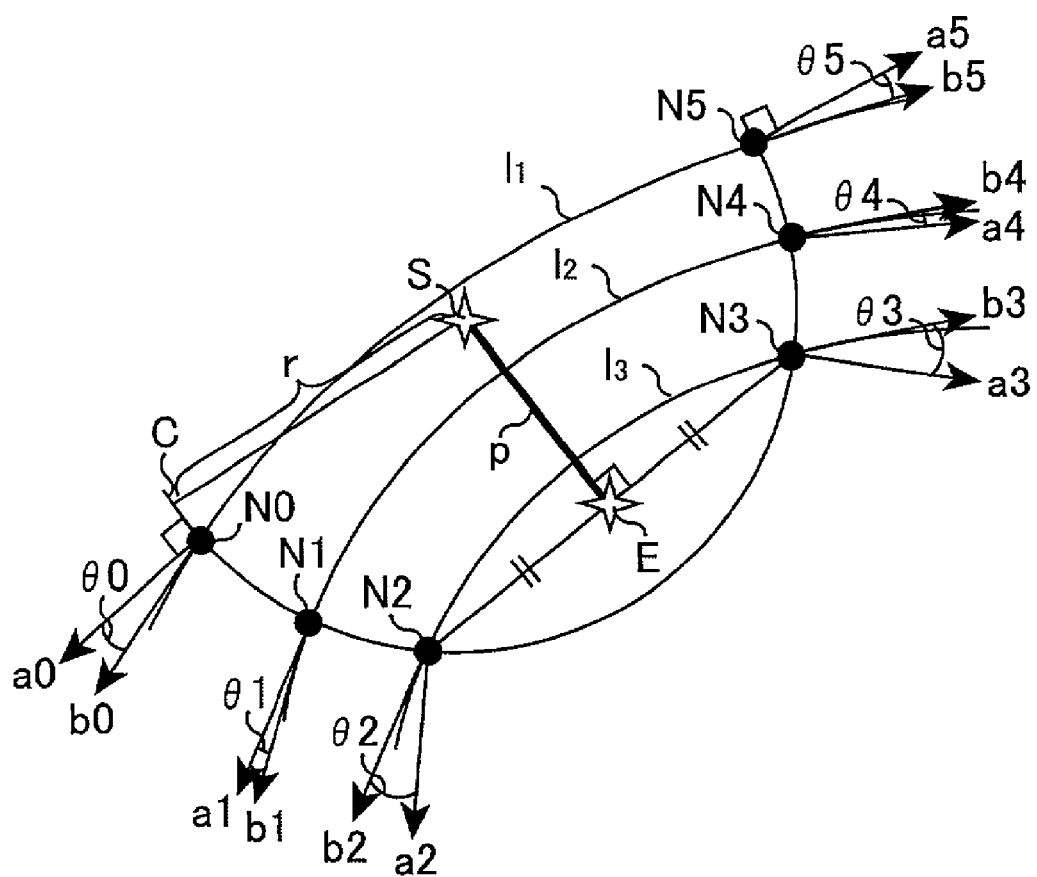
FIGS. 6(A) and 6(B) are diagrammatic views both illustrating an auxiliary-line generation method in the embodiment.
Figure 6B:
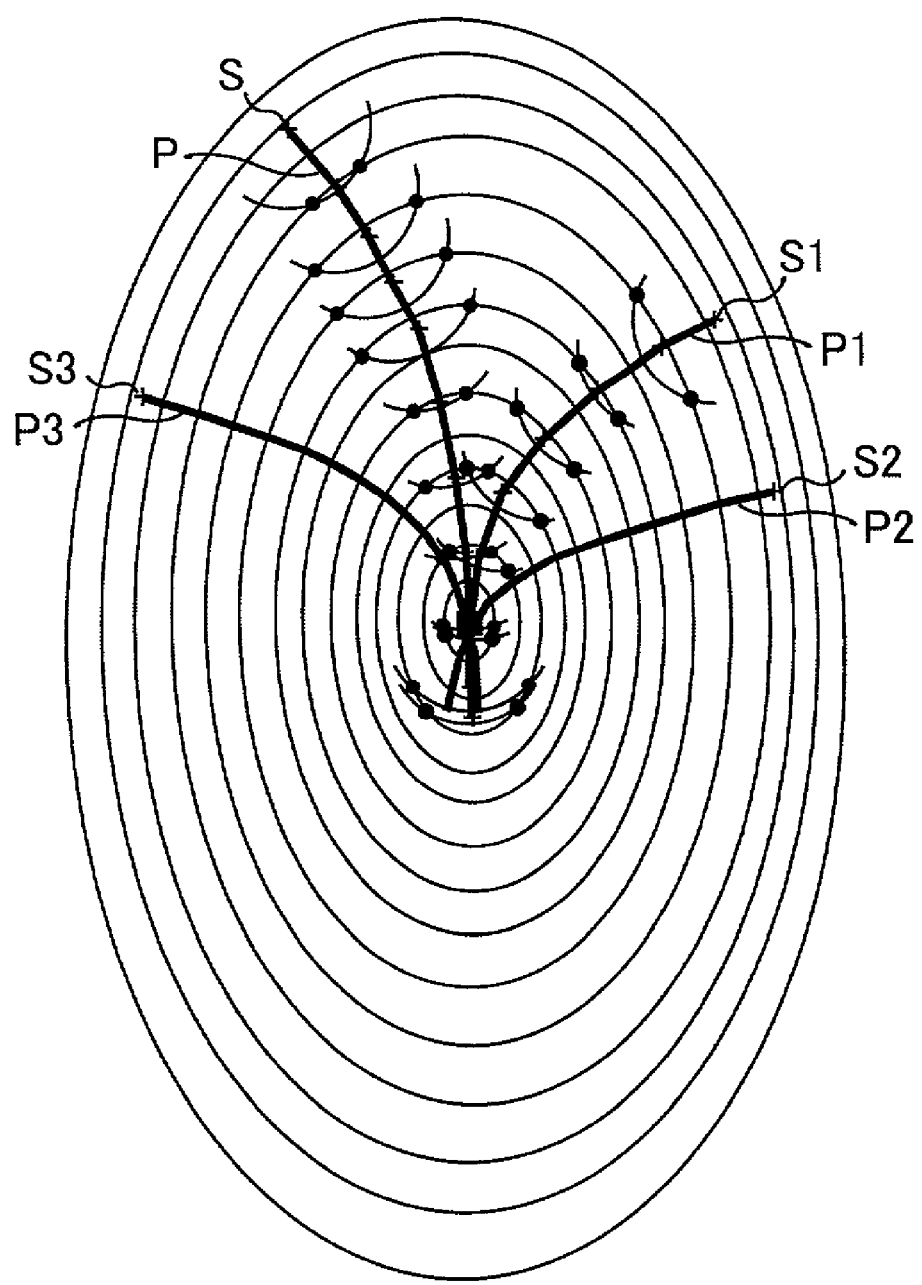

First, an arbitrary point of the fingerprint-like pattern is set as a start point (S in FIGS. 6(A) and 6(B)) by the start-point setting section 11-1 (step B1 of FIG. 5). Here, the arbitrary point to be set as the start point S first is not limited to a point on any pattern curve of the fingerprint-like pattern, but may be any point only if it is included in the fingerprint-like pattern. However, since the auxiliary-line generation technique in the present embodiment makes use of the configuration wherein a set of arcuate curves which the fingerprint-like pattern at least partially has are juxtaposed substantially concentrically with each other, preferably the arbitrary point is set to a point included in or in the proximity of the set of concentrically juxtaposed arcuate curves. For example, where a fingerprint pattern is used as the fingerprint-like pattern, the arbitrary point should be set to a point in the proximity of a fingertip where a geometry wherein a set of arcuate curves are juxtaposed substantially concentrically with each other is found almost with certainty.

Then, a reference circle (C of FIG. 6(A)) of a predetermined radius r centered at the start point S set in step B1 is generated by the reference-circle generation section 11-2 (step B2). Here, the radius r of the reference circle C is determined appropriately in advance in accordance with a type of the fingerprint-like pattern so that the reference circle C and the pattern-line curves may intersect at a plurality of points with each other.

Then, intersecting points (N0 to N5 of FIG. 6(A)) of the reference circle C generated in step B2 and the pattern curves ($l_1$ to $l_3$ of FIG. 6(A)) which form the fingerprint-like pattern are calculated by the reference-circle-intersecting-point calculation section 11-3 (step B3).

Then, it is discriminated based on a result of the calculation whether or not any of the intersecting points N0 to N5 of the reference circle C and the pattern curves $l_1$ 1 to $l_3$ are present on the particular side with respect to the start point (step B4). If it is discriminated that such intersecting point or points are present, then the processing advances to a next process by the auxiliary-line generation section 11 (the YES route of step B4). It is to be noted that a process when it is discriminated that no such intersecting point is present is hereinafter described.

In the following description of the present embodiment, the particular side signifies an advancing direction of an auxiliary line in which the auxiliary line passes in the proximity of the pattern center. It is possible to presume to some degree based on the definition of the pattern center given hereinabove a place at which the pattern center is present in the fingerprint-like pattern. For example, in FIG. 6(B), the start point S is set to a left upper position of the fingerprint-like pattern F, and in this instance, it is presumed that the pattern center O which corresponds to the center of concentric circles is present at a right lower position with respect to the start position S. Accordingly, the rightward downward side with respect to the start point S is set as the particular side, and it is discriminated whether or not some intersecting point or points of the reference circle C and the pattern curves are present on this side.

Then, the normal directions (vectors a1 to a4 in FIG. 6(A)) to the reference circle C at the intersecting points, which have been discriminated to be present on the particular side with respect to the start point S in step S4, that is, at the intersecting points N1 to N4 in FIG. 6(A), are calculated by the normal-direction calculation section 11-41, and the tangential directions (vectors b1 to b4) to the pattern curves $l_1$ to $l_3$ at the intersecting points N1 to N4 are calculated by the tangential-direction calculation section 11-42 (step B5).

Figure 7:
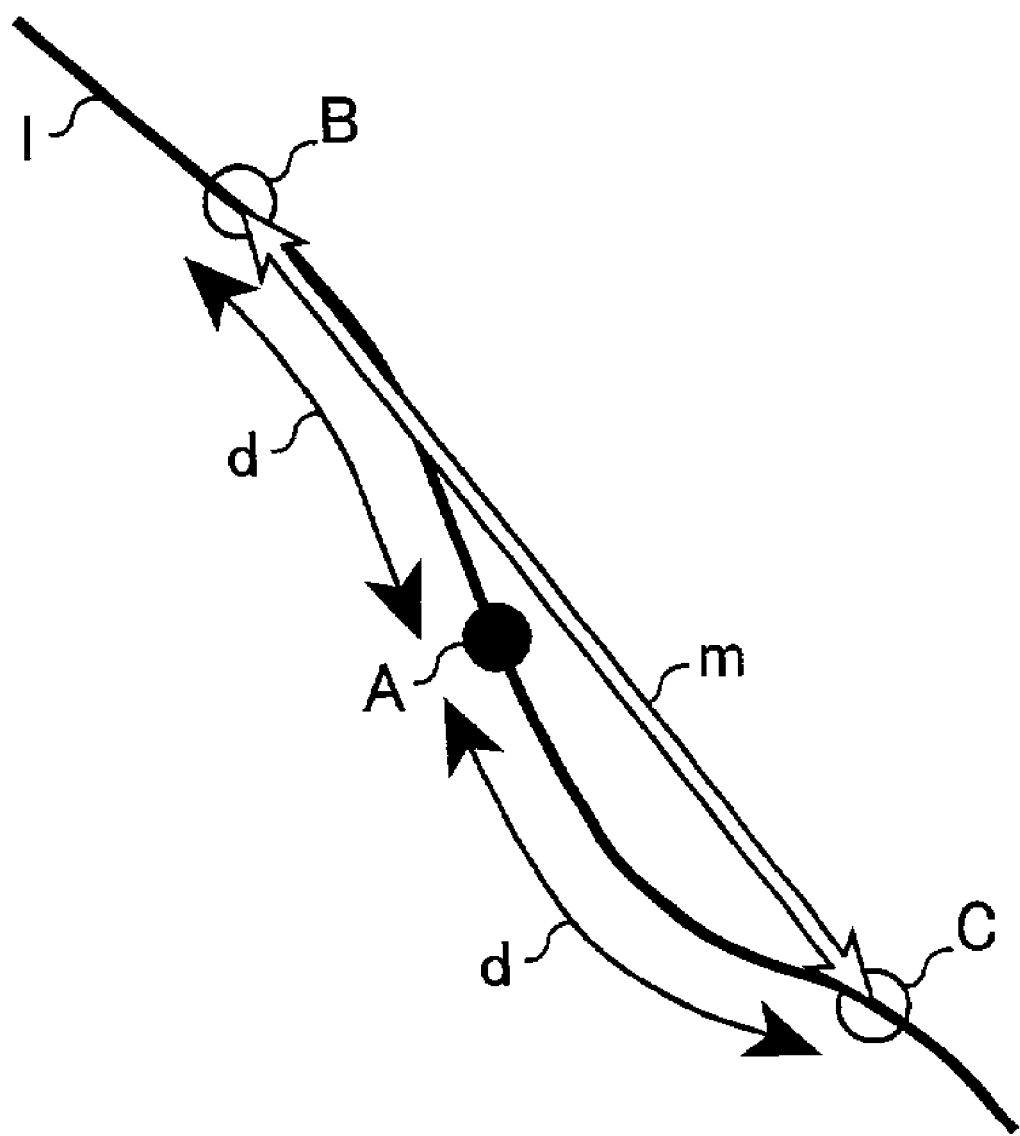
FIG. 7 is a diagrammatic view illustrating a determination method of a direction of pattern curve in the embodiment.

Here, a recommendable method of determining a tangential direction to a pattern curve is described with reference to FIG. 7. In order to determine a tangential direction at a point A of a pattern curve 1, points B and C are determined which are spaced by a predetermined distance d from the point A to the opposite sides of the point A along the pattern curve l. Then, a straight line m which passes the points B and C is generated, and the direction of the straight line m is determined as the tangential direction at the point A of the pattern curve l. Where the tangential direction to a pattern curve is determined in this manner, arithmetic operation is simplified and a comparatively universal tangential direction to a pattern curve can be determined with certainty without being influenced by a local variation of the pattern curve. Naturally, some other method may be used to achieve the pattern center determination procedure of the present embodiment.

Referring back to FIG. 5, for the intersecting points N1 to N4 which have been discriminated to be present on the particular side with respect to the start point S in step B4, the angle differences (θ1 to θ4 of FIG. 6(A)) between the normal directions a1 to a4 to the reference circle C and the tangential directions b1 to b4 to the pattern curves $l_1$ and $l_2$ calculated in step S5 are calculated by the angle difference detection section 11-43 (step B6).

Then, two intersecting points are extracted from the intersecting points N1 to N4, which have been discriminated to be present on the particular side with respect to the start point S in step S4, based on the angle differences θ1 to θ4 at the intersecting points N1 to N4 calculated in step B6 (step B7). More particularly, two intersecting points (N2 and N3 in FIG. 6(A)) which have comparatively great angle differences among the angle differences θ1 to θ4 calculated in step B5 are selected.

Then, the middle point between the two intersecting points N2 and N3 extracted in steps B5 to B7 is calculated as the end point E (refer to FIG. 6(A)) by the end-point calculation section 11-5 (step B8).

Finally, a line segment p (refer to FIG. 6(A)) interconnecting the start point S set in step B1 and the end point E calculated in step B8 is generated by the line-segment generation section 11-6 (step B9).

Thereafter, the end point E determined in step B8 is re-set as a start point S by the start-point setting section 11-1 (step B10), and the processing in steps B2 to B10 described above is repeated so that such a line segment p as described above is repetitively generated. Consequently, an auxiliary line P (refer to FIG. 6(B)) is generated as a set of such line segments p which connect to each other.

On the other hand, if it is discriminated by the reference-circle-intersecting-point calculation section 11-3 that any intersecting point of the reference circle C and the pattern curves is not present on the particular side with respect to the start point S, then the generation processing for the auxiliary line P being currently generated is ended (the NO route of step B4).

Several start points (S, S1, S2 and S3 of FIG. 6(B) are set and the procedure described above is repeated for the set start points. Therefore, two or more auxiliary lines (P, P1, P2 and P3 in FIG. 6(B)) are generated in step A1 of FIG. 4. Then, when the number of two or more auxiliary lines P, P1, P2 and P3 given in advance are generated, the auxiliary line generation process in step A1 is ended, and the processing advances to a process by the pattern-center determination section 12.

The pattern-center determination section 12 determines the pattern center of the fingerprint-like pattern of the object of processing based on the intersecting points of the two or more auxiliary lines generated in step A1 (step A2).

More particularly, an intersecting point of each two of the two or more auxiliary lines generated in step A1 is calculated by the auxiliary-line-intersecting-point calculation section 121, and a most crowded point at which the intersecting points crowd most on the fingerprint-like pattern is calculated as the pattern center O by the most-crowded-point calculation section 122. Since each of the auxiliary lines is formed so as to pass in the proximity of the center of the concentric circles and hence the pattern center O as described hereinabove, if a most crowded point of the intersecting points of the auxiliary lines generated to extend from the different start points is determined, then the most crowded point substantially coincides with the center of the concentric circles.

Here, if two auxiliary lines intersect with each other intermediately and then advance tracing the same locus, a point at which the loci of the two auxiliary lines begin to overlap with each other, that is, a point at which the two auxiliary lines intersect first with each other, is adopted as the intersecting point of the auxiliary lines.

Further, the most crowded point of the intersecting points of the auxiliary lines is determined as a point at which the gathering density of the intersecting points of the auxiliary lines is highest in the region in which the intersecting points of the auxiliary lines are present. The gathering density of the intersecting points of the auxiliary lines is determined as the number of those auxiliary-line intersecting points included in a circular area generated with a predetermined radius from an arbitrary point in the area in which the auxiliary-line intersecting points are present.

Alternatively, however, it is otherwise possible to determine the gathering density of auxiliary-line intersecting points with regard to each auxiliary-line intersecting point and to determine the auxiliary-line intersecting point at which the gathering density is highest as the highest crowded point of auxiliary-line intersecting points, that is, as the pattern center. In this instance, a circle of a predetermined radius centered at each auxiliary line intersecting point may be generated, and the number of other auxiliary-line intersecting points included in the thus generated circular area may be determined as the gathering density at the auxiliary-line intersecting point. The construction just described allows reduction of the amount of calculation and thus allows higher speed determination of the most crowded point of auxiliary-line intersecting points.

Since the pattern-center determination apparatus 1 and the pattern-center determination procedure of the present embodiment make use of local pattern orientations to generate the auxiliary lines P, P1, P2 and P3 and determine the pattern center O based on the auxiliary lines P, P1, P2 and P3 in this manner, contents of the determination process for the pattern center O can be limited to repetitions of simple arithmetic operation with regard to local configurations of a fingerprint-like pattern. Consequently, the calculation amount for the determination process of the pattern center O can be reduced significantly when compared with that by the conventional technique, and the pattern center O can be determined certainly at a high speed.

Further, since the most crowded point of the intersecting points of the plurality of auxiliary lines P, P1, P2 and P3 is determined as the pattern center O, the pattern center O can be determined accurately with a comparatively small error.

Furthermore, since a line segment p is generated repetitively by a series of processes including generation of a reference circle, calculation of reference circle intersecting points, intersecting point extraction, end point calculation and line segment generation to generate the auxiliary lines P, P1, P2 and P3 each as a continuous set of line segments p, the auxiliary lines P, P1, P2 and P3 can be generated by repetitions of a limited number of kinds of simple arithmetic operation. Consequently, the pattern center O can be determined at a high speed and with certainty with a reduced amount of calculation.

In addition, where two intersecting points of the reference circle C and the pattern curves are extracted based on angle differences between the normal directions to the reference circle C and the tangential directions to the pattern curves at the intersecting points, further reduction of the calculation amount can be achieved.

[1-3] Others

Figure 8:
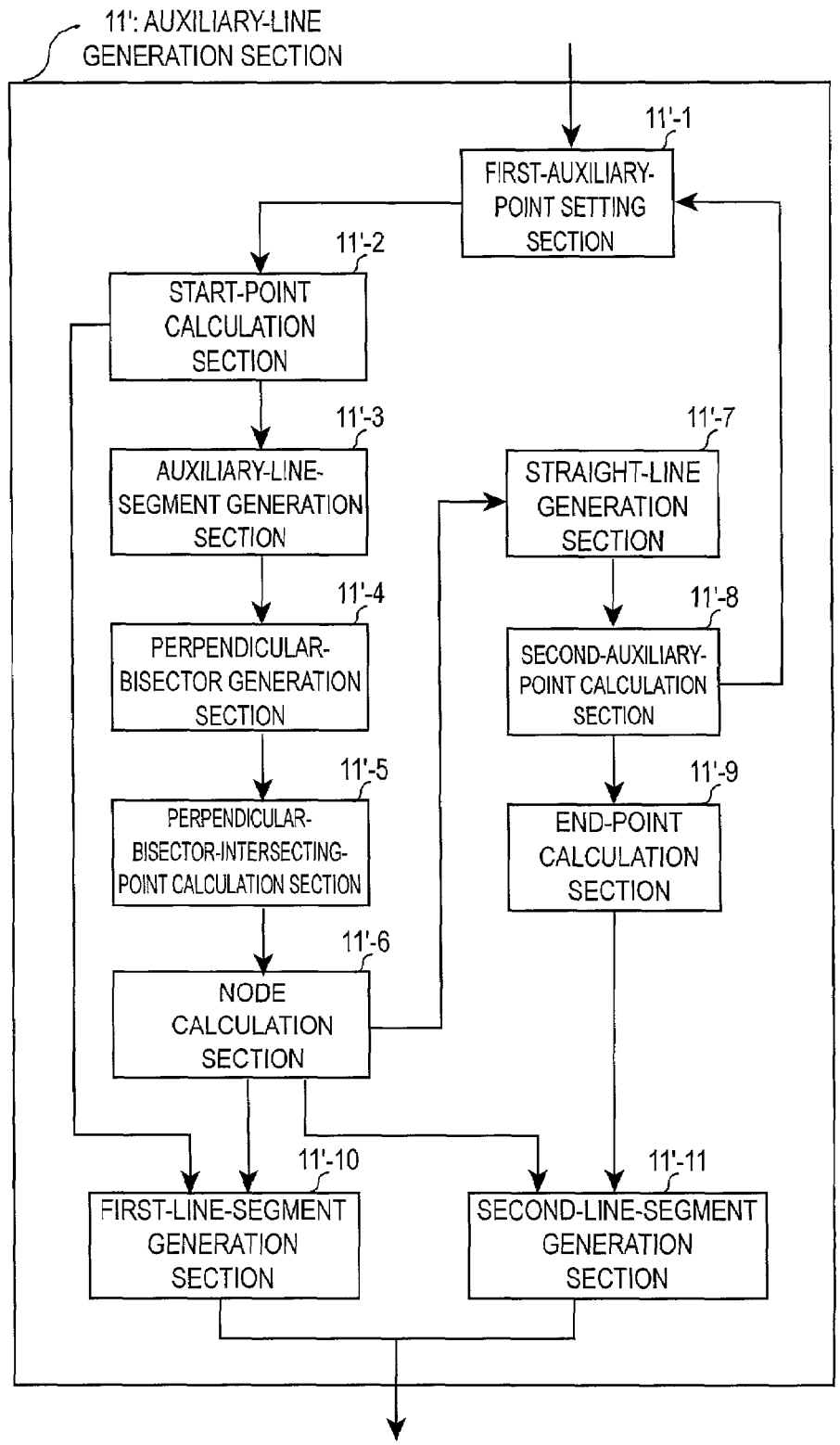
FIG. 8 is a block diagram showing a functional construction of a first modification to the auxiliary-line generation section of the pattern-center determination apparatus in the embodiment.

FIG. 8 shows a functional construction of a first modification to the auxiliary-line generation section of the pattern-center determination apparatus of the present embodiment. Thus, the pattern-center determination apparatus 1 may include the auxiliary-line generation section 11' shown in FIG. 8 in place of the auxiliary-line generation section 11 described hereinabove. Referring to FIG. 8, the auxiliary-line generation section 11' includes a first-auxiliary-point setting section 11'-1, a start-point calculation section 11'-2, an auxiliary-line-segment generation section 11'-3, a perpendicular-bisector generation section 11'-4, a perpendicular-bisector-intersecting-point calculation section 11'-5, a node calculation section 11'-6, a straight-line generation section 11'-7, a second-auxiliary-point calculation section 11'-8, an end-point calculation section 11'-9, a first-line-segment generation section 11'-10 and a second-line-segment generation section 11'-11.

It is to be noted that the other components of the pattern-center determination apparatus 1 in which the auxiliary-line generation section 11' of the present modification is provided are basically same as those of the pattern-center determination apparatus 1 of the embodiment described above, and therefore, overlapping description of them is omitted herein to avoid redundancy. In other words, the auxiliary-line generation section 11' of the modification may be used in place of the auxiliary-line generation section 11 of the pattern-center determination apparatus 1 of the embodiment shown in FIG. 1. Further, the pattern-center determination apparatus 1 in which the auxiliary-line generation section 11' of the modification is provided is implemented by the computer system 100 described hereinabove with reference to FIG. 2 similarly to the pattern-center determination apparatus 1 of the embodiment described above.

The first-auxiliary-point setting section 11'-1 sets two arbitrary points on one of arbitrary pattern curves, which form a fingerprint-like pattern, as two first auxiliary points. The start-point calculation section 11'-2 calculates the middle point of the two first auxiliary points set by the first-auxiliary-point setting section 11'-1 as a start point. The auxiliary-line-segment generation section 11'-3 generates an auxiliary-line segment which interconnects the two first auxiliary points set by the start-point calculation section 11'-1. The perpendicular-bisector generation section 11'-4 generates a perpendicular bisector to the auxiliary-line segment generated by the auxiliary-line-segment generation section 11'-3.

The perpendicular-bisector-intersecting-point calculation section 11'-5 discriminates whether or not one or more intersecting points of the perpendicular bisector generated by the perpendicular-bisector generation section 11'-4 and the pattern curves which form the fingerprint-like pattern are present on the particular side with respect to the start point. If the perpendicular-bisector-intersecting-point calculation section 11'-5 discriminates that such one or more intersecting points are present, then it calculates that one of the intersecting points which is nearest to the start point. However, if the perpendicular-bisector-intersecting-point calculation section 11'-5 discriminates that no such intersecting point is present, then the current auxiliary-line generation process of the auxiliary-line generation section 11' is ended at the point of time.

The node calculation section 11'-6 calculates a point on the perpendicular bisector spaced by a predetermined distance to the particular side from the intersecting point calculated by the perpendicular-bisector-intersecting-point calculation section 11'-5 as a node. The straight-line generation section 11'-7 generates a straight line which passes the node calculated by the node calculation section 11'-6 and intersects orthogonally with the perpendicular bisector. The second-auxiliary-point calculation section 11'-8 calculates those two of intersecting points of the straight line generated by the straight-line generation section 11'-7 and the pattern curves forming the fingerprint-like pattern which are nearest to the node on the opposite sides of the node as second auxiliary points. The end-point calculation section 11'-9 calculates the middle point of the two second auxiliary points calculated by the second-auxiliary-point calculation section 11'-8 as an end point. The first-line-segment generation section 11'-10 generates a first line segment which interconnects the start point calculated by the start-point calculation section 11'-2 and the node calculated by the node calculation section 11'-6. The second-line-segment generation section 11'-11 generates a second line segment which interconnects the node calculated by the node calculation section 11'-6 and the end point calculated by the end-point calculation section 11'-9.

The auxiliary-line generation section 11' has such a construction as described above and successively generates a first line segment and a second line segment described above by means of the start-point calculation section 11'-2, the auxiliary-line-segment generation section 11'-3, the perpendicular-bisector generation section 11'-4, the perpendicular-bisector-intersecting-point calculation section 11'-5, the node calculation section 11'-6, the straight-line generation section 11'-7, the second-auxiliary-point calculation section 11'-8, the end-point calculation section 11'-9, the first-line-segment generation section 11'-10 and the second-line-segment generation section 11'-11 while the two second auxiliary points are re-set as next first auxiliary points by the first-auxiliary-point setting section 11'-1 thereby to generate an auxiliary line as a continuous set of alternate line segments.

Further, the auxiliary-line generation section 11' ends the generation processing of further auxiliary lines after a given number of auxiliary lines equal to or greater than 2 are generated similarly to the auxiliary-line generation section 11 in the embodiment described above. Then, the auxiliary-line generation section 11' sends a result of the auxiliary line generation processing together with the fingerprint-like pattern of the object of processing to the pattern-center determination section 12 shown in FIG. 1.

Figure 9:
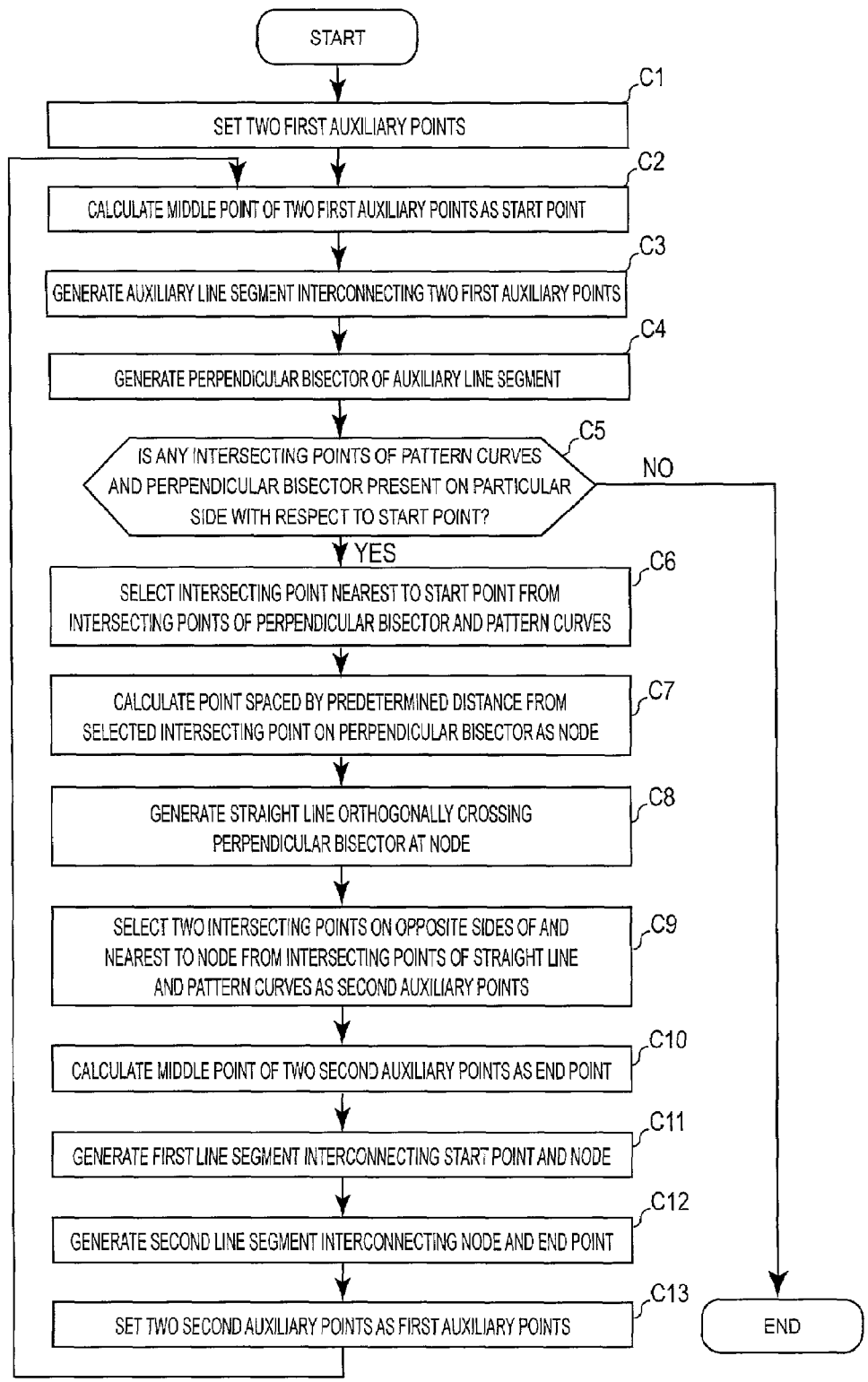
FIG. 9 is a flow chart illustrating an auxiliary-line generation procedure by the first modification to the auxiliary-line generation section shown in FIG. 8.

Subsequently, a pattern center determination procedure executed by the auxiliary-line generation section 11' having the construction described above is described with reference to FIGS. 9, 10(A) and 10(B). FIG. 9 is a flow chart (steps A1 to A3) illustrating the auxiliary line generation procedure by the auxiliary-line generation section 11', and FIGS. 10(A) and 10(B) illustrate the auxiliary line generation procedure by the auxiliary-line generation section 11'.

Figure 10A:
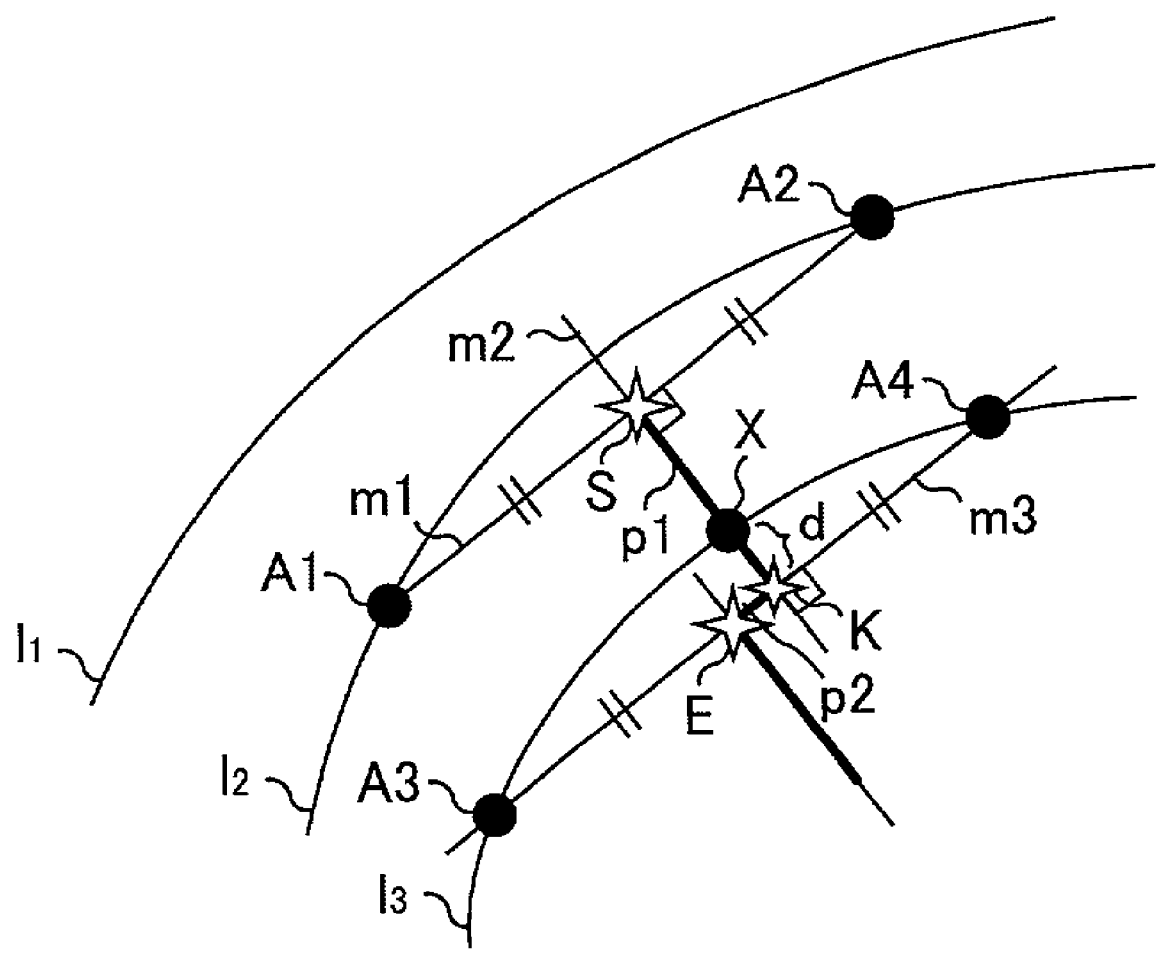
FIGS. 10(A) and 10(B) are diagrammatic views both illustrating an auxiliary-line generation method by the first modification to the auxiliary-line generation section shown in FIG. 8.
Figure 10B:
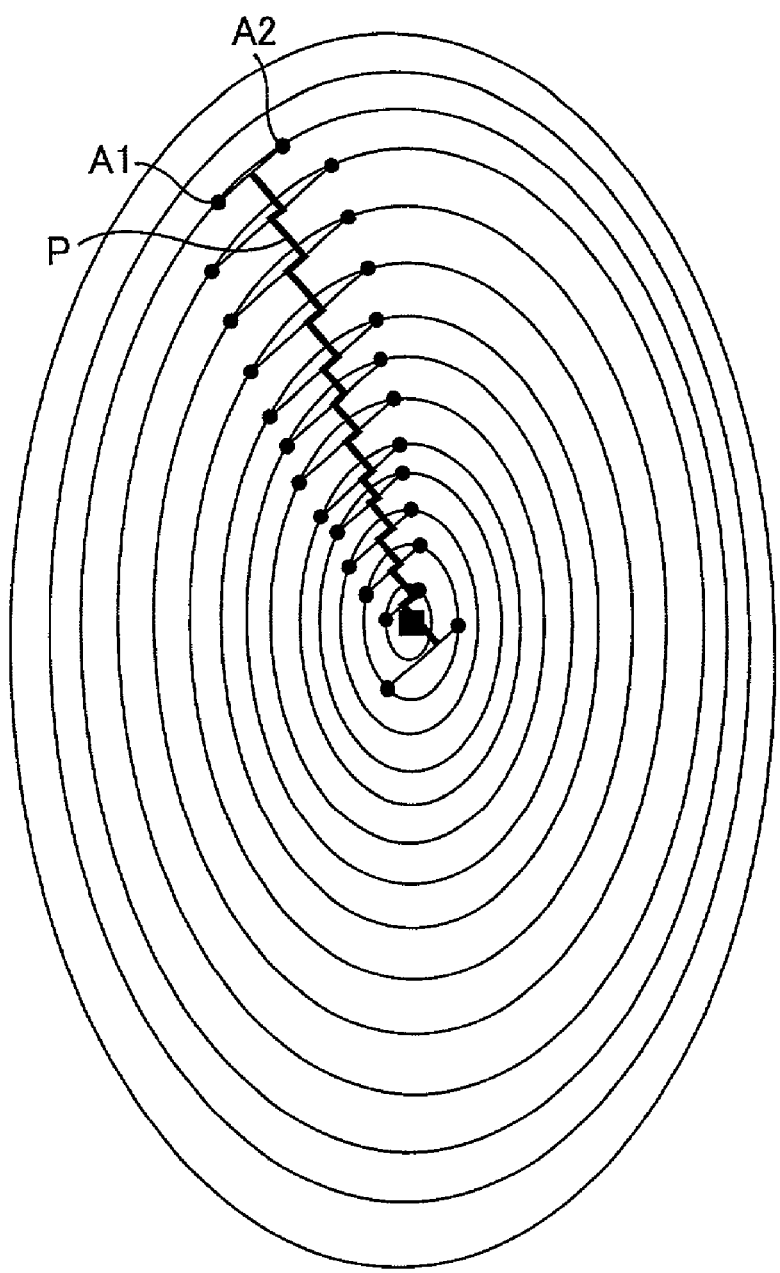

Referring first to FIG. 9, two arbitrary points on an arbitrary one of pattern curves which form a fingerprint-like pattern are set as two first auxiliary points A1 and A2 (refer to FIGS. 10(A) and 10(B)) by the first-auxiliary-point setting section 11'-1 (step C1). Preferably, the two arbitrary points to be set as the first auxiliary points A1 and A2 first are set to points included in the set of concentrically juxtaposed arcuate curves.

Then, the middle point of the two first auxiliary points A1 and A2 set in step C1 are calculated as a start point S (refer to FIG. 10 (A)) by the start-point calculation section 11'-2 (step A2).

Then, an auxiliary-line segment m1 (refer to FIG. 10(A)) interconnecting the two first auxiliary points A1 and A2 set in step C1 is generated by the auxiliary-line-segment generation section 11'-3 (step C3).

Further, a perpendicular bisector m2 (refer to FIG. 10(A)) to the auxiliary-line segment m1 generated in step C3 is generated by the perpendicular-bisector generation section 11'-4 (step C4).

Then, it is discriminated by the perpendicular-bisector-intersecting-point calculation section 11'-5 whether or not one or more intersecting points of the perpendicular bisector m2 generated in step C4 and the pattern curves $l_1$ to $l_3$ (refer to FIG. 10(A)) which form the fingerprint-like pattern are present on the particular side with respect to the start point S (step C5). If it is discriminated that such intersecting point or points are present, then the processing advances to a next step (YES route of step C5). Here, the particular direction signifies an advancing direction of an auxiliary line which passes in the proximity of the pattern center similarly as in the embodiment described hereinabove. It is to be noted that processing when it is discriminated that no such intersecting point is present is hereinafter described.

Further, the intersecting point X (refer to FIG. 10(A)) nearest to the start point S is calculated by the perpendicular-bisector-intersecting-point calculation section 11'-5 from among the intersecting points discriminated as being present on the particular side in step C5 (step C6).

Then, a point on the perpendicular bisector m2 spaced by a predetermined distance d to the particular side from the intersecting point X calculated in step C6 is calculated as a node K (refer to FIG. 10(A)) by the node calculation section 11'-6 (step C7).

Thereafter, a straight line m3 (refer to FIG. 10(A)) which passes the node K calculated in step C7 and intersects orthogonally with the perpendicular bisector m2 is generated by the straight-line generation section 11'-7 (step C8).

Further, those two of intersecting points of the straight line m3 generated in step C8 with the pattern curves $l_1$ to $l_3$ forming the fingerprint-like pattern which are nearest to the node K on the opposite sides of the node K are calculated as second auxiliary points A3 and A4 (refer to FIG. 10(A)) (step C9).

Then, the middle point of the two second auxiliary points A3 and A4 calculated in step C9 is calculated as an endpoint E (refer to FIG. 10(A)) by the end-point calculation section 11'-9 (step C10).

Finally, a first line segment p1 (refer to FIG. 10(A)) interconnecting the start point S calculated in step C2 and the node K calculated in step C7 is generated by the first-line-segment generation section 11'-10 (step C11). Further, a second line segment p2 (refer to FIG. 10(A)) interconnecting the node K calculated in step C7 and the end point E calculated in step C10 is generated by the second-line-segment generation section 11'-11 (step C12).

Thereafter, the two second auxiliary points A3 and A4 calculated in step C9 are re-set as two first auxiliary points A1 and A2 by the first-auxiliary-point setting section 11'-1 (step C13), and the processing in steps C2 to C13 described above is repeated so that the first line segment p1 and the second line segment p2 are repetitively generated alternately and successively. Consequently, an auxiliary line P (refer to FIG. 10(B)) is generated as a continuous set of the alternate first line segments p1 and second line segments p2.

On the other hand, if it is discriminated by the perpendicular-bisector-intersecting-point calculation section 11'-5 that no intersecting point is present between the perpendicular bisector m2 and the pattern curves $l_1$ to $l_3$ on the particular side with respect to the start point S, then the generation processing of the auxiliary line P being currently generated is ended (NO route in step C5).

A plurality of start points are set and the procedure described above is repeated for the start points. Consequently, two or more auxiliary lines are generated also by the auxiliary-line generation section 11' of the present modification similarly to the auxiliary-line generation section 11 in the embodiment described above. When a number of two or more auxiliary lines given in advance are generated, the auxiliary line generation processing is ended, and processing by the pattern-center determination section 12 in the next stage is started similarly as in the embodiment described above.

Figure 11:
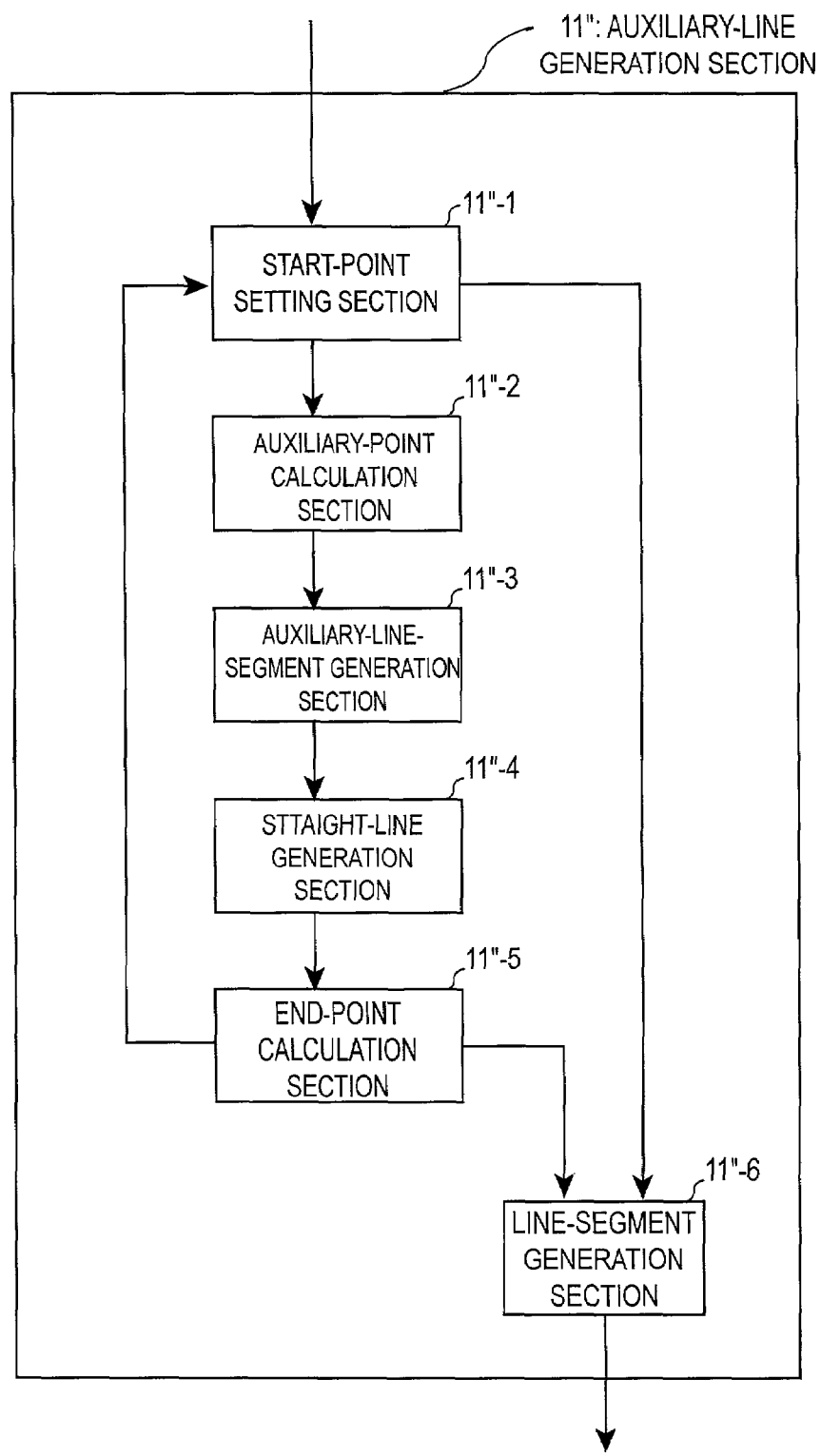
FIG. 11 is a block diagram showing a functional construction of a second modification to the auxiliary-line generation section of the pattern-center determination apparatus in the present embodiment.

FIG. 11 shows a functional construction of an auxiliary-line generation section 11" of the pattern-center determination apparatus 1 as a second modification to the embodiment described hereinabove. Thus, the pattern-center determination apparatus 1 may include the auxiliary-line generation section 11" shown in FIG. 11 in place of the auxiliary-line generation section 11 or 11' described hereinabove. Referring to FIG. 11, the auxiliary-line generation section 11" includes a start-point setting section 11"-1, an auxiliary-point calculation section 11"-2, an auxiliary-line-segment generation section 11"-3, a straight-line generation section 11"-4, an end-point calculation section 11"-5, and a line-segment generation section 11"-6.

It is to be noted that the other components of the pattern-center determination apparatus 1 in which the auxiliary-line generation section 11" of the present modification is provided are basically same as those of the pattern-center determination apparatus 1 of the embodiment described above, and therefore, overlapping description of them is omitted herein to avoid redundancy. Further, the pattern-center determination apparatus 1 in which the auxiliary-line generation section 11" of the modification is provided is implemented by the computer system 100 described hereinabove with reference to FIG. 2 similarly to the pattern-center determination apparatus 1 of the embodiment described hereinabove.

The start-point setting section 11"-1 sets an arbitrary point on an arbitrary one of pattern curves which form a fingerprint-like pattern as a start point. The auxiliary-point calculation section 11"-2 calculates two points which are on the pattern curve on which the start point set by the start-point setting section 11"-1 is present and are spaced away by a predetermined distance from the start point on the opposite sides of the start point along the pattern curve as auxiliary points. The auxiliary-line-segment generation section 11"-3 generates an auxiliary-line segment interconnecting the two auxiliary points calculated by the auxiliary-point calculation section 11"-2. The straight-line generation section 11"-4 generates a straight line which passes the start point set by the start-point setting section 11"-1 and intersects orthogonally with the auxiliary-line segment generated by the auxiliary-line-segment generation section 11"-3.

The end-point calculation section 11"-5 discriminates whether or not one or more intersecting points of the straight line generated by the straight-line generation section 11"-4 and the pattern curves which form the fingerprint-like pattern are present on the particular side with respect to the start point. Further, if the end-point calculation section 11"-5 discriminates that such one or more intersecting points are present, then it calculates one of the intersecting points which is nearest to the start point as an end point. However, if the end-point calculation section 11"-5 discriminates that no such intersecting point is present, then the current auxiliary line generation processing by the auxiliary-line generation section 11" is ended at this point of time. Further, the line-segment generation section 11"-6 generates a line segment which interconnects the start point set by the start-point setting section 11"-1 and the end point calculated by the end-point calculation section 11"-5.

The auxiliary-line generation section 11" has such a construction as described above and successively generates a line segment, whose start point is re-set from the endpoint of the precedently generated line segment by the start-point setting section 11"-1, by means of the auxiliary-point calculation section 11"-2, the auxiliary-line-segment generation section 11"-3, the straight-line generation section 11"-4, the end-point calculation section 11"-5 and the line-segment generation section 11"-6 thereby to generate an auxiliary line as a continuous set of line segments.

Further, the auxiliary-line generation section 11" ends the generation processing of a further auxiliary line after a given number of auxiliary lines equal to or greater than 2 are generated similarly to the auxiliary-line generation sections 11 and 11' of the embodiment and the first modification described above. Then, the auxiliary-line generation section 11" sends a result of the auxiliary line generation processing together with the fingerprint-like pattern of the object of processing to the pattern-center determination section 12 shown in FIG. 1.

Figure 12:
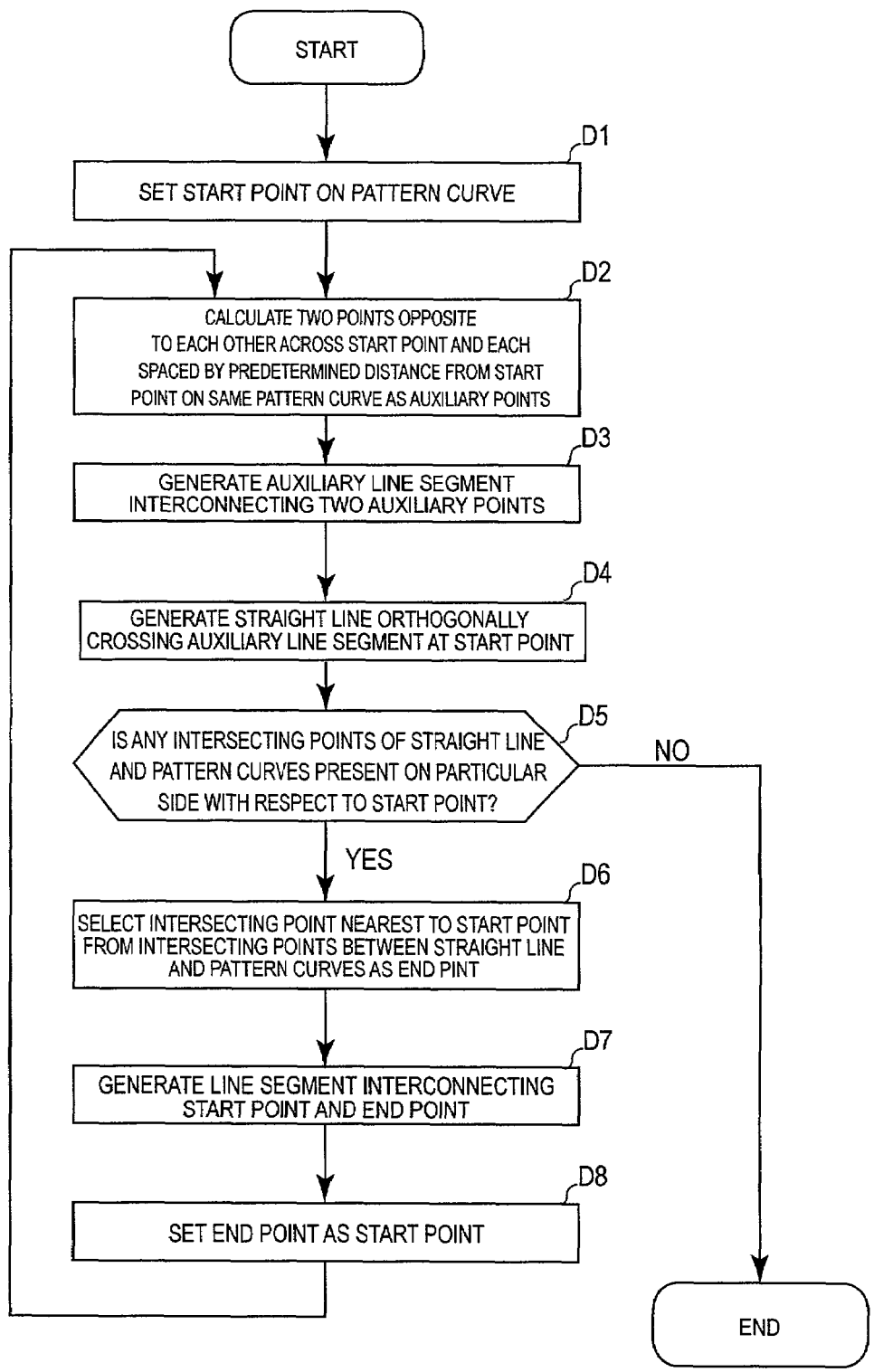
FIG. 12 is a flow chart illustrating an auxiliary-line generation procedure by the second modification to the auxiliary-line generation section shown in FIG. 11.

Here, an auxiliary line generation process by the auxiliary-line generation section 11" having the construction described above is described in detail with reference to FIGS. 12, 13(A) and 13(B). FIG. 12 is a flow chart (steps D1 to D8) illustrating the auxiliary line generation process by the auxiliary-line generation section 11", and FIGS. 13(A) and 13(B) illustrate the auxiliary line generation technique by the auxiliary-line generation section 11".

Figure 13A:
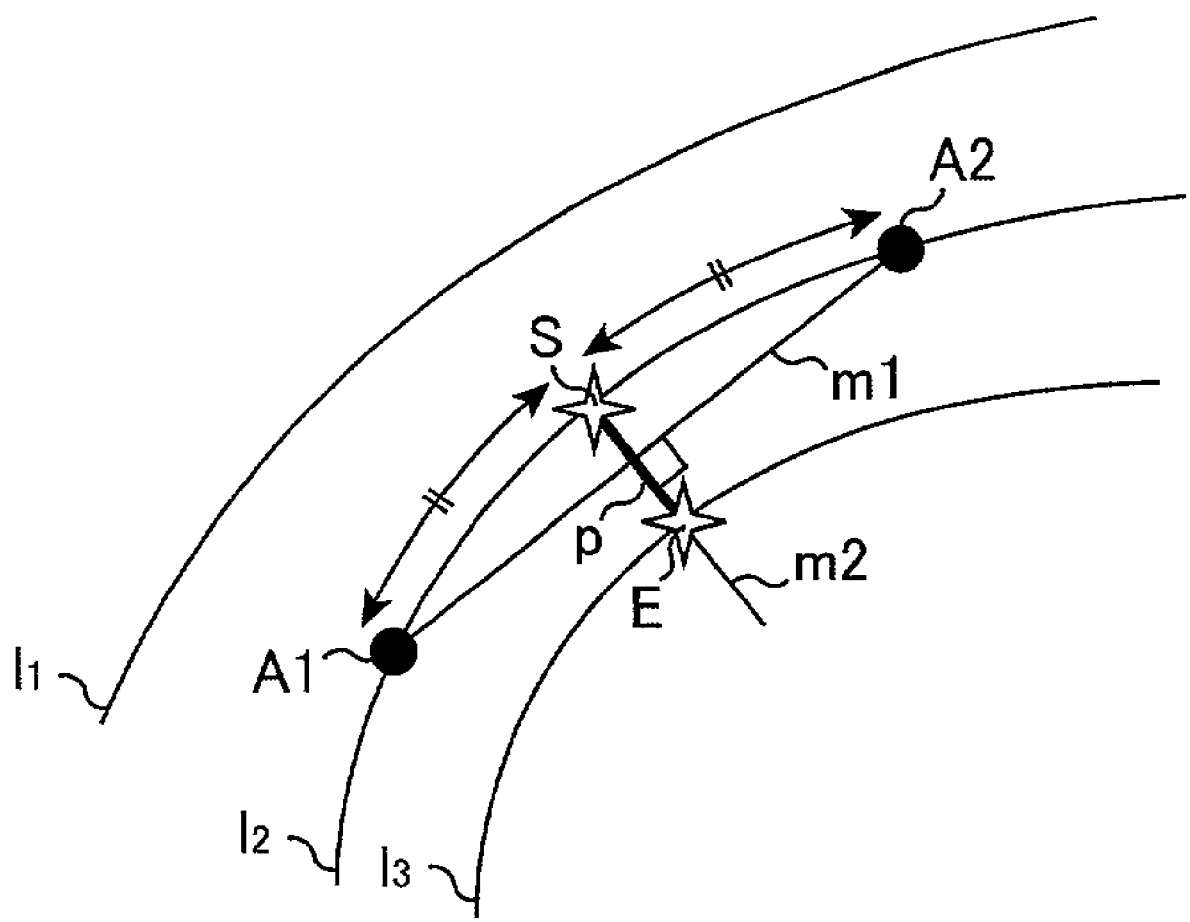
FIGS. 13(A) and 13(B) are diagrammatic views both illustrating an auxiliary-line generation method by the second modification to the auxiliary-line generation section shown in FIG. 11.
Figure 13B:
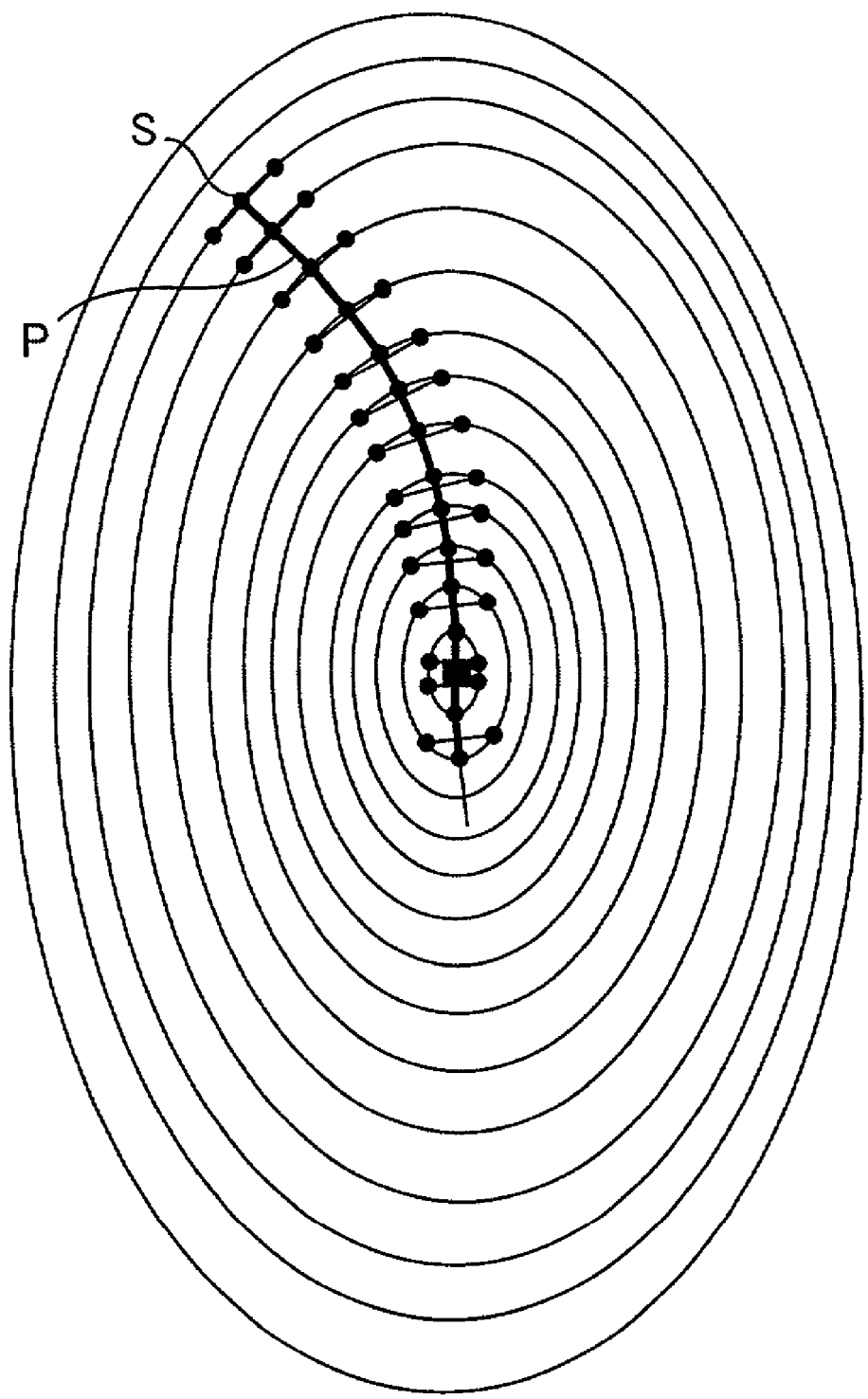

Referring particularly to FIG. 12, an arbitrary point on an arbitrary one (12 in FIG. 13(A)) of pattern curves which form a fingerprint-like pattern is set as a start point S (refer to FIGS. 13(A) and 13 (B)) by the start-point setting section 11"-1 (step D1). Here, the arbitrary point to be set as the start point first is preferably set to a point included in of a set of arcuate curves juxtaposed concentrically with each other similarly to the start point in the embodiment or the first auxiliary points in the first modification described hereinabove.

Then, two points which are present on the pattern curve $l_2$ on which the start point set in step d1 is present and are spaced away by a predetermined distance from the start point S on the opposite sides of the start point S along the pattern curve 12 are calculated as first auxiliary points A1 and A2 (refer to FIG. 13(A)) by the auxiliary-point calculation section 11"-2 (step D2).

Then, an auxiliary-line segment m1 (refer to FIG. 13(A)) which interconnects the two first auxiliary points A1 and A2 calculated in step D2 is generated by the auxiliary-line-segment generation section 11"-3 (step D3).

Further, a straight line m2 which passes the start point S set in step D1 and intersects orthogonally with the auxiliary-line segment m1 generated in step D3 (refer to FIG. 13 (A)) is generated by the straight-line generation section 11"-4 (step D4).

Thereafter, it is discriminated by the end-point calculation section 11"-5 whether or not one or more intersecting points of the straight line m2 generated in step D4 and the pattern curves $l_1$ to $l_3$ (refer to FIG. 13(A)) which form the fingerprint-like pattern are present on the particular side with respect to the start point S (step D5). If it is discriminated that such one or more intersecting points are present, then the processing advances to a next step (YES route of step D5). Here, the particular direction has the same signification as that of the embodiment described hereinabove. It is to be noted that processing when it is discriminated that no such intersecting point is present is hereinafter described.

Further, one of the intersecting points discriminated as being present on the particular side in step D5 which is nearest to the start point S is calculated as an end point E (refer to FIG. 13(A)) by the end-point calculation section 11"-5 (step D6).

Finally, a line segment p (refer to FIG. 13(A)) which interconnects the start point S set in step D1 and the end point E calculated in step D6 is generated by the line-segment generation section 11"-6 (step D7).

Thereafter, the end point E calculated in step D6 is re-set as a next start point S by the start-point setting section 11"-1 (step D8), and the processing in steps D2 to D8 described hereinabove is repeated to generate a line segment p described above continuously and repetitively. Consequently, an auxiliary line P (refer to FIG. 13) is generated as a continuous set of line segment p.

On the other hand, if it is discriminated by the end-point calculation section 11"-5 that no intersecting point of the straight line and the pattern curves is present on the particular side with respect to the start point S, then the generation processing for the auxiliary line being currently generated is ended (NO route of step D5).

A plurality of start points are set and the procedure described above is repeated for the start points. Consequently, two or more auxiliary lines are generated also by the auxiliary-line generation section 11" of the present modification similarly to the auxiliary-line generation section 11 of the embodiment described hereinabove and the auxiliary-line generation section 11' of the first modification described hereinabove. When the number of two or more auxiliary lines given in advance are generated, the auxiliary line generation processing is ended, and processing by the pattern-center determination section 12 in the next stage is started similarly as in the embodiment and the first modification described hereinabove.

With the pattern-center determination apparatus 1 having the auxiliary-line generation section 11' or 11" of the first or second modification described above, a first line segment p1 and a second line segment p2 are generated alternately and repetitively through a series of processes including calculation of a start point, generation of a perpendicular bisector, calculation of intersecting points of the perpendicular bisector, generation of a straight line, calculation of a second auxiliary point, calculation of an end point, generation of a first line segment and generation of a second line segment to generate an auxiliary line P as a set of such first line segments p1 and second line segments p2 which are connected alternately. Or, a line segment p is generated repetitively through a series of processes including calculation of an auxiliary point, generation of an auxiliary-line segment, generation of a straight line, calculation of an end point and generation of a line segment to generate an auxiliary line P as a continuous set of such line segments p. Therefore, an auxiliary line P can be generated by repetitions of a limited number of kinds of simple arithmetic operation, and consequently, the pattern center O can be determined at a high speed and with certainty through a reduced mount of calculation.

It is to be noted that, while the process for generation of an auxiliary line by the auxiliary-line generation sections 11, 11' and 11" described hereinabove includes a step for discrimination of whether or not generation of an auxiliary line should be ended (the step B4 of FIG. 5, step C5 of FIG. 9 and step D5 of FIG. 12), it may be constructed otherwise such that, in place of provision of the step B4, C5 or D5, generation of an auxiliary line is ended when an auxiliary line of a predetermined length is generated. This alternative construction can further simplify the construction of the auxiliary-line generation section 11, 11' or 11". Consequently, the manufacture cost for the pattern-center determination apparatus 1 can be reduced and the time required for the pattern center determination process can be reduced.

Although the three modifications which are different in construction of the auxiliary-line generation section 11 are described above, also a different modification which is different in construction of the pattern-center determination section 12 is possible. In particular, the pattern-center determination apparatus 1 of the embodiment described above may be modified such that two auxiliary lines are generated by one of the auxiliary-line generation sections 11, 11' and 11" described above and the pattern-center determination section 12 does not include the auxiliary-line-intersecting-point calculation section nor the most-crowded-point calculation section 122 but determines an intersecting point of the two auxiliary lines generated by the auxiliary-line generation section 11 as the pattern center O.

In the modified pattern-center determination apparatus 1 having the construction just described, when a fingerprint-like pattern which is an object of determination of the pattern center O is inputted, two auxiliary lines are first generated by the auxiliary-line generation section 11, 11' or 11". Then, an intersecting point of the two auxiliary lines is calculated and determined as the pattern center O by the pattern-center determination section 12.

Where an intersecting point of two auxiliary lines is determined as the pattern center O in this manner, the pattern center O can be determined at a high speed through a more simplified process.

[2] Pattern Direction Determination Apparatus as an Embodiment of the Invention

Figure 14:
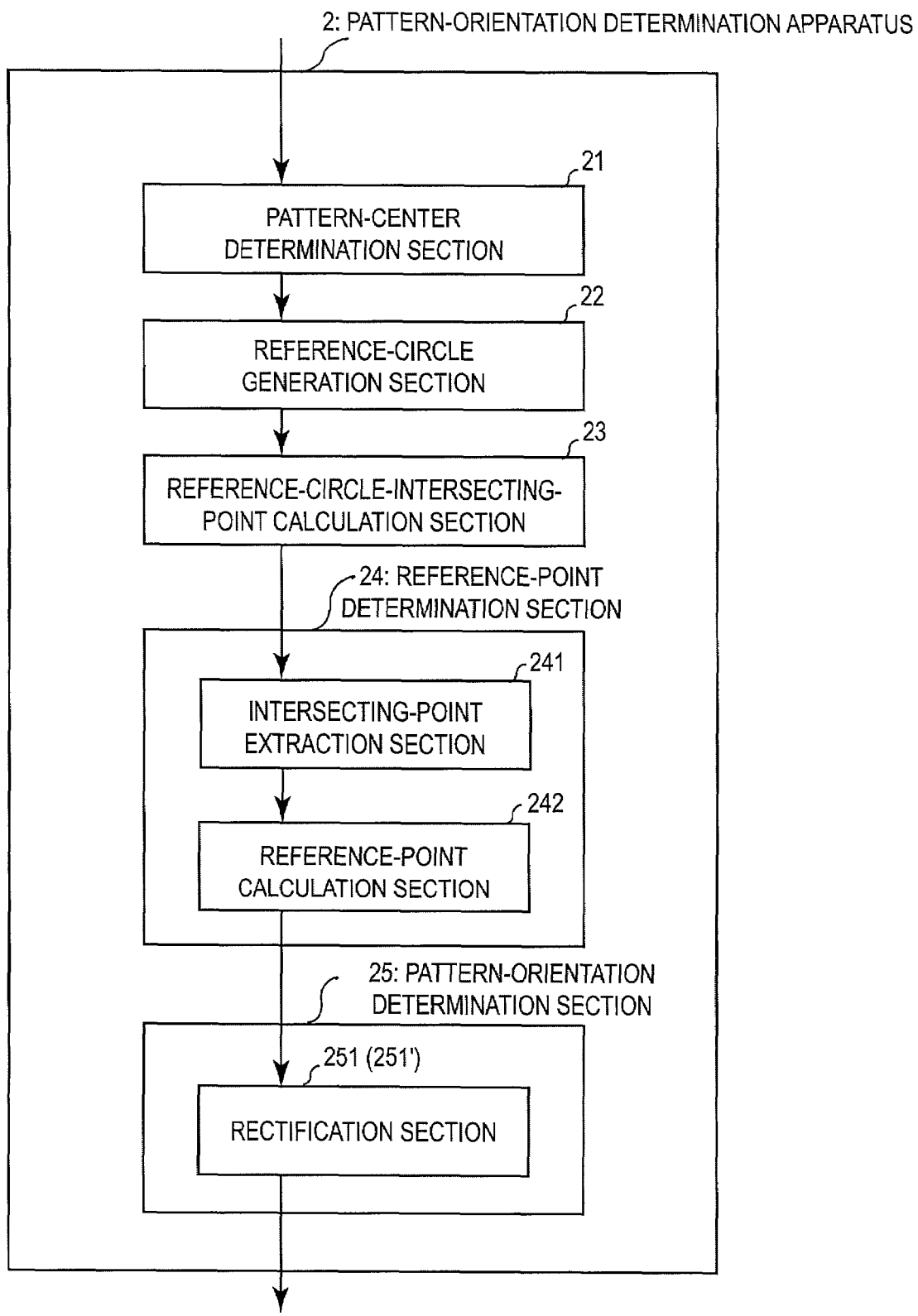
FIG. 14 is a block diagram showing a functional construction of a pattern-orientation determination apparatus as an embodiment of the present invention.

[2-1] Structure of the Pattern Direction Determination Apparatus of the Embodiment FIG. 14 shows a functional construction of a pattern-orientation determination apparatus as an embodiment of the present invention. Referring to FIG. 14, the pattern-orientation determination apparatus 2 of the present embodiment shown includes a pattern-center determination section 21, a reference-circle generation section 22, a reference-circle-intersecting-point calculation section 23, a reference-point determination section 24, and a pattern-orientation determination section 25.

The pattern-orientation determination apparatus 2 of the present embodiment is implemented by a computer system such as the computer system 100 shown in FIG. 2 similarly to the pattern-center determination apparatus 1 of the embodiment of the present invention described hereinabove. Also functions of the pattern-center determination section 21, the reference-circle generation section 22, the reference-circle-intersecting-point calculation section 23, the reference-point determination section 24 and the pattern-orientation determination section 25 of the pattern-orientation determination apparatus 2 are implemented by a CPU or the like which executes an application program stored on a storage medium similarly to those of the components of the pattern-center determination apparatus 1 described hereinabove.

The pattern-orientation determination apparatus 2 shown in FIG. 14 is incorporated, for example, in a system which performs personal authentication using biometric information or a like system and determines a reference orientation (hereinafter referred to as pattern orientation) of a fingerprint-like pattern as biometric information.

Here, the orientation of a fingerprint-like pattern can be defined as a orientation (direction) which corresponds to the major axis of concentrical elliptic arcs of a set of arcuate curves juxtaposed substantially concentrically with each other. Naturally, this definition as well is not necessarily precise because it is influenced by dispersion in shape of the fingerprint-like pattern similarly to the definition of the pattern center given hereinabove. However, since the pattern orientation as well can be defined decisively for the same fingerprint-like pattern, it can be determined always as a substantially same orientation. Since the pattern orientation determined by the present embodiment is utilized for aligning of two fingerprint-like patterns, if it is determined usually as a substantially same orientation for the same fingerprint-like pattern, then the functions can be sufficiently achieved therewith.

Similarly to a fingerprint-like pattern which is an object of determination of the pattern center by the pattern-center determination apparatus 1 of the embodiment of the present invention described hereinabove, also a fingerprint-like pattern which is an object of determination of the pattern orientation by the pattern-orientation determination apparatus 2 of the present embodiment is picked up in the form of a fingerprint image by the scanner 105 and inputted to the computer system 100, that is, the pattern-orientation determination apparatus 2, when the pattern image inputting program is executed by the CPU 100-1. Or alternatively, a fingerprint-like pattern is provided in the form of a fingerprint image or pattern data through the communication network 106, the external storage apparatus 107 or the recording medium drive 108 and inputted to the computer system 100, that is, the pattern-orientation determination apparatus 2.

In the pattern-orientation determination apparatus 2 of FIG. 14 having such a construction as described above, the pattern-center determination section 21 determines the center (which may be hereinafter referred to as pattern center or fingerprint center) of the fingerprint-like pattern which is the object of determination of the pattern orientation. The pattern-center determination section 21 may be, for example, the pattern-center determination apparatus 1 described hereinabove with reference to FIGS. 1 to 13.

The reference-circle generation section 22 generates a reference circle of a predetermined radius centered at the pattern center determined by the pattern-center determination section 21. The reference-circle-intersecting-point calculation section 23 calculates intersecting points of the reference circle generated by the reference-circle generation section 22 and pattern curves which form the fingerprint-like pattern.

The reference-point determination section 24 determines a reference point for indication of the pattern orientation based on a relationship between the directions of the reference circle and the directions of the pattern curves at the intersecting points calculated by the reference-circle-intersecting-point calculation section 23. The reference-point determination section 24 includes an intersecting-point extraction section 241 and a reference-point calculation section 242.

The intersecting-point extraction section 241 extracts those two of the intersecting points calculated by the reference-circle-intersecting-point calculation section 23 which satisfy a predetermined condition. The intersecting-point extraction section 241 includes a normal-direction-to-reference-circle calculation section 241-1, a tangential-direction-to-pattern-curve calculation section 241-2, and an angle-difference calculation section 241-3 as shown in FIG. 15 which shows a functional construction of the intersecting-point extraction section 241 in the present embodiment.

Figure 15:
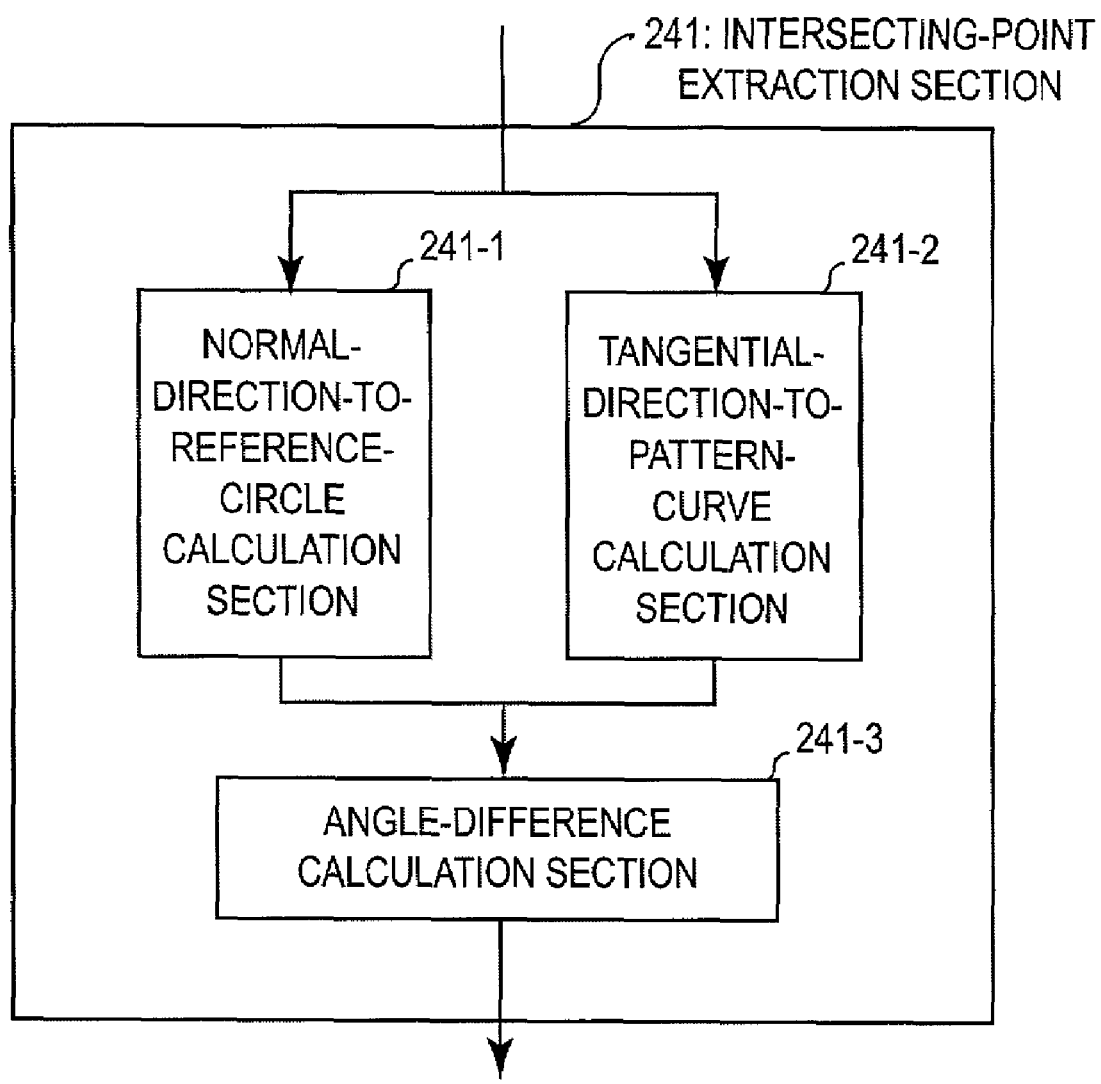
FIG. 15 is a block diagram showing a functional construction of an intersecting-point extraction section of the pattern-center determination apparatus in the embodiment.

Referring to FIG. 15, the normal-direction-to-reference-circle calculation section 241-1 calculates the normal direction to the reference circle at each of those of the intersecting points calculated by the reference-circle-intersecting-point calculation section 23 which are present on the particular side with respect to the pattern center as a vector. The tangential-direction-to-pattern-curve calculation section 241-2 calculates the tangential direction to each of the pattern curves at each of those of the intersecting points calculated by the reference-circle-intersecting-point calculation section 23 which are present on the particular side with respect to the pattern center as a vector. The angle-difference calculation section 241-3 calculates the angle difference between the normal direction calculated by the normal-direction-to-reference-circle calculation section 241-1 and the tangential direction calculated by the tangential-direction-to-pattern-curve calculation section 241-2 at each of the intersecting points which is present on the particular side with respect to the pattern center.

In the following description of the present embodiment, the particular side signifies one of the opposite directions along the major axis of an elliptical concentric arc formed from a pattern curve of a fingerprint-like pattern, and if the pattern curve flows in one direction along the major axis, then the particular side signifies the direction. For example, if the fingerprint-like pattern is a fingerprint, then the major axis of an elliptical concentric arc is directed along the direction of the finger. Further, since fingerprint curves usually flow toward the root of the finger, the finger root side is the particular side.

The intersecting-point extraction section 241 has such a construction as described above and extracts two intersecting points from among the intersecting points calculated by the reference-circle-intersecting-point calculation section 23 based on the angle differences calculated by the angle-difference calculation section 241-3.

Referring back to FIG. 14, the reference-point calculation section 242 calculates the middle point of the two intersecting points extracted by the intersecting-point extraction section 241 as a reference point.

Further, the pattern-orientation determination section 25 determines the pattern orientation based on the pattern center determined by the pattern-center determination section 21 and the reference point determined by the reference-point determination section 24 and is particularly characterized in that it determines the direction of a reference straight line passing the pattern center and the reference point as the pattern orientation. The pattern-orientation determination section 25 includes a rectification section 251.

The rectification section 251 corrects the position of the pattern center based on pattern curves present around or in the proximity of the pattern center. The pattern-orientation determination section 25 generates a reference straight line which passes the position of the pattern center corrected by the rectification section 251, that is, the corrected position of the pattern center, and the reference point determined by the reference-point determination section 24, and determines the direction of the reference straight line as the pattern orientation. More particularly, the rectification section 251 detects the direction of a pattern curve adjacent the pattern center in the proximity of the pattern center, generates a straight line which extends perpendicularly to the detected direction and passes the fingerprint center, determines two intersecting points of the generated straight line and two pattern curves adjacent to and on the opposite sides of the fingerprint center, determines the middle point of the two intersecting points as the corrected position of the pattern center, and allows the pattern-orientation determination section 25 to perform generation of a reference straight line which passes the corrected position and the reference point and determination of the pattern orientation.

[2-2] Operation of the Pattern Direction Determination Apparatus of the Embodiment Now, a pattern orientation determination procedure executed by the pattern-orientation determination apparatus 2 of the present embodiment, that is, a pattern orientation determination procedure of the present embodiment, is described with reference to a flow chart (steps E1 to E6) of FIG. 16.

When a fingerprint-like pattern which is an object of determination of the pattern center is inputted in the form of such a pattern image or image data as described hereinabove to the pattern-orientation determination apparatus 2 of the present embodiment, the center (pattern center, fingerprint center) of the fingerprint-like pattern is determined by the pattern-center determination section 21 (step E1). Then, a reference circle of a predetermined radius centered at the pattern center determined in step E1 is formed by the reference-circle generation section 22 (step E2).

Figure 17:
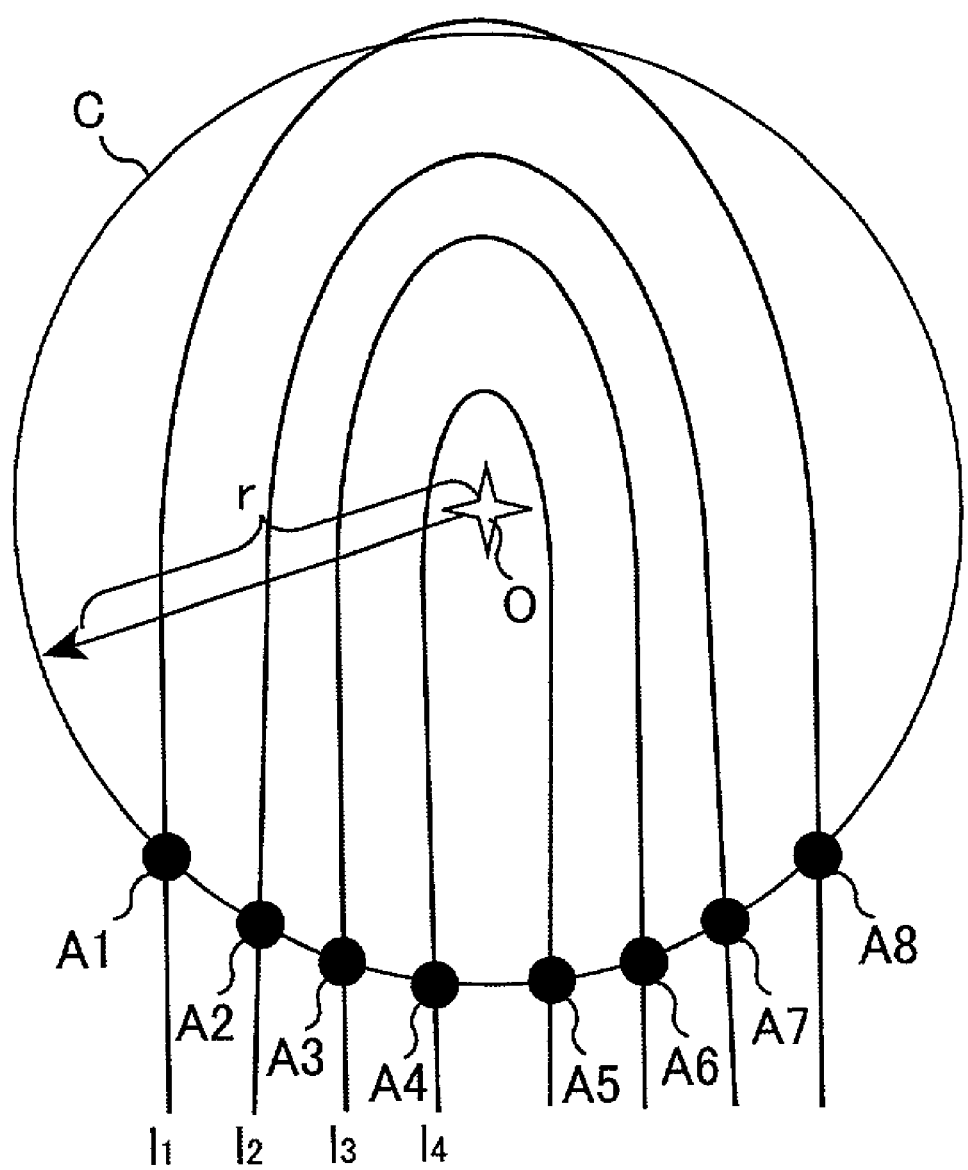
FIG. 17 is a diagrammatic view illustrating an intersecting-point extraction method by the intersecting-point extraction section shown in FIG. 15.

Then, intersecting points of the reference circle generated in step E2 and pattern curves which form the fingerprint-like pattern are calculated by the reference-circle-intersecting-point calculation section 23 (step E3). Referring here to FIG. 17 which illustrates an intersecting point extraction method of the present embodiment, eight intersecting points A1 to A8 are calculated as intersecting points of the reference circle C of the predetermined radius r generated in step E2 and centered at the pattern center O determined in step E1 and the pattern curves $l_1$ to $l_4$ which form the fingerprint-like pattern.

Further, a reference point for indication of the pattern orientation is determined based on the relationship between the directions of the reference circle and the tangential directions of the pattern curves at the intersecting points calculated in step E3 by the reference-point determination section 24 (step E4).

More particularly, those two of the intersecting points A1 to A8 calculated in step E3 which satisfy a predetermined condition are extracted by the intersecting-point extraction section 241.

Figure 18:
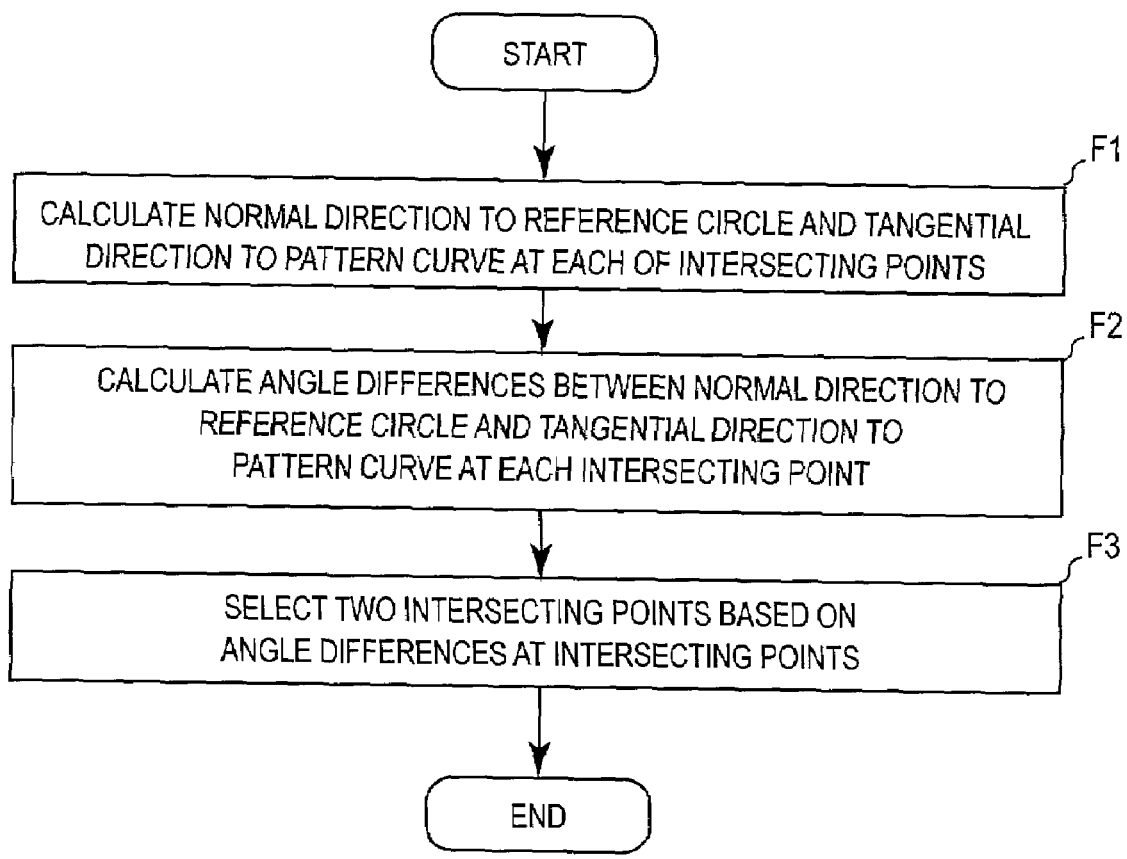
FIG. 18 is a flow chart illustrating an intersecting-point extraction procedure by the intersecting-point extraction section shown in FIG. 15.
Figure 19:
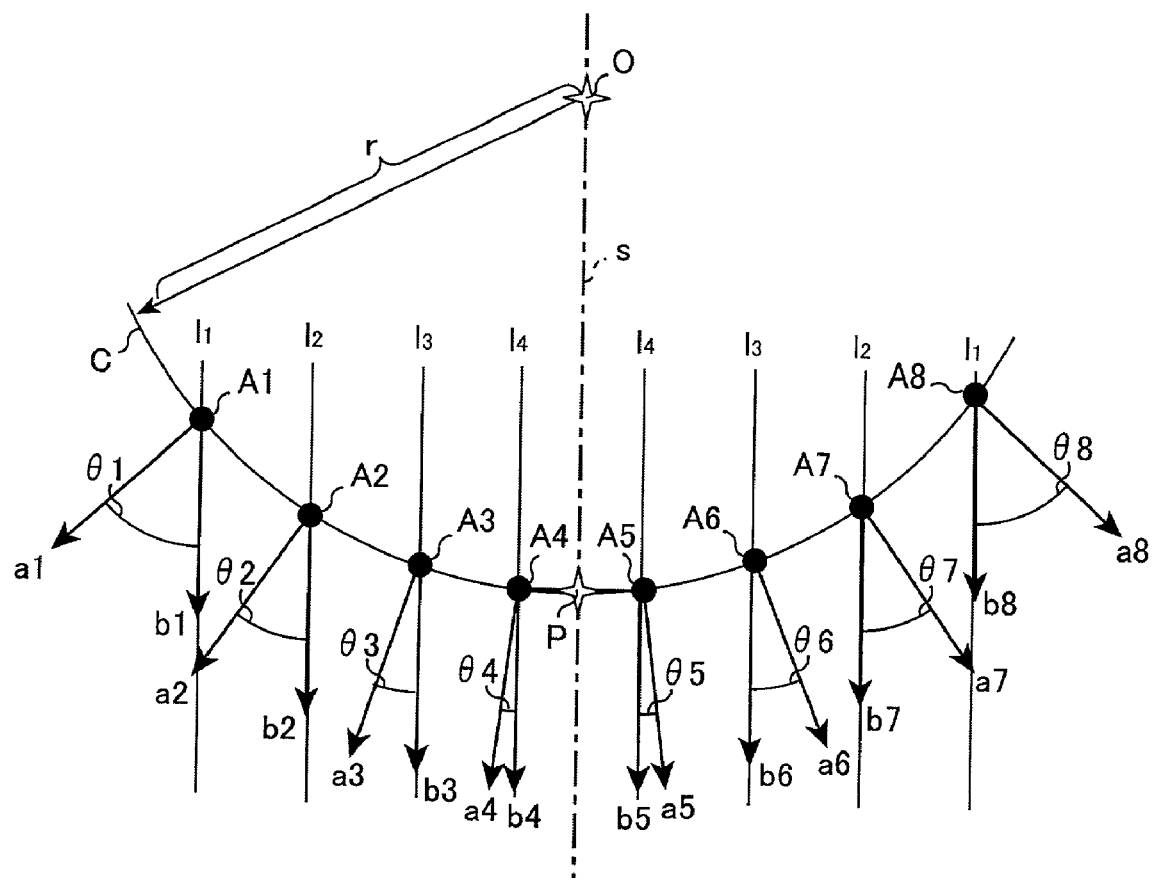
FIG. 19 is a diagrammatic view illustrating the intersecting-point extraction method by the intersecting-point extraction section shown in FIG. 15.

Here, extraction means for intersecting points by the intersecting-point extraction section 241 is described in detail with reference to FIGS. 18 and 19 in addition to FIGS. 16 and 17. FIG. 18 is a flow chart illustrating an intersecting point extraction procedure by the intersecting-point extraction section 241, and FIG. 19 is a diagrammatic view illustrating the intersecting point extraction procedure by the intersecting-point extraction section 241 of FIG. 15.

Figure 16:
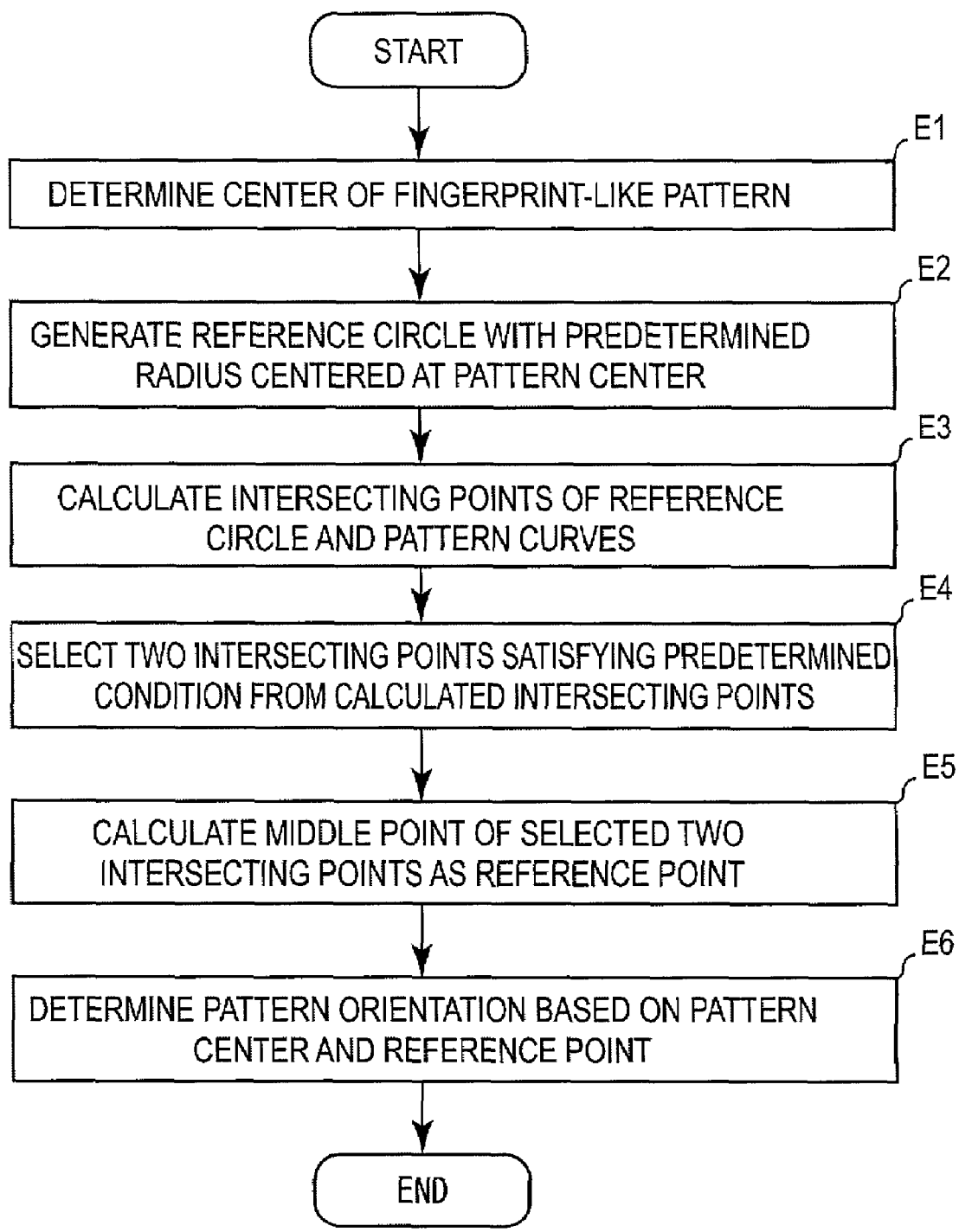
FIG. 16 is a flow chart illustrating a pattern-orientation determination procedure of the embodiment.

First, normal directions (directions represented by vectors a1 to a8 of FIG. 19) to the reference circle C at the intersecting points A1 to A8 calculated in step E3 of FIG. 16 and present on the particular side with respect to the pattern center O are calculated by the normal-direction-to-reference-circle calculation section 241-1 and tangential directions (directions indicated by vectors b1 to b8 of FIG. 19) to the pattern curves $l_1$ to $l_4$ are calculated by the tangential-direction-to-pattern-curve calculation section 241-2 as seen from FIG. 18 (step F1).

Then, angle differences θ1 to θ8 (refer to FIG. 19) between the normal directions a1 to a8 to the reference circle C and the tangential directions b1 to b8 to the pattern curves $l_1$ to $l_4$ at the intersecting points A1 to A8 calculated in step F1 are calculated by the angle-difference calculation section 241-3 (step F2).

Then, two ones of the intersecting points A1 to A8 calculated in step F2 are extracted based on the angle differences θ1 to θ8 at the intersecting points A1 to A8 by the intersecting-point extraction section 241 (step F3). More particularly, the two intersecting points A4 and A5 (refer to FIG. 19) having the two smallest angle differences θ4 and θ5 are selected from among the intersecting points A1 to A8.

The middle point of the two intersecting points A4 and A5 selected in this manner is calculated as a reference point P by the intersecting-point extraction section 241 as seen in FIG. 19 (step E5).

After the reference point P is calculated through the procedure described above, a reference straight line s is generated finally based on the pattern center O determined in step E1 and the auxiliary line P determined in step E5 by the pattern-orientation determination section 25, and the direction of the reference straight line s is determined as the pattern orientation (step E6).

It is to be noted that, in the present embodiment, when the pattern orientation is determined in step E6, if necessary, the position of the pattern center O is corrected based on a pattern curve present around the pattern center O by the rectification section 251, and the direction of a reference straight line which passes the position of the pattern center after the rectification and the auxiliary line P is determined as the pattern orientation.

Here, the necessity for such rectification upon determination of the pattern orientation is described with reference to FIGS. 20(A) and 20(B) which illustrate an influence which an error which appears upon determination of the pattern center has on the determination of the pattern orientation.

Figure 20A:
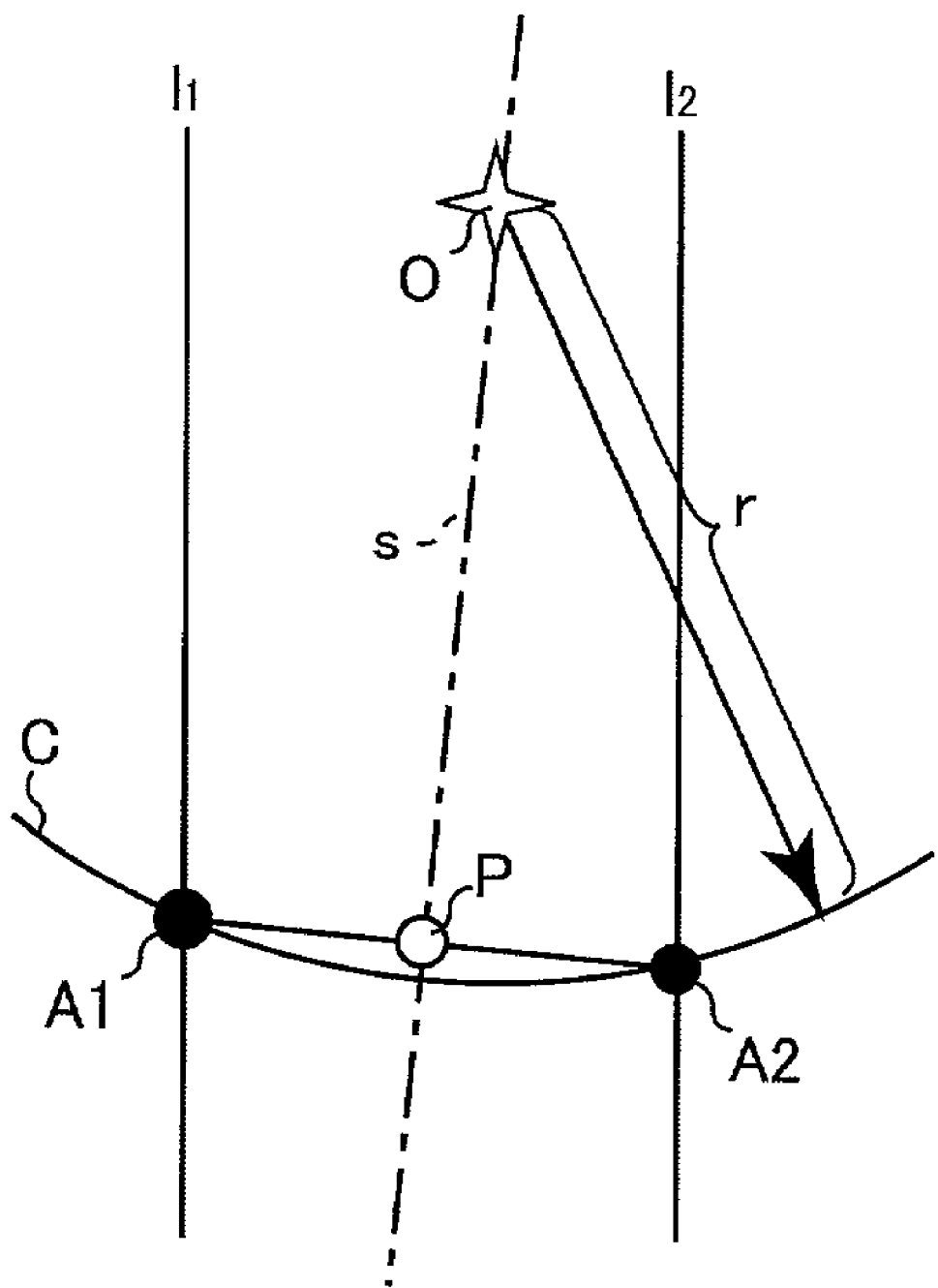
FIGS. 20(A) and 20(B) are diagrammatic views both illustrating how an error in determination of a pattern center would affect determination of a pattern orientation.
Figure 20B:
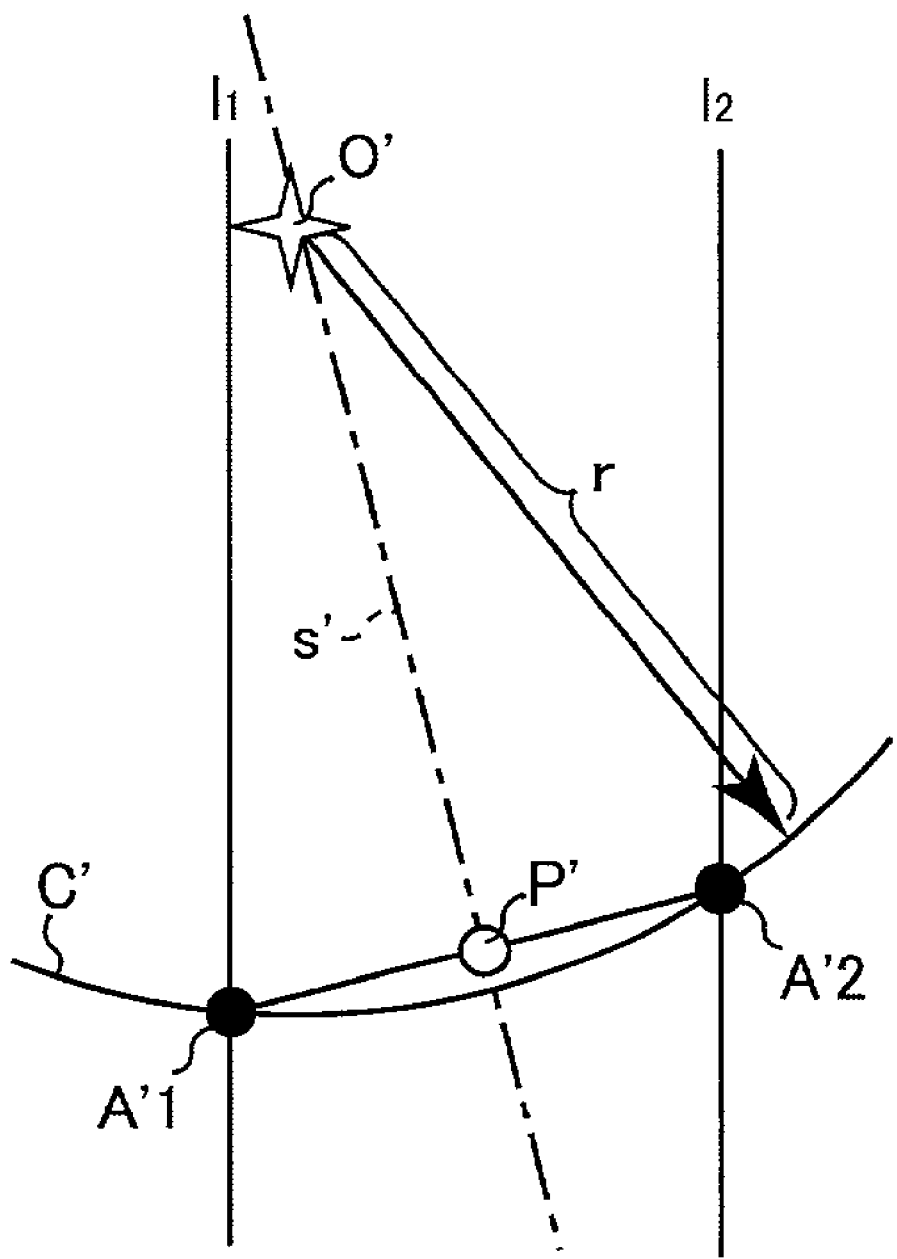

In FIGS. 20(A) and 20(B), because an error appears in determination of the pattern center for the same two fingerprint-like patterns, the pattern centers O and O' are determined at positions a little displaced from each other between two adjacent pattern curves $l_1$ and $l_2$. If generation of the reference circles C and C' by the reference-circle generation section 22, calculation of the intersecting points A1, A2 and A'1, A'2 between the reference circles C and C' and the pattern curves $l_1$ and $l_2$ by the reference-circle-intersecting-point calculation section 23, determination of the reference points P and P' by the reference-point determination section 24, and determination of the reference straight lines s and s' as references for the pattern orientation by the pattern-orientation determination section 25 are successively performed based on the pattern centers O and O', then the error of the pattern centers O and O' has an influence on the error of the inclinations of the reference straight lines s and s'. This influence is particularly significant where the radius r of the reference circles C and C' generated by the reference-circle generation section 22 is small. Therefore, where the radius r of the reference circles C and C' is smaller than a predetermined value, rectification of the position of the pattern center is performed by the rectification section 251.

Figure 21:
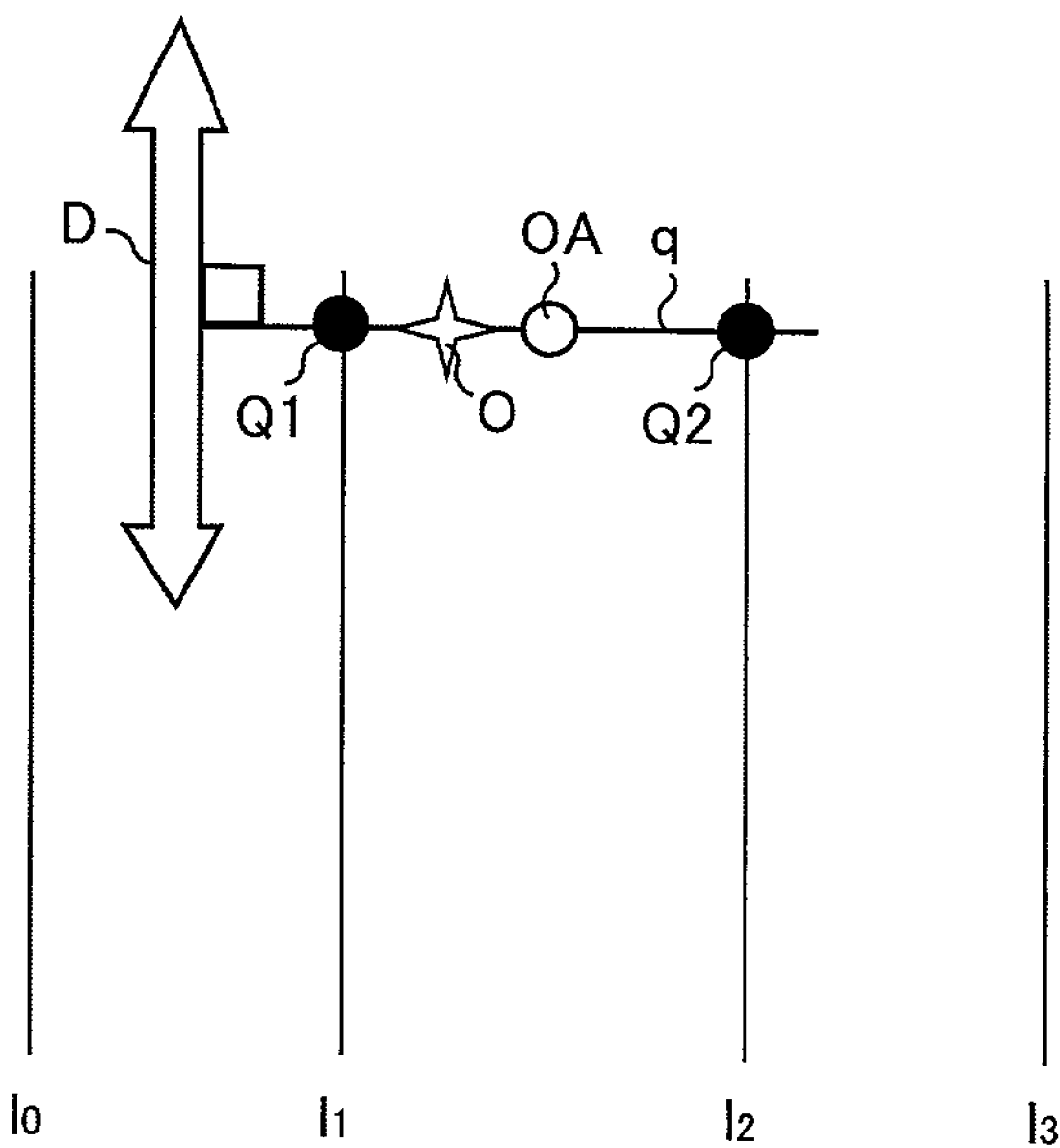
FIG. 21 is a diagrammatic view illustrating a rectification procedure of a pattern orientation by a rectification section shown in FIG. 14.

Here, a particular rectification procedure of the pattern orientation by the rectification section 251 is described with reference to FIG. 21.

After the pattern center O is determined by the pattern-center determination section 21, the direction (in FIG. 21, the direction represented by a vector D) in the proximity of the pattern center O regarding the pattern curves $l_0$ to $l_3$ in the proximity of the pattern center O is calculated by the rectification section 251. The direction D is determined by setting an arbitrary point on each of the pattern curves $l_0$ to $l_3$ at a place in the proximity of the pattern center O, calculating the tangential directions of the pattern curves $l_0$ to $l_3$ at the points and averaging the calculated directions.

Then, a straight line q which extends perpendicularly to the direction D and passes the pattern center O is generated by the rectification section 251. Further, intersecting points Q1 and Q2 between the thus generated straight line q and the two pattern curves $l_1$ and $l_2$ on the opposite sides of and adjacent the pattern center O are calculated, and the middle point of the two intersecting points Q1 and Q2 is determined as a corrected position OA of the pattern center.

Thereafter, generation of a reference circle by the reference-circle generation section 22, calculation of intersecting points of the reference circle and the pattern curves by the reference-circle-intersecting-point calculation section 23, determination of a reference point by the reference-point determination section 24 and determination of a reference straight line which is used as a reference for the pattern orientation by the pattern-orientation determination section 25 are successively performed using the corrected position OA of the pattern center.

If rectification of the pattern center is performed in accordance with the procedure described above, then even when the accuracy in determination of the pattern center by the pattern-center determination section 21 is not very high, that is, even when some error appears upon determination of the pattern center for the same two fingerprint-like patterns, the pattern orientation can be determined with a high degree of accuracy.

Figure 22:
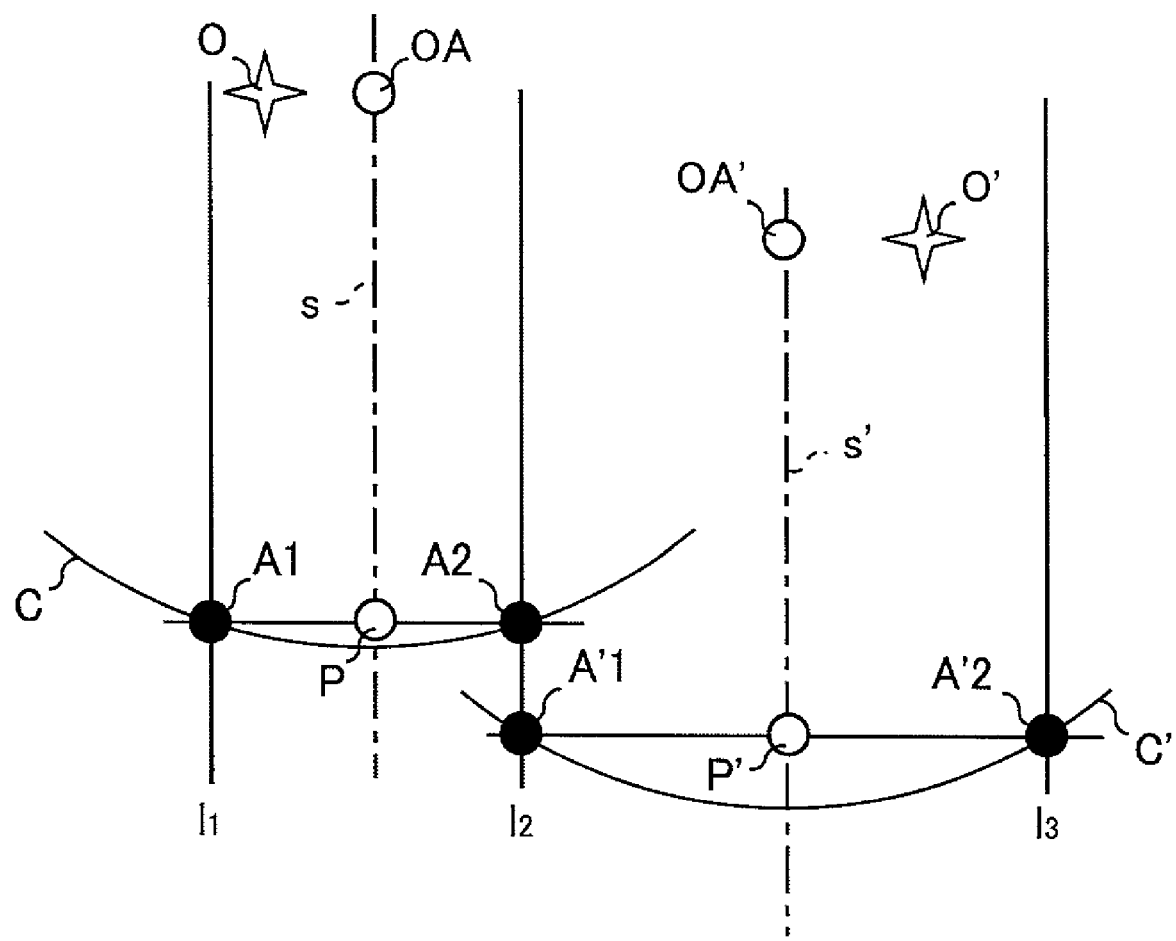
FIG. 22 is a view illustrating an effect of rectification of a pattern orientation by the rectification section shown in FIG. 14.

Here, an effect of the rectification of the pattern orientation by the rectification section 251 is described with reference to FIG. 22. In FIG. 22, an error appears upon determination of the pattern center for the same two fingerprint-like patterns, and therefore, the pattern centers O and O' are determined at two positions spaced by a distance greater than the distance between each two adjacent ones of pattern curves $l_1$, $l_2$ and $l_3$. In this state, the directions of reference straight lines which pass the pattern centers O and O' and the reference points P and P', respectively, become quite different from each other.

If rectification is performed for the pattern centers O and O' to calculate new pattern positions OA and OA' by the rectification section 251, then the corrected pattern positions OA and OA' still exist at positions spaced away from each other. However, if generation of reference circles C and C' by the reference-circle generation section 22, calculation of intersecting points A1, A2 and A'1, A'2 between the reference circles C and C' and the pattern curves $l_1$, $l_2$ and $l_3$ by the reference-circle-intersecting-point calculation section 23, determination of the reference points P and P' by the reference-point determination section 24 and determination of reference straight lines which are each used as a reference for the pattern orientation by the pattern-orientation determination section 25 are successively performed based on the corrected pattern positions OA and OA', then the pattern orientations represented by the determined reference curves s and s' substantially coincide with each other.

In other words, although the existing positions of the reference straight lines s and s' obtained by the rectification by the rectification section 251 are different from each other, the directions (pattern orientations) of the reference straight lines s and s' substantially coincide with each other. Accordingly, the pattern orientation determined in such a manner as described above can sufficiently satisfy the function as a reference to determination of the rotation shift for aligning of the two fingerprint-like patterns. Further, where rectification by the rectification section 251 is performed, the pattern orientation can be determined with a high degree of accuracy irrespective of the accuracy of the position of each of the pattern centers O and O'.

In this manner, since the pattern-orientation determination apparatus 2 and the pattern orientation determination procedure of the present embodiment generate a reference circle C of a predetermined radius centered at the pattern center O, determine a reference point P for indication of the pattern orientation based on the relationship between the directions of the reference circle C and the directions of pattern curves at intersecting points of the reference circle C and the pattern curves and determine the pattern orientation based on the reference point P and the pattern center O, the pattern orientation which is used as a reference to the direction common to individual fingerprint-line pattern images can be determined at a high speed and with certainty through repetitions of simple arithmetic operation for local configurations of the fingerprint-like patterns.

Further, since the middle point of those two of intersecting points of the reference circle C and the pattern curves which satisfy the predetermined condition as the reference point P, the reference point P can be determined with certainty through simple arithmetic operation. In this instance, since the two intersecting points are extracted based on the angle differences between the normal directions to the reference circle C and the tangential directions to the pattern curves at the intersecting points, the two intersecting points which are used for calculation of the reference point P can be determined with certainty through simple arithmetic operation. Therefore, determination of the pattern orientation can be performed at a higher speed and with certainty.

Furthermore, since, upon determination of the pattern orientation, the pattern center O is corrected based on the directions of the pattern curves in the proximity of the pattern center O and the direction of the reference straight line which passes the corrected position of the pattern center O and the reference point P is determined as the pattern orientation, even where there is the possibility that an error of the pattern orientation may be caused by an error of the pattern center O or the like, the pattern orientation can be determined with a very high degree of accuracy by adding simple arithmetic operation.

Further, since the direction of the reference straight line s which passes the pattern center O and the reference point P is determined as the pattern orientation, the pattern orientation can be determined with certainty by simple arithmetic operation.

In addition, since the pattern-center determination section 21 makes use of local pattern orientations to generate two or more auxiliary lines (refer to, for example, P and P1 to P3 of FIG. 6(B)) and determines the pattern center O based on the auxiliary lines, contents of the determination processing for the pattern center O can be limited to repetitions of simple arithmetic operation for the local configurations of the fingerprint-like pattern. Accordingly, the pattern center O can be determined at a high speed and with certainty, and consequently, the amount of calculation required for the determination processing of the pattern orientation can be reduced significantly.

[Others]

Figure 23:
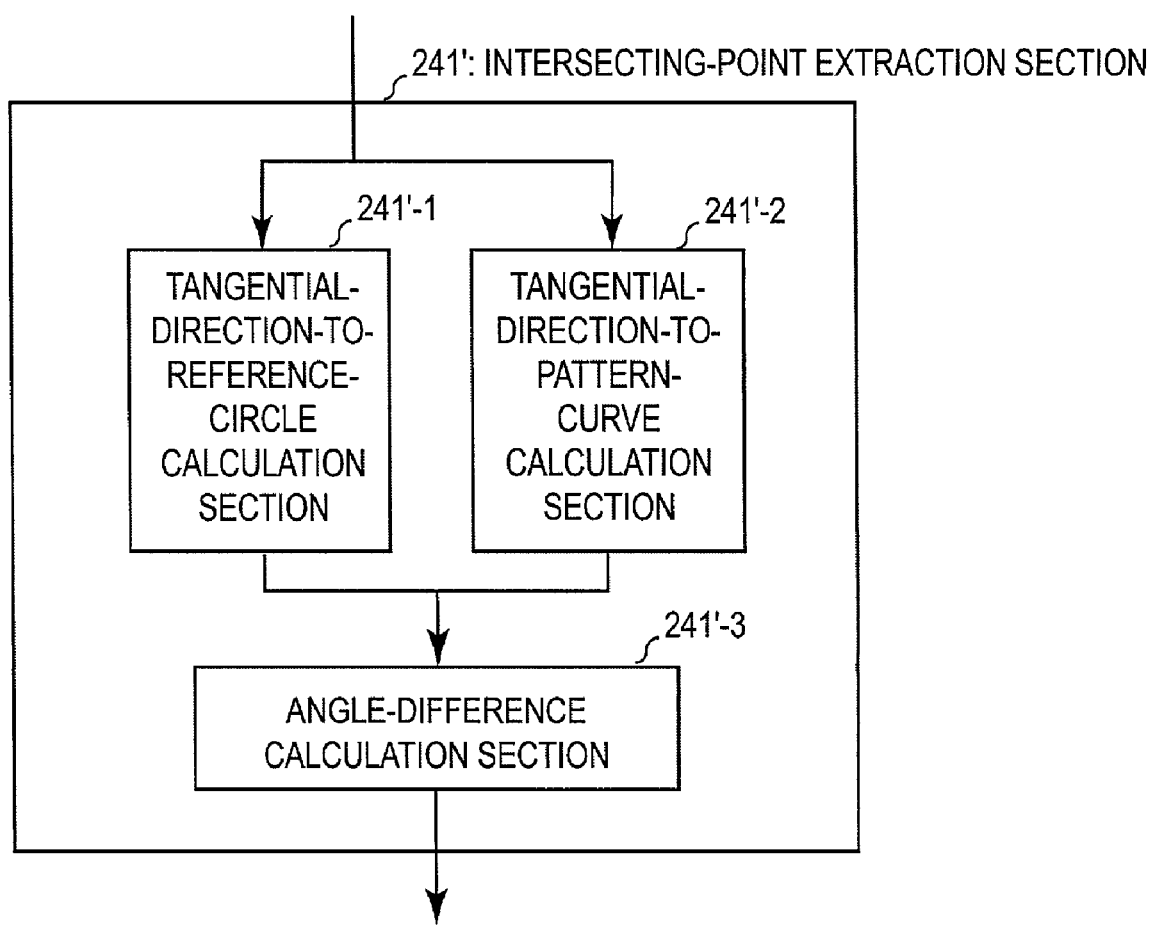
FIG. 23 is a block diagram showing a functional construction of a modification to the intersecting-point extraction section of the pattern-orientation determination apparatus of the present embodiment.

FIG. 23 is a block diagram showing a functional construction of a modification to the intersecting-point extraction section of the pattern-orientation determination apparatus of the present embodiment. In other words, the intersecting-point extraction section 241' shown in FIG. 23 may be provided in the pattern-orientation determination apparatus 2 in place of the intersecting-point extraction section 241 described herein above. Referring to FIG. 23, the intersecting-point extraction section 241' shown includes a tangential-direction-to-reference-circle calculation section 241'-1, a tangential-direction-to-pattern-curve calculation section 241'-2, and an angle-difference calculation section 241'-3.

It is to be noted that the other components of the pattern-orientation determination apparatus 2 in which the intersecting-point extraction section 241' of the present modification is provided are basically same as those of the pattern-orientation determination apparatus 2 of the embodiment described above, and therefore, overlapping description of them is omitted herein to avoid redundancy. In other words, the intersecting-point extraction section 241' of the modification is provided in place of the intersecting-point extraction section 241 of the pattern-orientation determination apparatus 2 of the embodiment shown in FIG. 14. Further, the pattern-orientation determination apparatus 2 in which the intersecting-point extraction section 241' of the present modification is provided is implemented by the computer system 100 described hereinabove with reference to FIG. 2 similarly to the pattern-orientation determination apparatus 2 of the embodiment described above.

The tangential-direction-to-reference-circle calculation section 241'-1 calculates the tangential directions of the reference circle at those of the intersecting points calculated by the reference-circle-intersecting-point calculation section 23 which are present on the particular side with respect to the pattern center as unit vectors. The tangential-direction-to-pattern-curve calculation section 241'-2 calculates the tangential directions to the pattern curves at those of the intersecting points calculated by the reference-circle-intersecting-point calculation section 23 which are present on the particular side with respect to the pattern center as unit vectors.

The angle-difference calculation section 241'-3 calculates values (inner products) corresponding to the angle differences between the tangential directions to the reference circle calculated by the tangential-direction-to-reference-circle calculation section 241'-1 and the tangential directions to the pattern curves calculated by the tangential-direction-to-pattern-curve calculation section 241'-2 at the intersecting points which are present on the particular side with respect to the pattern center. More particularly, the angle-difference calculation section 241'-3 calculates, based on the unit vectors representative of the tangential directions to the reference circle calculated by the tangential-direction-to-pattern-curve calculation section 241'-2 and the unit vectors representative of the tangential directions to the pattern curves calculated by the tangential-direction-to-pattern-curve calculation section 241'-2, inner products of the vectors at the intersecting points.

The intersecting-point extraction section 241' has such a construction as described above and extracts two intersecting points from among the intersecting points calculated by the reference-circle-intersecting-point calculation section 23 based on the inner products calculated by the angle-difference calculation section 241'-3. More particularly, the intersecting-point extraction section 241' selects those two intersecting points whose values of the inner products calculated by the angle-difference calculation section 241'-3 are most nearest to 0.

Figure 24:
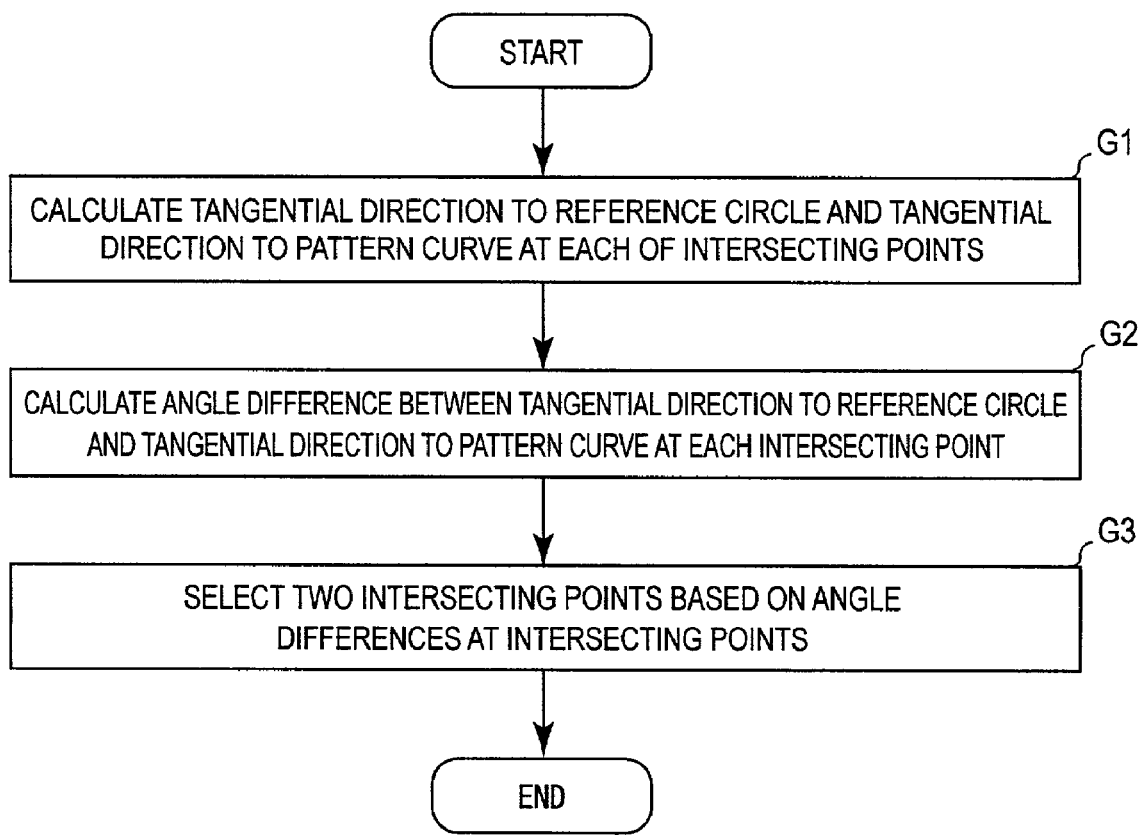
FIG. 24 is a flow chart illustrating an intersecting-point extraction procedure by the intersecting-point extraction section in the modification.
Figure 25:
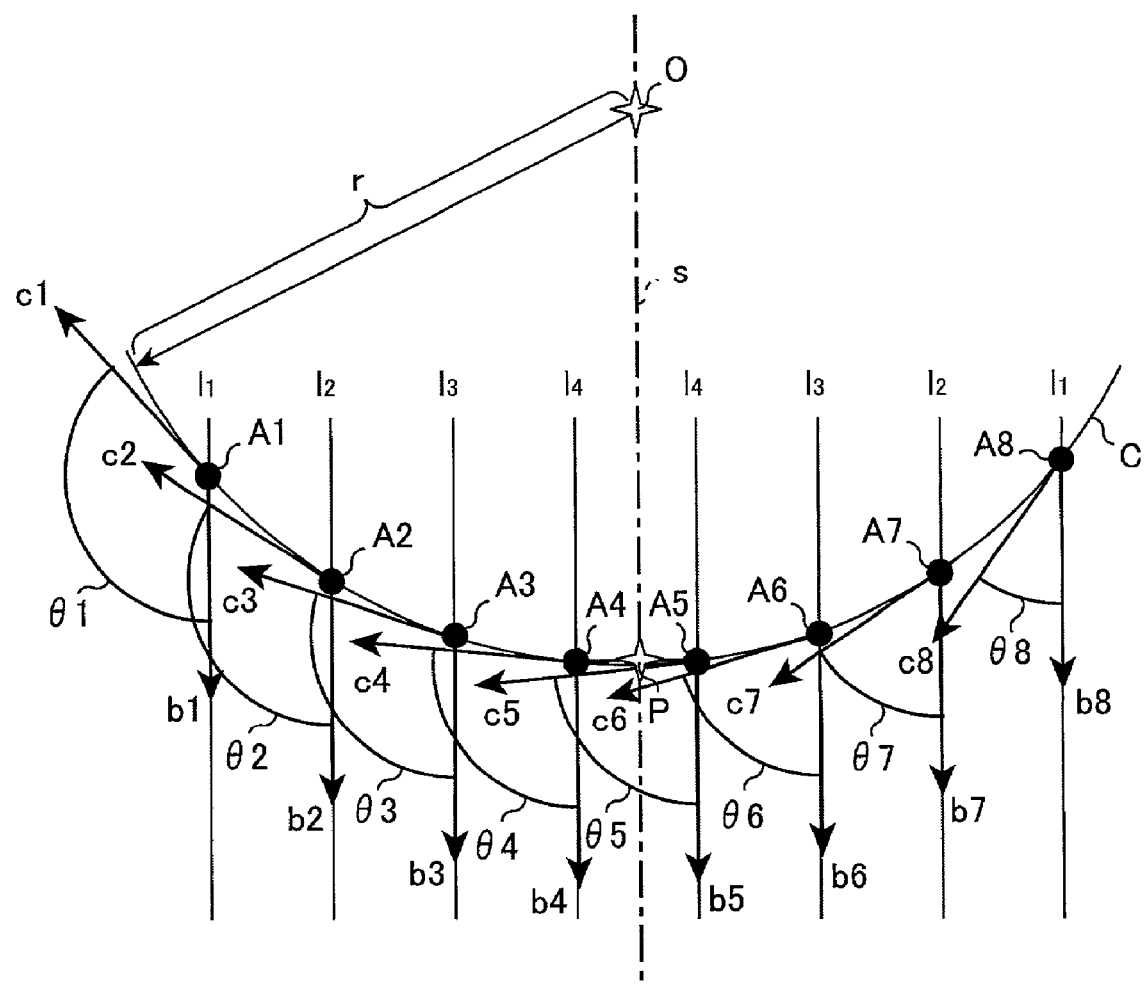
FIG. 25 is a diagrammatic view illustrating an intersecting-point extraction method by the intersecting-point extraction section in the modification.

Now, extraction means for intersecting points by the intersecting-point extraction section 241' is described with reference to FIGS. 24 and 25. FIG. 24 is a flow chart (steps G1 to G3) illustrating an intersecting point extraction procedure by the intersecting-point extraction section 241', and FIG. 25 is a diagrammatic view illustrating an intersecting point extraction technique by the intersecting-point extraction section 241' of FIG. 23.

First, the tangential directions (directions indicated by vectors c1 to c8 of FIG. 25) at the intersecting points A1 to A8 calculated in step E3 of FIG. 16 and present on the particular side with respect to the pattern center C are calculated by the tangential-direction-to-reference-circle calculation section 241'-1 and the tangential directions (directions indicated by vectors b1 to b8 of FIG. 25) to the pattern curves $l_1$ to $l_4$ are calculated by the tangential-direction-to-pattern-curve calculation section 241'-2 as seen in FIG. 24 (step G1).

Then, values corresponding to angle differences $\theta'1$ to $\theta'8$ (refer to FIG. 25) between the tangential directions c1 to c8 to the reference circle C and the tangential directions b1 to b8 to the pattern curves $l_1$ to $l_4$ at the intersecting points A1 to A8 calculated in step G1 are calculated by the angle-difference calculation section 241'-3 (step G2).

Thereafter, two intersecting points are extracted from among the intersecting points A1 to A8 calculated in step G2 based on the values corresponding to the angle differences $\theta'1$ to $\theta'8$ at the intersecting points A1 to A8 calculated in step G2 by the intersecting-point extraction section 241' (step G3).

More particularly, first in step G1, unit vectors c1 to c8 representative of the tangential directions to the reference C and unit vectors b1 to b8 representative of the tangential direction to the pattern curves $l_1$ to $l_4$ at the intersecting points A1 to A8 are calculated by the tangential-direction-to-reference-circle calculation section 241'-1 and the tangential-direction-to-pattern-curve calculation section 241'-2, respectively (refer to FIG. 25). For the directions of the unit vectors, a fixed criterion is determined in advance. For example, it is determined that the unit vectors c1 to c8 representative of the tangential directions to the reference circle C have the positive sign in the clockwise direction of the reference circle C while the unit vectors b1 to b8 representative of the tangential directions to the pattern curves $l_1$ to $l_4$ have the positive sign when directed from the inner side toward the outer side of the reference circle C.

Then in step G2, the inner products of the unit vectors c1 to c8 and the unit vectors b1 to b8 are calculated as the values corresponding to the angle differences $\theta'1$ to $\theta'8$ at the intersecting points A1 to A3 by the angle-difference calculation section 241'-3. Further, in step G3, the two intersecting points A4 and A5 having inner product values nearest to 0 are selected as the two intersecting points whose angle differences from among the angle differences at the intersecting points A1 to A8 are nearest to the right angle.

Even where the intersecting-point extraction section 241' of the present modification is used, the two intersecting points A4 and A5 can be selected similarly as with the intersecting-point extraction section 241 in the embodiment as described above.

It is to be noted that, if the inner products at the intersecting points A1 to A8 in FIG. 25 are checked in order, then it can be seen that the value of the inner product changes from the negative to the positive in sign between the intersecting points A4 and A5. Thus, the intersecting-point extraction section 241' may alternatively be constructed so as to utilize the nature just described such that it selects two intersecting points of which the value of the inner product determined by the angle-difference calculation section 241'-3 changes from the positive to the negative or conversely from the negative to the positive in sign.

In this manner, with the intersecting-point extraction section 241' of the present modification, two intersecting points are extracted based on the inner products of unit vectors representative of the tangential directions to the reference circle C and unit vectors representative of the tangential directions to the pattern curves at the intersecting points without determining the angle differences themselves between the tangential directions to the reference circle C and the tangential directions to the pattern curves at the intersecting points. Consequently, further simplification of arithmetic operation and reduction of the calculation amount can be achieved, and determination of the pattern orientation can be performed at a higher speed and with a higher degree of certainty.

On the other hand, the pattern-orientation determination apparatus 2 of the present embodiment may include, in place of the rectification section 251, a rectification section 251' (refer to FIG. 14) which is a modification to the rectification section 251. The rectification section 251' corrects the pattern orientation determined by the pattern-orientation determination section 25 based on the position of an arbitrary point other than the reference point on the reference straight line determined by the pattern-orientation determination section 25 and pattern curves which are present around the arbitrary point.

Figure 26:
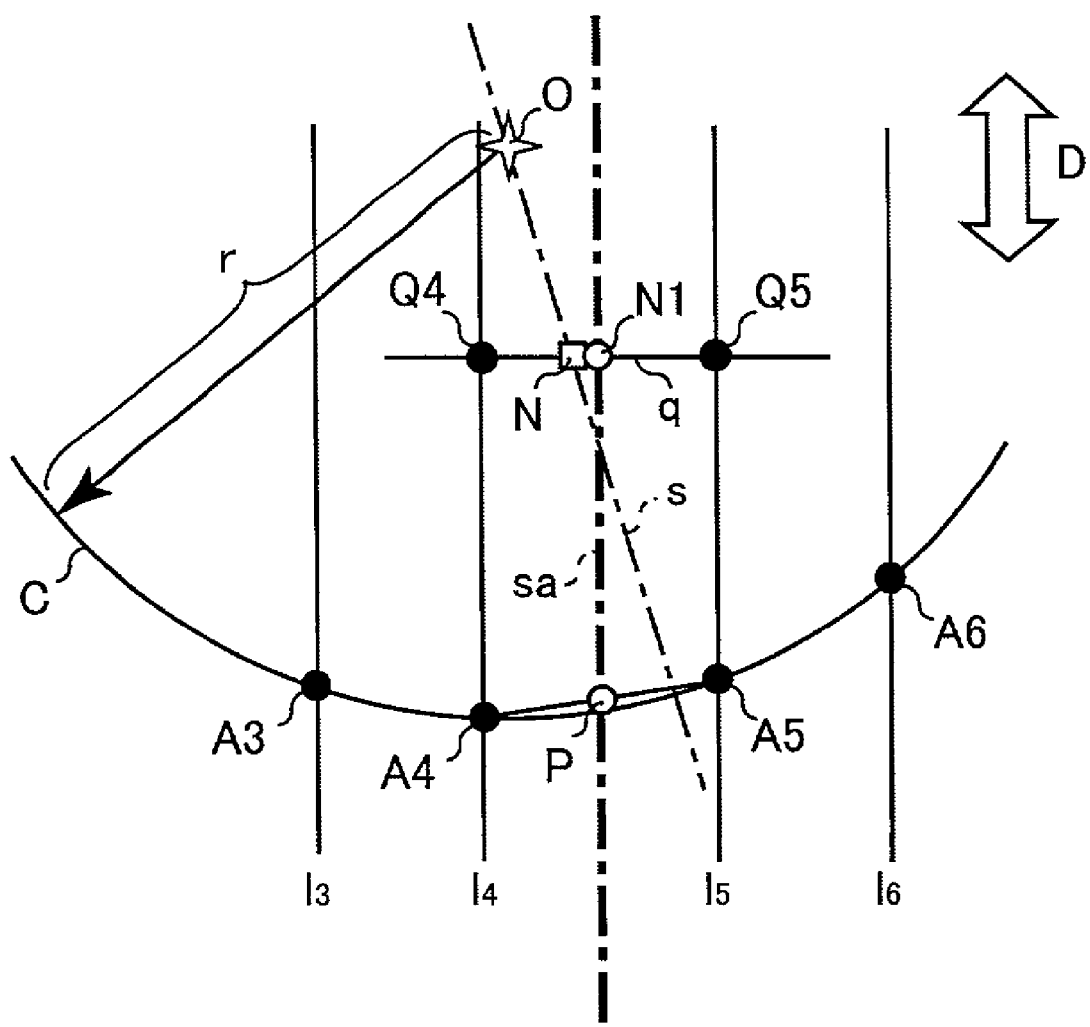
FIG. 26 is a diagrammatic view illustrating a rectification procedure of a pattern orientation by the pattern-orientation determination apparatus as another embodiment of the present invention.

FIG. 26 is a diagrammatic view illustrating rectification means for the pattern orientation by the rectification section 251'. Referring to FIG. 26, the rectification section 251' sets an arbitrary internally dividing point N on the reference straight line s determined by the pattern-orientation determination section 25 and calculates the direction D of the pattern curves $l_3$ to $l_6$ adjacent the internally dividing point N in the proximity of the reference internally dividing point N in a similar manner as described hereinabove.

Further, the rectification section 251' generates a straight line q which extends perpendicularly to the direction D and passes the internally dividing point N. Then, the rectification section 251' calculates two intersecting points Q4 and Q5 between the thus generated straight line q and the pattern curves $l_4$ and $l_5$ adjacent to and positioned on the opposite sides of the pattern center O, determines the middle point N1 of the two intersecting points Q4 and Q5, calculates a reference straight line sa which passes the middle point and the reference point P, and outputs the direction of the reference straight line sa as the corrected pattern orientation.

In this manner, with the rectification section 251' of the present modification, where the direction of the reference straight line s which passes the pattern center O and the reference point P is determined as the pattern orientation, the pattern orientation is corrected based on the position of an arbitrary point (the internally dividing point N) on the reference straight line s other than the reference point P and pattern curves present around the arbitrary point. Therefore, even where the accuracy of the pattern center O to be used for determination of the pattern orientation is not very high, the pattern orientation can be corrected through addition of simple arithmetic operation, and an accurate pattern orientation can be determined efficiently.

[3] Pattern Alignment Apparatus (First Example) as an Embodiment of the Invention

Figure 27:
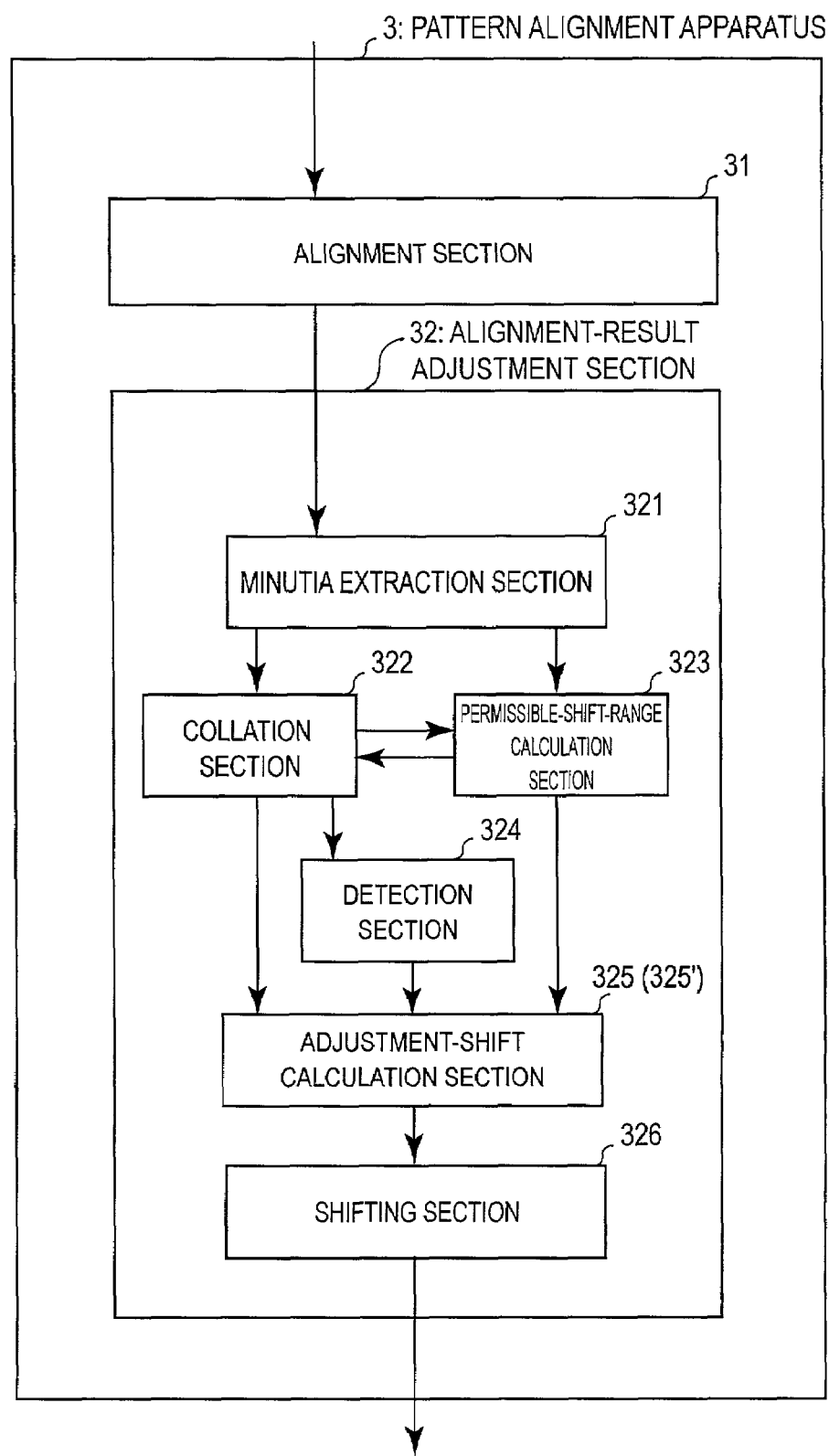
FIG. 27 is a block diagram showing a functional construction of a pattern alignment apparatus as an embodiment of the present invention.

[3-1] Structure of the Pattern Alignment Apparatus (First Example) of the Embodiment FIG. 27 is a block diagram showing a functional construction of a pattern alignment apparatus as an embodiment of the present invention. Referring to FIG. 27, the pattern alignment apparatus 3 of the present embodiment shown includes an alignment section 31 and an alignment-result adjustment section 32.

Also the pattern alignment apparatus 3 of the present embodiment is implemented by a computer system such as the computer system 100 shown in FIG. 2 similarly to the pattern-center determination apparatus 1 and the pattern-orientation determination apparatus 2 of the embodiment of the present invention described hereinabove. Also functions of the alignment section 31 and the alignment-result adjustment section 32 of the pattern alignment apparatus 3 are implemented by a CPU or the like which executes an application program stored on a storage medium similarly to those of the components of the pattern-center determination apparatus 1 and the pattern-orientation determination apparatus 2 described hereinabove.

The pattern alignment apparatus 3 shown in FIG. 27 is incorporated, for example, in a system which performs personal authentication using biometric information or a like system and performs alignment of two fingerprint-like patterns as biometric information.

Figure 36:
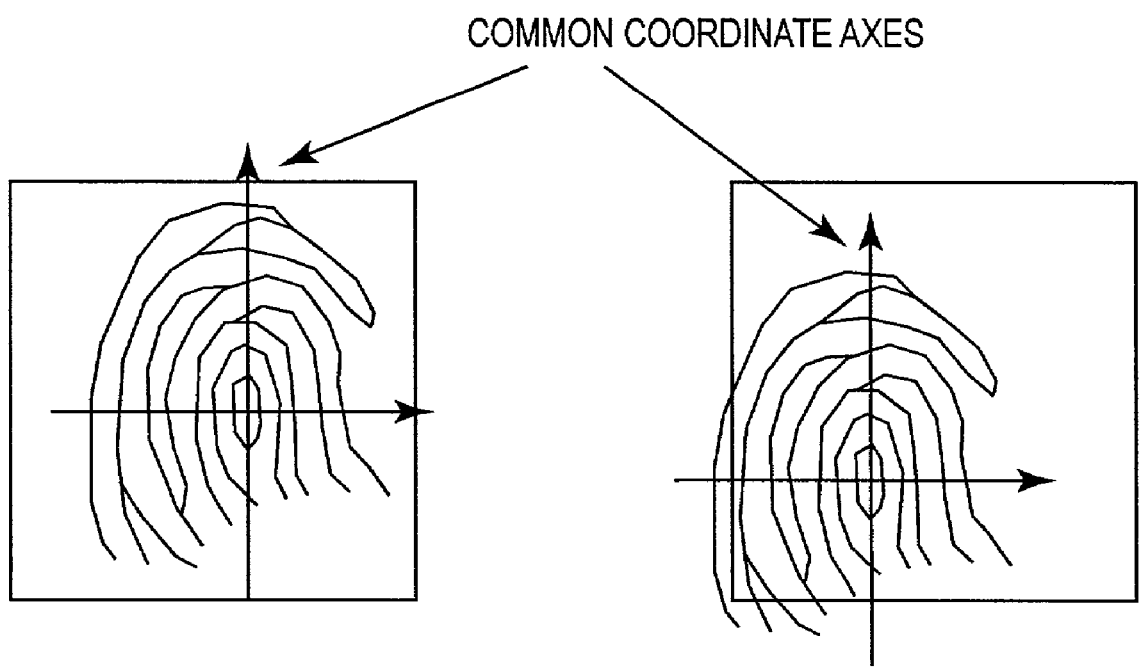
FIG. 36 is a diagrammatic view illustrating a setting method of a coordinate system common to two fingerprint images.
Figure 37:
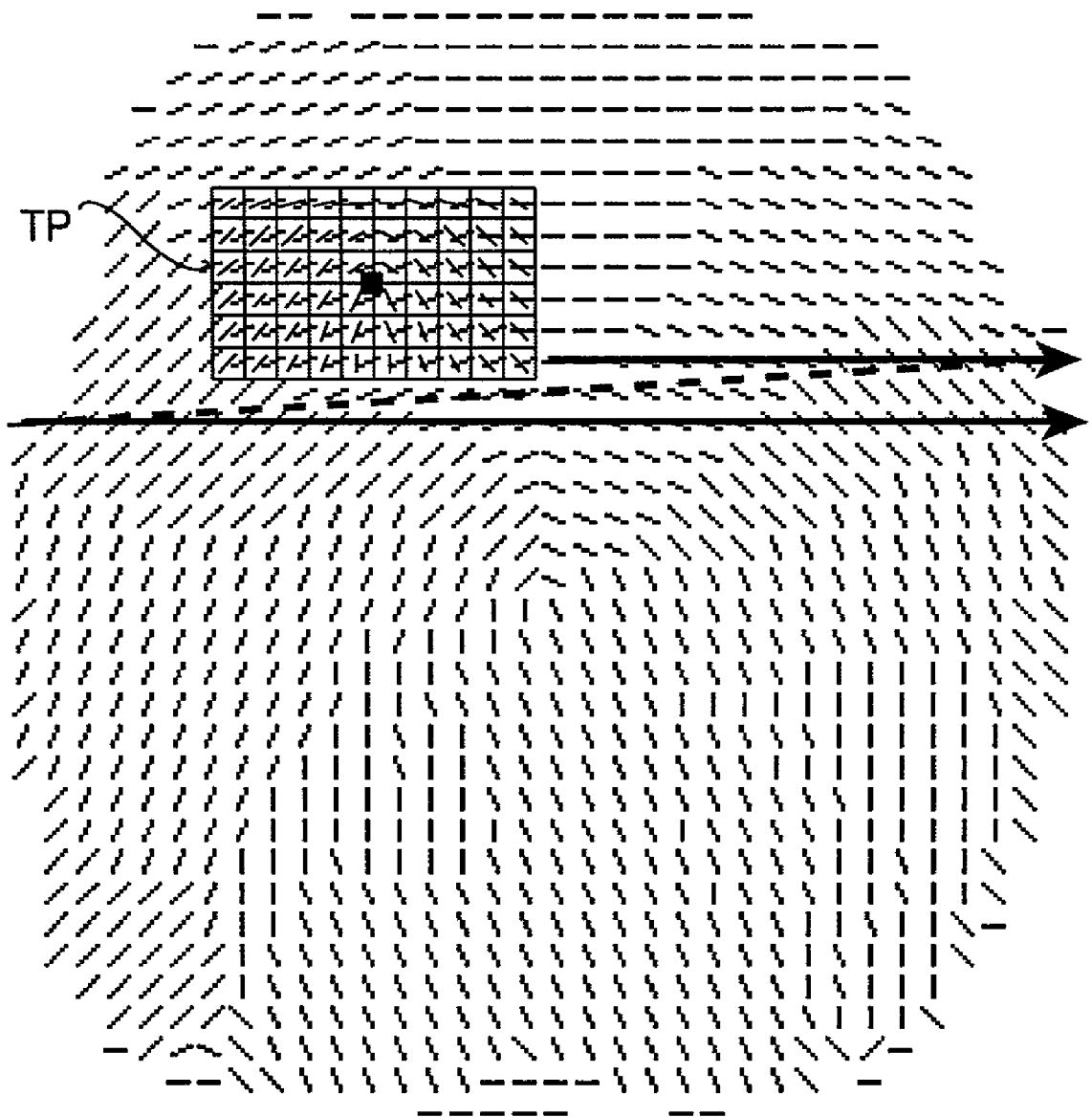
FIG. 37 is a diagrammatic view schematically showing an example of distribution of directions of pattern-curve segments on a fingerprint image and illustrating a determination method of the pattern center using the directions.
Figure 38:
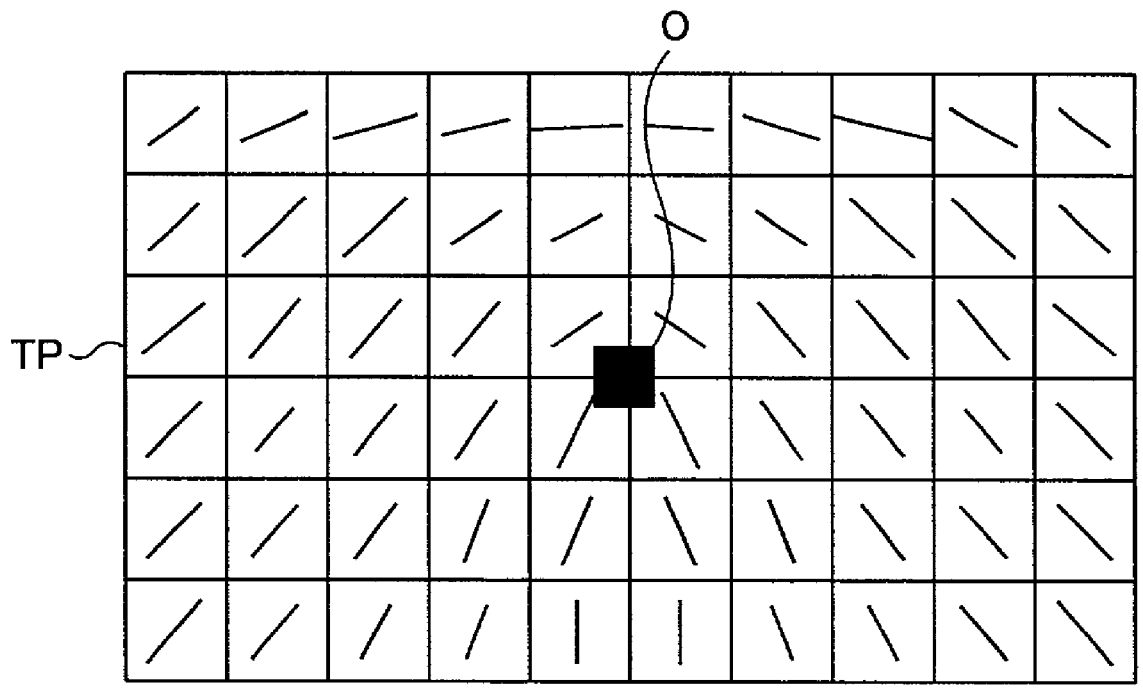
FIG. 38 is a diagrammatic view showing a representative direction distribution of pattern-curve segments in the proximity of the center of a fingerprint pattern and showing an example of a template used upon determination of the pattern center.
Figure 40A:
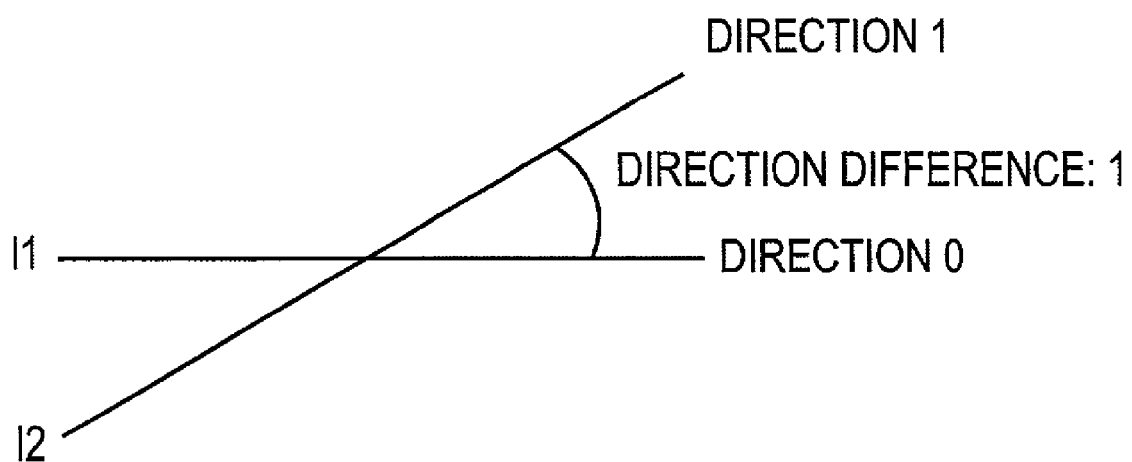
FIGS. 40(A), 40(B) and 40(C) are diagrammatic views all illustrating a comparison method of directions of two pattern-curve segments.
Figure 40B:
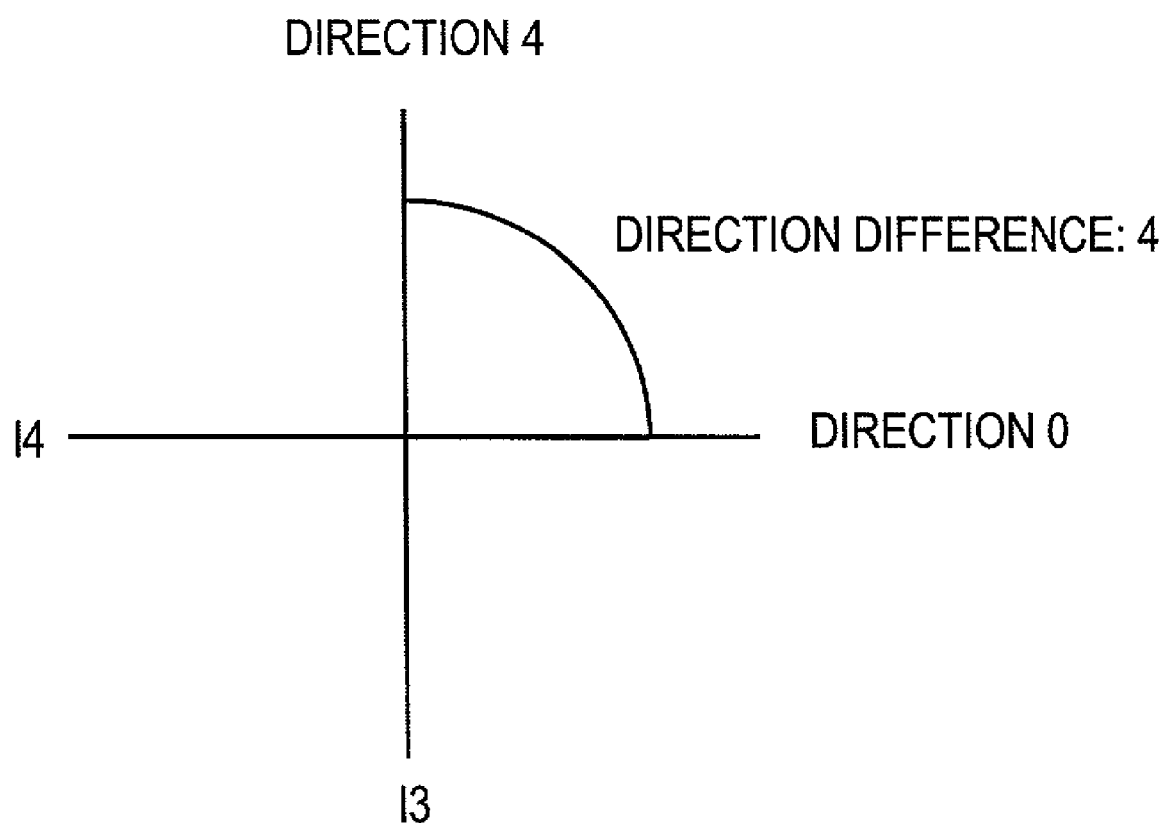
Figure 40C:
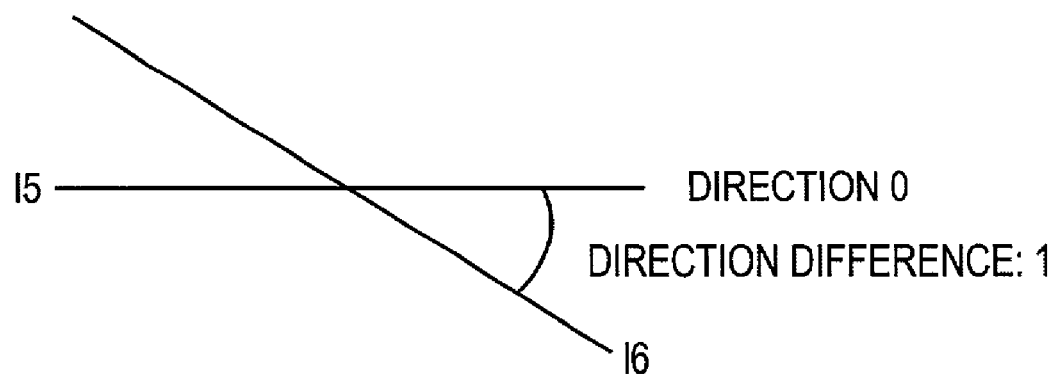

Here, the alignment of fingerprint-like patterns signifies to overlap two fingerprint-like patterns appropriately by detecting the positional relationship and the orientational relationship between the two fingerprint-like patterns and parallelly shifting and rotationally shifting at least one of the fingerprint-like patterns based on the relationships. In other words, the alignment of fingerprint-like patterns is to set a plane coordinate system (common coordinate axes) common to two fingerprint-like patterns based on the configurations of the fingerprint-like patterns, for example, as seen from FIG. 36. FIG. 36 is a schematic view illustrating a method of setting a coordinate system common to two fingerprint images.

Similarly to a fingerprint-like pattern which is an object of determination of the pattern center and the pattern orientation by the pattern-orientation determination apparatus 2 of the embodiment of the present invention described hereinabove, also a fingerprint-like pattern which is an object of alignment by the pattern alignment apparatus 3 of the present embodiment is picked up in the form of a fingerprint image by the scanner 105 and inputted to the computer system 100, that is, the pattern alignment apparatus 3, when the pattern image inputting program is executed by the CPU 100-1. Or alternatively, a fingerprint-like pattern is provided in the form of a fingerprint image or pattern data through the communication network 106, the external storage apparatus 107 or the recording medium drive 108 and inputted to the computer system 100, that is, the pattern alignment apparatus 3.

In the pattern alignment apparatus 3 of FIG. 27, the alignment section 31 performs general alignment of two fingerprint-like patterns inputted thereto. More particularly, the alignment section 31 detects the positional relationship and the orientational relationship between the two fingerprint-like patterns and parallelly and rotationally shifts at least one of the fingerprint-like patterns based on the relationships to make the two fingerprint-like patterns overlap with each other appropriately.

The alignment-result adjustment section 32 adjusts a result of the alignment of the two fingerprint-like patterns by the alignment section 31 based on two groups of minutiae extracted from the two fingerprint-like patterns. Here, a minutia extracted from a fingerprint is a bifurcation or an end point of a ridge of the fingerprint.

The necessity for such adjustment of a result of the alignment by the alignment-result adjustment section 32 is described with reference to FIG. 28.

Figure 28:
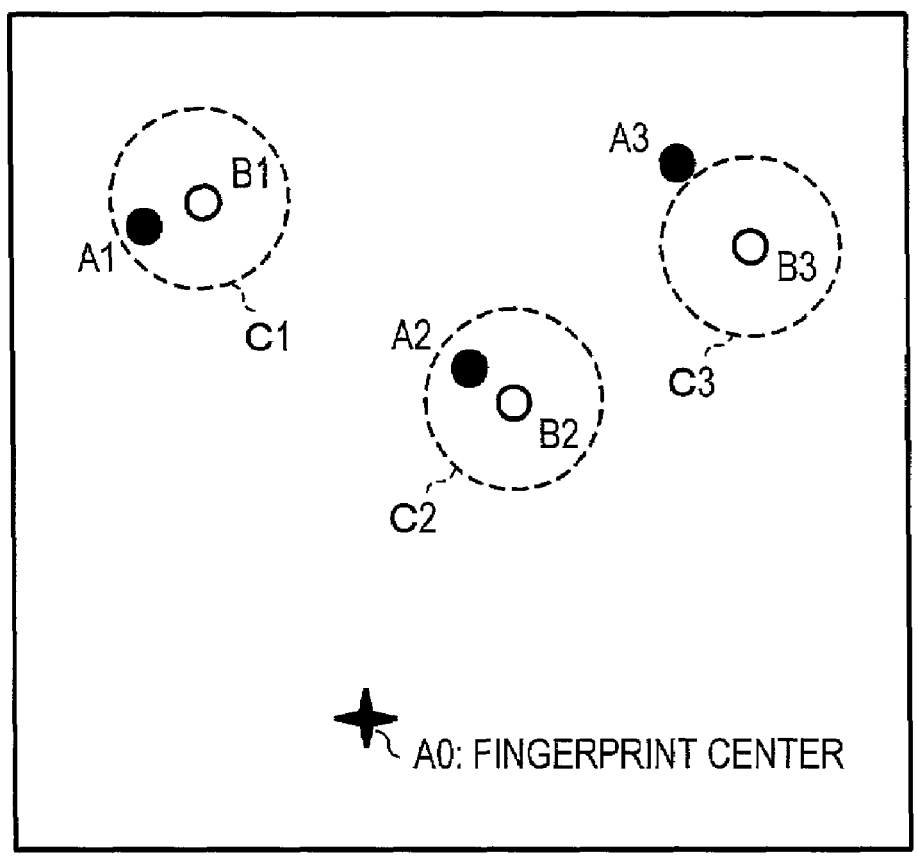
FIG. 28 is a view illustrating necessity for an adjustment process of an alignment result by the pattern alignment apparatus of the embodiment.
Figure 28:
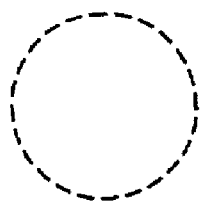

FIG. 28 illustrates a result when alignment of two fingerprint patterns A and B picked up from the same fingerprint where the pattern alignment apparatus 3 of the present embodiment is used for aligning of fingerprint patterns in the fingerprint verification/authentication system is performed by the alignment section 31, and then a group of minutiae A1, A2 and A3, extracted from the fingerprint pattern A, and a group of minutiae B1, B2 and B3, extracted from the fingerprint pattern B, are collated with each other by a collation section 322 (which is hereinafter described in detail with reference to FIG. 27).

Circles C1, C2 and C3 of a predetermined radius, respectively centered at the minutiae B1, B2 and B3, are generated and each of the minutiae B1, B2 and B3 is discriminated (discriminated) whether or not to coincide with any minutiae A1, A2 or A3 extracted from another fingerprint pattern A by the collation section 322 using the circles C1, C2 and C3 as threshold values for discrimination of coincidence of the minutiae B1, B2 and B3, respectively. In particular, when the minutia A1, A2 or A3, extracted from the other fingerprint pattern A, is included within any circle C1, C2 or C3 (hereinafter referred to as coincidence threshold circle) generated for the corresponding minutia B1, B2 or B3 of the fingerprint pattern B, it is regarded that such minutia pair (A1 and B1, and A2 and B2, in FIG. 28) is in coinciding relationship.

Since the two fingerprint images A and B originate from the same fingerprint, ideally the coordinates of all of the minutiae A1 to A3 and the coordinates of all of the minutiae B1 to B3 extracted from the fingerprint patterns A and B coincide with each other, respectively. However, this actually is a very rare case. This arises from some limitation to the alignment accuracy by the alignment section 31 and an error which occurs with each fingerprint image when the fingerprint pattern is picked up as a fingerprint image.

Particularly with regard to the latter, it is difficult to pick up an accurate fingerprint image every time from the state of the skin at a fingertip when the fingerprint image (fingerprint pattern) is picked up, a stain on the fingerprint scanner and so forth, and also the fluctuation of the positional relationship between minutiae included in the fingerprint image every time the fingerprint image is picked up causes such an error as described above. Since the skin at a fingertip of the human being is very flexible, when the fingertip is pressed against the fingerprint scanner to pick up a fingerprint image, the skin at the fingertip is expanded and contracted irregularly thereby to cause a fluctuation in the distribution of the pressure applied to the fingertip each time the fingerprint image is picked up. Therefore, the fingerprint image picked up undergoes local distortion or deformation, and as a result, the positional relationship between the minutiae varies for each fingerprint image. In other words, different fingerprint images have different errors.

Since each fingerprint pattern has a unique error as just described, even if the accuracy in position by the alignment section 31 is high, the two group of minutiae A1, A2, A3 and B1, B2, B3 of the two fingerprint patterns A and B, which were originally picked up from the same fingerprint, do not coincide with each other completely.

However, adjustment of a result of the alignment by the alignment section 31 sometimes increases the number of minutiae pairs which exhibit coinciding relationship. In FIG. 28, if the fingerprint pattern A is angularly rotated by several degrees in the clockwise direction around an arbitrary point A0 on the fingerprint pattern A (here, the pattern center A0 determined for the fingerprint pattern A by the pattern-center determination apparatus 1 of the embodiment of the present invention is used), then the minutiae A3 enters the inside of the coincidence threshold circle C3 for the minutia B3. Therefore, it is discriminated that also the minutia pair A3 and B3 exhibits coinciding relationship.

In this manner, by adjusting a result of the alignment by the alignment section 31 of two fingerprint patterns originating from the same fingerprint, the number of minutia pairs which exhibit coinciding relationship from among minutiae groups extracted from the fingerprint patterns can be increased (this may sometimes be described as that an alignment result is improved). The pattern alignment apparatus 3 (alignment-result adjustment section 32) of the present embodiment performs such adjustment as to augment an alignment result so that, when verification or authentication of biometric information such as a fingerprint is performed on a fingerprint verification/authentication system or a like system, coincidence of two fingerprint patterns based on the same fingerprint can be confirmed certainly, so that accurate and efficient verification/authentication of the fingerprint patterns becomes possible.

From the reason given above, the pattern alignment apparatus 3 of the present embodiment includes the alignment-result adjustment section 32 by which such adjustment as to augment an alignment result of two fingerprint-like patterns by the alignment section 31 is performed.

Referring back to FIG. 27, the alignment-result adjustment section 32 includes a minutia extraction section 321, a collation section 322, a permissible-shift-range calculation section 323, a detection section 324, an adjustment-shift calculation section 325, and a shifting section (an alignment shifting section) 326.

The minutia extraction section 321 extracts two sets (groups) of minutiae from two fingerprint-like patterns. The collation section 322 collates the two sets of minutiae extracted from the two fingerprint-like patterns by the minutia extraction section 321 after alignment of them by the alignment section 31 is completed.

The permissible-shift-range calculation section 323 calculates the range of shift within which one of the two fingerprint-like patterns can be shifted with respective to the other fingerprint-like pattern while all or some of those minutia pairs discriminated as being in a coincidence relationship by the collation section 322 maintain their coincidence relationship as a permissible shift range. The permissible-shift-range calculation section 323 calculates the permissible shift range based on a threshold value (the radius of the coincidence threshold circles C1 to C3 shown in FIG. 28) to the distances between minutiae of an object of collation set in advance as a coincidence criterion by the collation section 322. It is to be noted that the shift includes a parallel shift when one of two fingerprint-like patterns is parallelly shifted with respect to the other fingerprint-like pattern and a rotation angle when one of the two fingerprint-like patterns is rotationally shifted around a predetermined point with respect to the other fingerprint-like pattern.

The detection section 324 recognizes any minutia pair discriminated as being in a coincidence relationship newly by the collation section 322 within the permissible shift range calculated by the permissible-shift-range calculation section 323.

The adjustment-shift calculation section 325 calculates, based on a result of the collation by the collation section 322, an adjustment shift by which at least one of the two fingerprint-like patterns is shifted for adjustment so that the positioned state of the two fingerprint-like patterns may be improved. The adjustment-shift calculation section 325 calculates the adjustment shift within the permissible shift range calculated by the permissible-shift-range calculation section 323 and particularly calculates an amount of shift of one of the fingerprint-like image with which the number of minutia pairs which exhibit a coincidence relationship is maximum as the adjustment shift. It is to be noted that also the adjustment shift includes a parallel shift when one of two fingerprint-like patterns is parallelly shifted with respect to the other fingerprint-like pattern and a rotation angle when one of the two fingerprint-like patterns is rotationally shifted around a predetermined point with respect to the other fingerprint-like pattern similarly to the shift described hereinabove.

The shifting section 326 shifts at least one of the two fingerprint-like patterns by the adjustment shift calculated by the adjustment-shift calculation section 325 to adjust the alignment result by the alignment section 31.

Figure 29:
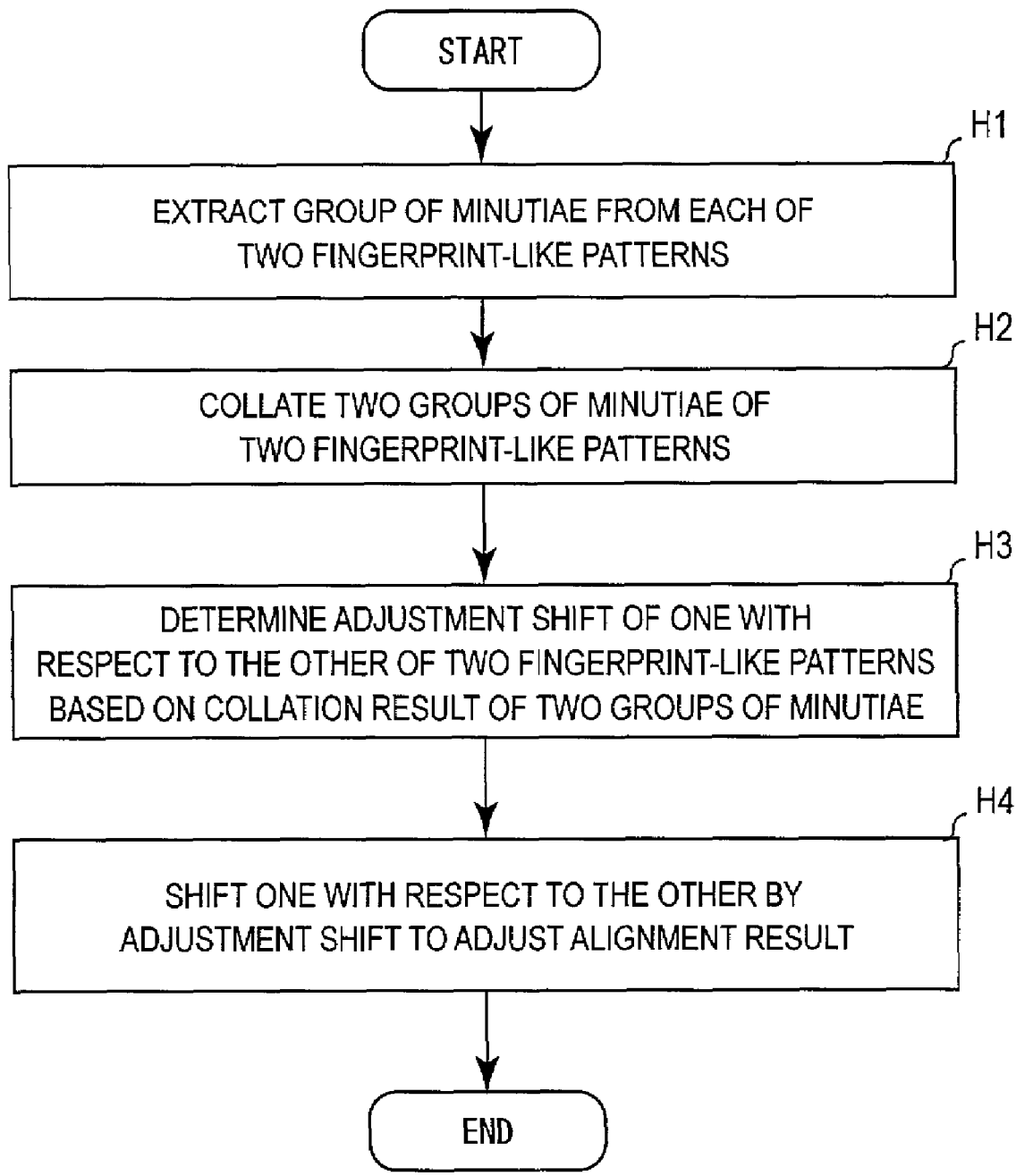
FIG. 29 is a flow chart illustrating an adjustment procedure of an alignment result by the pattern alignment apparatus of the embodiment.

[3-2] Operation of the Pattern Alignment Apparatus (First Example) of the Embodiment Now, a pattern alignment procedure executed by the pattern alignment apparatus of the present embodiment is described with reference to FIGS. 29 to 31. FIG. 29 is a flow chart (steps H1 to H4) illustrating an adjustment procedure of a pattern alignment result by the present embodiment, FIGS. 30(A), 30(B) and 30(C) are diagrammatic views illustrating an adjustment technique of a pattern alignment result by the present embodiment, and FIG. 31 is a diagrammatic view illustrating a discrimination procedure of the number of minutia pairs which are in a coincidence relationship by the present embodiment.

When two fingerprint-like patterns A and B (refer to FIGS. 30(A) to 30(C)) which are an object of pattern alignment are inputted in the form of a pattern image or pattern data described hereinabove to the pattern alignment apparatus 3, alignment of the two fingerprint-like patterns A and B is first performed by the alignment section 31.

Figure 30A:
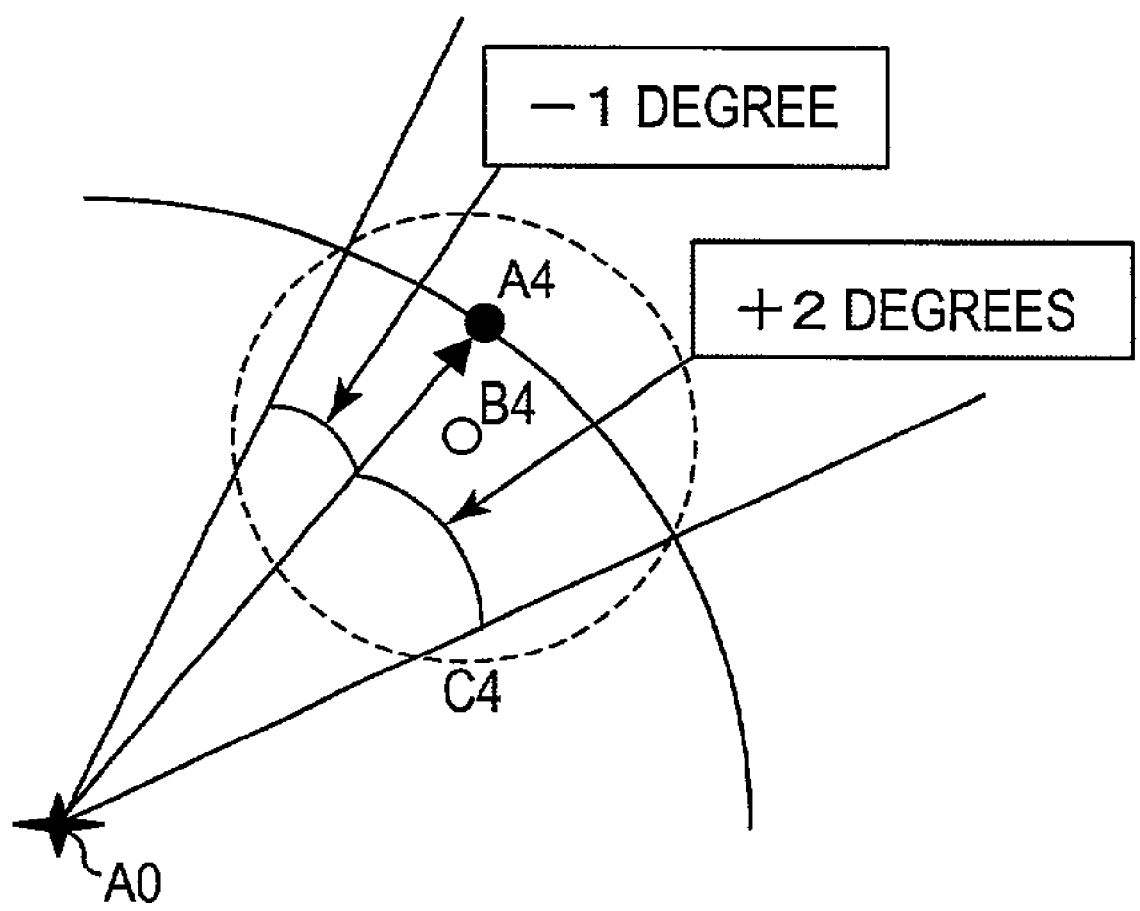
FIGS. 30(A), 30(B), and 30(C) are diagrammatic views all illustrating an adjustment method of a pattern alignment result by the pattern alignment apparatus of the embodiment.
Figure 30B:
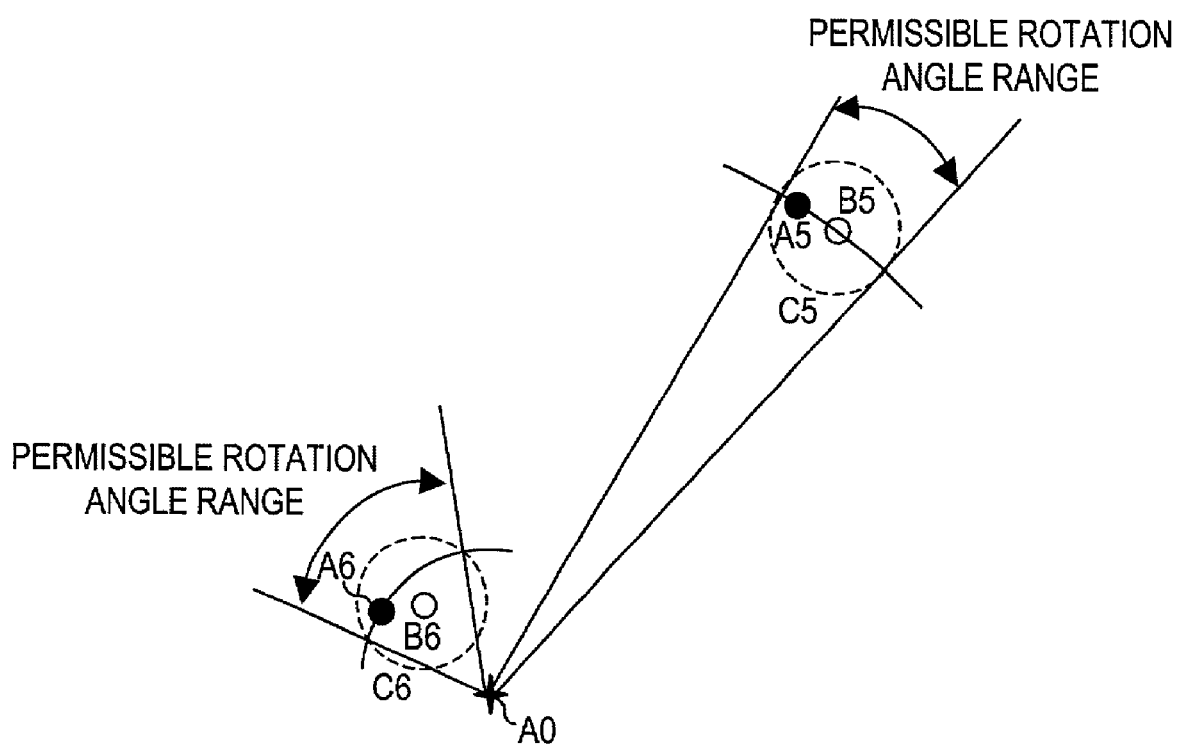
Figure 30C:
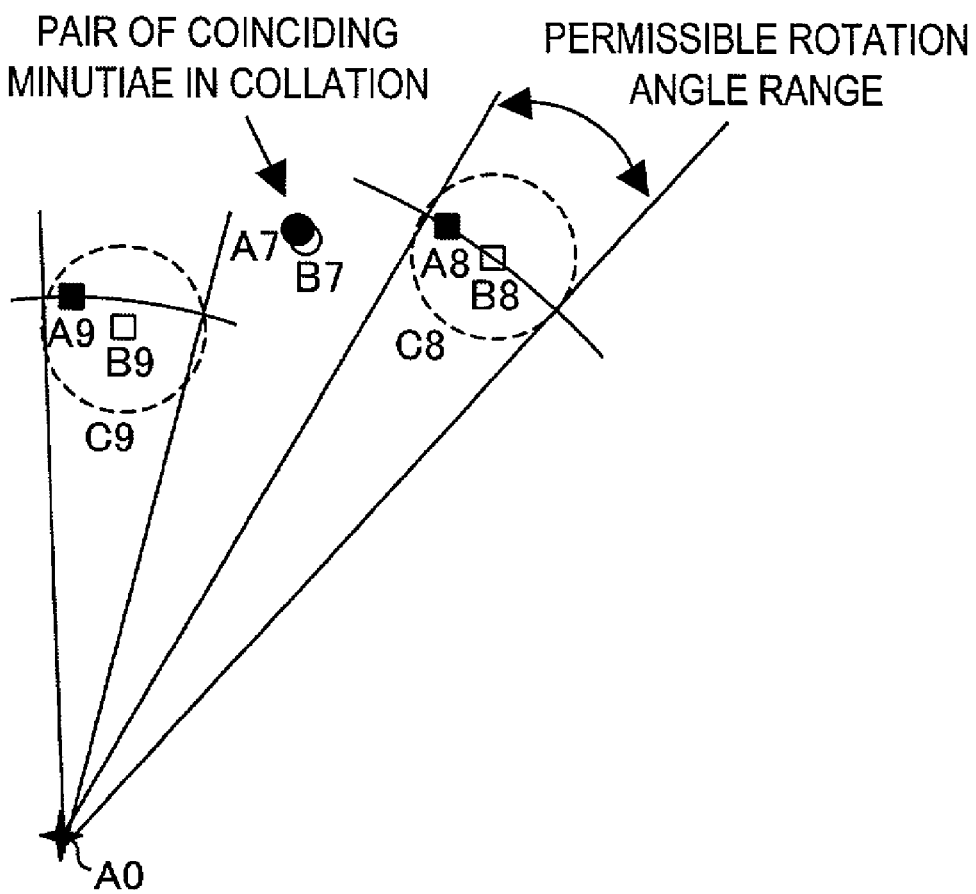
Figure 31:
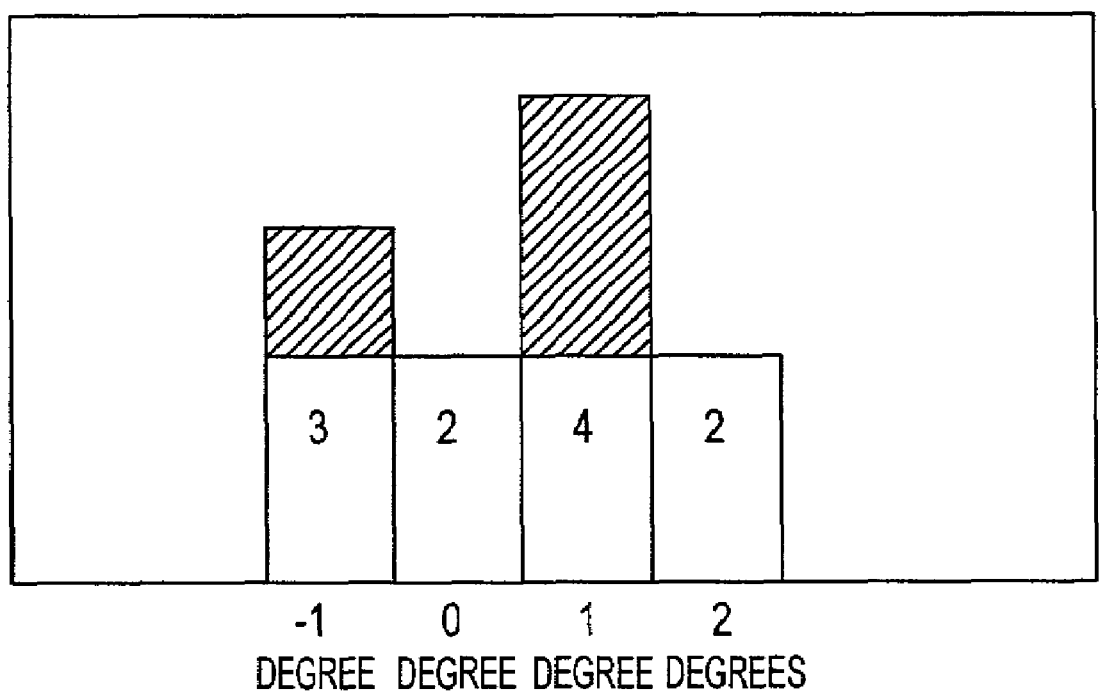
FIG. 31 is a diagrammatic view illustrating a determination procedure of the number of coinciding minutiae pairs by the pattern alignment apparatus of the embodiment.

Then, such adjustment as to augment a result of the alignment of the two fingerprint-like patterns A and B by the alignment section 31 is performed for the alignment result of the fingerprint-like patterns A and B by the alignment-result adjustment section 32 based on minutiae A4 to A9 and B4 to B9 (refer to FIGS. 30(A) to 30(C)) extracted from the fingerprint-like patterns A and B, respectively.

In particular, the minutiae A4 to A9 and B4 to B9 are first extracted from the fingerprint-like patterns A and B by the minutia extraction section 321 as shown in FIG. 29 (step H1).

Then, after the alignment of the two fingerprint-like patterns A and B by the alignment section 31, collation of the two sets of minutiae A4 to A9 and B4 to B9 extracted from the two fingerprint-like patterns A and B in step H1, respectively, is performed by the collation section 322 (step H2).

Thereafter, such an adjustment shift with which at least one of the two fingerprint-like patterns A and B should be shifted for adjustment as to augment the positioned state of the two fingerprint-like patterns A and B is calculated based on a result of the collation in step H2 by the permissible-shift-range calculation section 323, detection section 324 and adjustment-shift calculation section 325 (step H3).

More particularly, the range of a shift by which one of the two fingerprint-like patterns A and B is shifted with respective to the other fingerprint-like pattern while all or some of those minutia pairs discriminated as being in a coincidence relationship in step H2 maintain their coincidence relationship is first calculated as a permissible shift range by the permissible-shift-range calculation section 323.

Then, any minutia pair discriminated as being in a coincidence relationship newly by the collation section 322 within the permissible shift range calculated by the permissible-shift-range calculation section 323 is recognized by the detection section 324.

Further, the adjustment shift described hereinabove is calculated by the adjustment-shift calculation section 325 within the permissible shift range calculated by the permissible-shift-range calculation section 323. More particularly, the shift of one of the fingerprint-like patterns with which the number of minutia pairs which are in a coincidence relationship is maximum is calculated as the adjustment shift based on the detection result by the collation section 322.

Finally, at least one of the two fingerprint-like patterns A and B is shifted by the adjustment shift calculated in step H3 by the shifting section 326 to perform adjustment to the alignment result by the alignment section 31 (step H4).

In this manner, with the pattern alignment apparatus 3 (alignment-result adjustment section 32) of the present embodiment, since such an adjustment shift as to augment the alignment result of the two fingerprint-like patterns A and B by the alignment section 31 is determined based on the alignment result to perform shift adjustment of the two fingerprint-like patterns A and B, of the minutiae extracted from the two fingerprint-like patterns A and B can be performed accurately through addition of simple arithmetic operation for local configurations of the fingerprint-like patterns A and B. Accordingly, when verification or authentication of biometric information such as a fingerprint is performed by a fingerprint verification/authentication system or a like system, verification/authentication of the two fingerprint patterns A and B originating from the same fingerprint can be performed accurately with efficiency.

Further, since a permissible shift range within which a coincidence relationship of those minutia pairs (coinciding minutia pairs) discriminated as being in such a coincidence relationship based on the alignment result is determined first and then an adjustment shift is determined within the permissible shift range, such an adjustment shift as to augment the alignment result can be determined with certainty without decreasing the number of coinciding minutia pairs as far as possible.

Furthermore, since an adjustment shift with which the number of minutia pairs in a coincidence state is greatest is determined within the permissible shift range, the number of minutia pairs in a coincidence state can be increased with certainty, and such adjustment as to augment the alignment result of the two fingerprint-like patterns A and B most efficiently can be achieved.

Further, since the permissible shift range is calculated based on a threshold value (radius of the coincidence threshold circles) for the distance between minutiae of an object of collation set in advance as the coincidence criterion, when collation of minutiae extracted from the two fingerprint-like patterns A and B is performed, even if some error is involved in the positional relationship between the minutiae extracted from the fingerprint-like patterns A and B, the alignment result of the two fingerprint-like patterns A and B can be improved with certainty.

Here, the calculation procedure of the adjustment shift by the permissible-shift-range calculation section 323, detection section 324 and adjustment-shift calculation section 325 is described in detail with reference to FIGS. 30(A), 30(B)

and 31 taking a case wherein the shift and the adjustment shift are rotation angles as an example.

FIG. 30(A) illustrates a collation result of the minutia pair A4 and B4 based on the alignment result by the alignment section 31. The minutia A4 is positioned within a coincidence threshold circle C4 of the minutia B4, and therefore, the minutia pair A4 and B4 is in a coincidence relationship.

Here, if the fingerprint-like pattern A is rotated around an arbitrary point A0 on the fingerprint-like pattern A (here, the pattern center A0 determined with regard to the fingerprint-like pattern A by the pattern-center determination apparatus 1 of the embodiment of the present invention is used), then if the rotation angle of the fingerprint-like pattern A with respect to the fingerprint-like pattern B is within 1 degree in the counterclockwise direction or within 2 degrees in the clockwise direction, then the minutia A4 remains within the coincidence threshold circle C4 of the minutia B4 and the coincidence relationship of the minutia pair A4 and B4 is maintained.

The rotation angle range within which the coincidence relationship of a minutia pair is maintained in this manner is checked by the permissible-shift-range calculation section 323 for all of those minutia pairs (coincidence or coinciding minutia pairs) discriminated as being in a coincidence relationship based on the alignment result by the alignment section 31.

Here, since the radius of the coincidence threshold circle C5 for the minutia pair A5 and B5 present at positions spaced away from the pattern center A0 as shown in FIG. 30(B) and the radio of the coincidence threshold circle C6 for the minutia pair A6 and B6 present at positions nearer to the pattern center A0 are both threshold values for the distance between object minutiae and have an equal value, the rotation angle range within which the coincidence relationship regarding the minutia pairs A5, B5 and A6, B6 is influenced not only by the positional relationship between the minutiae A5 and B5 in pair or between the minutiae A6 and B6 in pair but also by the distances between the minutia pairs A5, B5 and A6, B6 and the pattern center A0. For example, if the positional relationship between the minutiae A5 and B5 in pair and the positional relationship between the minutiae A6 and B6 in pair as viewed from the pattern center A0 are the same (that is, the vector A5-B5 and the vector A6-B6 are equal in magnitude and the relative angle of the vector A5-B5 with respect to a straight line A0-B5 and the relative angle of the vector A6-B6 with respect to another straight line A0-B6 are equal to each other), then the rotation angle range within which the coincidence relationship of the minutia pair A5 and B5 present at the positions spaced away from the pattern center A0 is maintained is smaller than the rotation angle range within which the coincidence relationship of the minutia pair A6 and B6 present at the positions nearer to the pattern center A0 is maintained.

In this manner, a rotation angle range on which the distances between the minutia pairs A5, B5 and A6, B6 and the pattern center A0 are reflected in addition to the positional relationships between the minutiae A5 and B5 in pair and between the minutiae A6 and B6 in pair is determined with regard to all coincidence (coinciding) minutia pairs by the permissible-shift-range calculation section 323. Further, the range of the rotation angle of the fingerprint-like pattern A within which the coincidence relationship of all coincidence minutia pairs is maintained, that is, the range of the rotation angle common to all coincidence minutia pairs within the rotation angle ranges within which the coincidence relationship of each of the coincidence minutia pair is maintained, is determined as a permissible rotation-angle range (permissible shift range).

Then, a minutia pair or pairs which are discriminated as being in a coincidence relationship newly by the collation section 322 when the fingerprint-like pattern A is rotationally shifted within the range (permissible shift range) of the rotation angle determined by the permissible-shift-range calculation section 323 are recognized by the detection section 324.

FIG. 31 illustrates the number of minutia pairs which are in a coincidence relationship within the range from 1 degree in the counterclockwise direction to 2 degrees in the clockwise direction, which is the range of the rotation angle determined by the permissible-shift-range calculation section 323, for each angle of 1 degree in the form of a histogram. Here, the number of minutia pairs recognized by the detection section 324 as a result of the discrimination that they are in a coincidence relationship newly by the collation section 322 is indicated by the slanting lines in the histogram. It is to be noted that, in the following description, an angle in the counterclockwise direction may be represented by a negative value while an angle in the clockwise direction may be represented by a positive value. In particular, 1 degree in the counterclockwise direction may be represented as −1 degree, and 2 degrees in the clockwise direction may be represented as +2 degrees.

Here, where the rotation angle is 0 degree (positional relationship based on the alignment result by the alignment section 31), the number of minutia pairs which are in a coincidence relationship is 2. However, when the fingerprint-like pattern A is rotated by −1 degree, it is recognized by the detection section 324 that one minutia pair is newly in a coincidence relationship, and when the fingerprint-like pattern A is rotated by +1 degree, it is recognized by the detection section 324 that two minutia pairs are newly in a coincidence relationship. As a result, the number of minutia pairs which are in a coincidence relationship when the fingerprint-like pattern A is rotated by −1 degree is 3, and the number of minutia pairs which are in a coincidence relationship when the fingerprint-like pattern A is rotated by +1 degree is 4. Consequently, the rotation angle (adjustment shift) of the fingerprint-like pattern A with which the number of minutia pairs which are in a coincidence relationship is maximum is +1 degree (1 degree in the clockwise direction).

Where the rotation angle of one of two fingerprint-like patterns with respect to the other fingerprint-like pattern is determined as an adjustment shift as described above, the following effects are achieved.

Usually, in order to compensate for reduction of the number of coincidence minutia pairs originating from such errors unique to the fingerprint-like patterns as described above, coordinate errors (distances between minutiae in pair) between the minutiae in pair of two fingerprint-like patterns of an object of collation are determined and such coordinate errors are cumulatively added for all minutia pairs, and then a rotation angle with which the result of the cumulative addition of the coordinate errors is minimum is determined.

For example, where the coordinate error between minutiae in each pair of two fingerprint-like patterns of an object of alignment is represented by dn (n is the number of the minutia), the cumulative addition result S of the coordinate errors of all minutia pairs is determined as $$S = \Sigma dn.$$

Accordingly, the rotation angle with which the cumulative addition result S of the coordinate errors of all minutia pairs is minimized is determined.

However, if rotation shift is performed based on the rotation angle determined in this manner, then a minutia pair present at a position spaced away from the pattern center A0 does not sometimes maintain its coincidence relationship. For example, if the minutia pairs A5, B5 and A6, B6 shown in FIG. 10(B) are rotationally shifted over an equal rotation angle, then the shift distance between the minutiae A5 and B5 in pair present at positions spaced far away from the pattern center A0 of the fingerprint-like pattern A is smaller than the shift distance between the minutiae A6 and B6 in pair present at positions nearer than to the pattern center A0. As a result, if rotation shift is performed based on such a rotation angle as may minimize the start point S of the coordinate errors of all minutia pairs, then there is the possibility that the coincidence relationship between the minutiae A5 and B5 in pair present at positions spaced far away from the pattern center A0 may not be maintained.

On the other hand, if the pattern alignment apparatus 3 (alignment-result adjustment section 32) of the present embodiment is applied to adjustment by a rotation shift (rotation-shift adjustment), then a permissible rotation-angle range (permissible shift range) within which the coincidence relationship of those minutia pairs (coincidence minutia pairs) which are discriminated to be in a coincidence relationship based on an alignment result of the two fingerprint-like patterns A and B by the alignment section 31 is determined first and then the rotation-shift angle (adjustment shift) is determined within the permissible rotation-angle range. Therefore, also coincidence minutia pairs (coinciding minutia pairs) present at positions spaced far away from the center of the rotation shift can maintain their coincidence relationship. Accordingly, such a rotation-shift angle (adjustment shift) as improves the alignment result can be determined with certainty.

Further, since such a rotation-shift angle (adjustment shift) which maximizes the number of minutia pairs which have a coincidence relationship within the permissible shift range, the number of minutia pairs which have a coincidence relation ship can be increased with certainty. Consequently, such rotation-shift adjustment as augments the alignment result of the two fingerprint-like patterns A and B most effectively can be achieved.

As described above, with the pattern alignment apparatus 3 (alignment-result adjustment section 32) of the present embodiment, since such a rotation-shift angle (adjustment shift) as augments a result of alignment of two fingerprint-like patterns A and B by the alignment section 31 is determined based on the alignment result to perform rotation-shift adjustment of the two fingerprint-like patterns A and B, collation between minutiae extracted from the two fingerprint-like patterns A and B can be performed with a higher degree of accuracy through addition of simple arithmetic operation for local configurations of the fingerprint-like patterns A and B. Accordingly, when verification or authentication of biometric information such as a fingerprint is performed by a fingerprint verification/authentication system or a like system, authentication of two fingerprint patterns A and B originating from the same fingerprint can be performed efficiently.

[3-3] Others

It is to be noted that, while, in the foregoing description, calculation of a permissible shift range (permissible rotation angle) by the permissible-shift-range calculation section 323 is performed for all minutia pairs which are discriminated as being in a coincidence relationship by the collation section 322, where the number of minutia pairs which are in a coincidence relationship is comparatively great, those minutia pairs of an object of calculation of a permissible shift range by the permissible-shift-range calculation section 323 or those minutia pairs of an object of detection of a new coincidence relationship by the detection section 324 may be limited to some of the minutia pairs.

For example, one or more minutia pairs A7 and B7 (refer to FIG. 30(C)) which are discriminated as being in a coincidence relationship are selected, and a permissible rotation-angle range (permissible shift range) for the selected coincidence minutia pairs A7 and B7 is calculated by the permissible-shift-range calculation section 323. Then, detection of a new coincidence relationship by the detection section 324 is performed for minutia pairs A8, B8 and A9, B9 present around a periphery of the coincidence minutia pairs A7 and B7, that is, peripheral minutiae associated with the coincidence minutia pairs A7 and B7.

Where such a construction as described above is employed, the amount of arithmetic operation necessary for calculation of an adjustment shift can be reduced significantly, and consequently, such shift adjustment as to augment an alignment result can be performed at a higher speed.

Further, while the foregoing description relates to an example wherein the shift and the adjustment shift are rotation angles, the present invention is not limited to this, and for example, the shift and the adjustment shift may be parallel shifts. In this instance, the permissible shift range is calculated as a range of a parallel shift vector by the permissible-shift-range calculation section 323, and the adjustment shift is determined in the form of a parallel shift vector within the range of the parallel shift vector by the adjustment-shift calculation section 325.

Through the construction described above, by determining such a plane vector (adjustment shift) as augments an alignment result of two fingerprint-like patterns A and B by the alignment section 31 and performing parallel shift adjustment of the two fingerprint-like patterns A and B with the plane vector, collation between minutiae extracted from the two fingerprint-like patterns A and B can be performed with a higher degree of accuracy. Accordingly, when verification or authentication of biometric information such as a fingerprint is performed by a fingerprint verification/authentication system or a like system, authentication of the two fingerprint-like patterns A and B originating from the same fingerprint can be performed efficiently.

Further, in order to achieve a more simplified construction, the alignment-result adjustment section 32 may include neither one of the detection section 324 and the adjustment-shift calculation section 325 but instead include an adjustment-shift calculation section 325' for calculating the median of the permissible shift range calculated by the permissible-shift-range calculation section 323 as the adjustment shift.

In this instance, similarly as in the alignment result adjustment procedure described hereinabove, collation of the minutiae extracted from the fingerprint-like patterns A and B by the minutia extraction section 321 is first performed based on the alignment result of the two fingerprint-like patterns by the collation section 322. Then, a range of the shift within which one of the two fingerprint-like patterns A and B is shifted with respect to the other fingerprint-like pattern while all or some of those minutia pairs (coincidence minutia pairs) discriminated as being in a coinciding relationship by the collation section 322 maintain their coincidence relationship is calculated as the permissible shift range by the permissible-shift-range calculation section 323.

Then, the median of the permissible shift range calculated by the permissible-shift-range calculation section 323 is calculated as the adjustment shift by the adjustment-shift calculation section 325'.

Here, a calculation procedure of the adjustment shift by the adjustment-shift calculation section 325' is described in detail with reference to Table 1 below taking a case wherein the shift and the adjustment shift are rotation angles as an example.

TABLE 1

| VERIFICATION COINCIDENCE MINUTIA PAIRS | MINUTIA PAIR ROTATIONAL ANGLE RANGE | DIVIDE MINUTIA PAIR ROTATIONAL ANGLE RANGE IN A UNIT OF 1 DEGREE |
|---|---|---|
| A10, B10 | −1 degree~+2 degree | −1, 0, +1, +2 |
| A11, B11 | 0 degree~+2 degree | 0, +1, +2 |
| A12, B12 | −1 degree~+3 degree | −1, 0, +1, +2, +3 |
| A13, B13 | 0 degree~+2 degree | 0, +1, +2 |
| A14, B14 | 0 degree~+3 degree | 0, +1, +2, +3 |
| CUMULATIVE VALUE PER ANGLE | | 2, 5, 5, 5, 2 |

In Table 1 above, (A10, B10) to (A14, B14) represent minutia pairs (coincidence minutia pairs) discriminated as being in a coincidence relationship by the collation section 322. Meanwhile, the minutia pair rotation angle range is a range of the rotation angle over which one of the two fingerprint-like patterns A and B can be rotationally shifted while the coincidence minutia pairs (A10, B10) to (A14, B14) maintain their coincidence relationship. It is to be noted that A10 to A14 denote minutiae of the fingerprint-like pattern A and B10 to B14 denote minutiae of the fingerprint-like pattern B.

Here, it is possible to divide the minutia pair rotation angle ranges of the coincidence minutia pairs (A10, B10) to (A14, B14) in a unit of 1 degree, calculate the number of the coincidence minutia pairs (A10, B10) to (A14, B14) for each of the angles and determine the range of the angle which exhibits the highest cumulative value as the permissible rotation-angle range (permissible shift range). In the example of Table 1, the highest cumulative value 5 is exhibited at the angles of 0 degree, +1 degree and +2 degrees, and therefore, the permissible rotation-angle range (permissible shift range) is determined to be from 0 degree to +2 degrees.

Then, the median of the permissible rotation-angle range (permissible shift range) is calculated as the rotation-shift angle (shift adjustment value) by the adjustment-shift calculation section 325'. In the example of Table 1, +1 degree which is the median of the permissible rotation-angle range (permissible shift range) from 0 degree to +2 degrees is calculated as the rotation-shift angle (adjustment shift).

Finally, similarly as in the alignment result adjustment procedure described hereinabove, at least one of the two fingerprint-like patterns A and B is shifted by the adjustment shift calculated by the adjustment-shift calculation section 325' by the shifting section 326 thereby to perform adjustment of the alignment result by the alignment section 31.

The construction described above can further simplify the construction of the alignment-result adjustment section 32 and achieve reduction of the cost and simplification of the adjustment procedure of an alignment result. Consequently, adjustment of the alignment result can be performed at a higher speed, and therefore, augmentation of the performance of the entire alignment apparatus can be achieved.

It is to be noted that it is otherwise possible to calculate a minutia pair rotation angle range also with regard to minutia pairs present around or in the proximity of a coincidence minutia pair (peripheral minutia pairs associated with the coincidence minutia pair), that is, a range of the rotation angle within which one of the two fingerprint-like patterns A and B can be rotationally shifted with respective to the other fingerprint-like pattern while the peripheral minutia pairs maintain their coincidence relationship.

The construction just described allows checking of permissible rotation-angle ranges (permissible shift ranges) of a greater number of coincidence minutia pairs. Consequently, adjustment of the alignment result can be performed with a higher degree of accuracy.

[4] Pattern Alignment Apparatus (Second Example) as an Embodiment of the Invention

Figure 32:
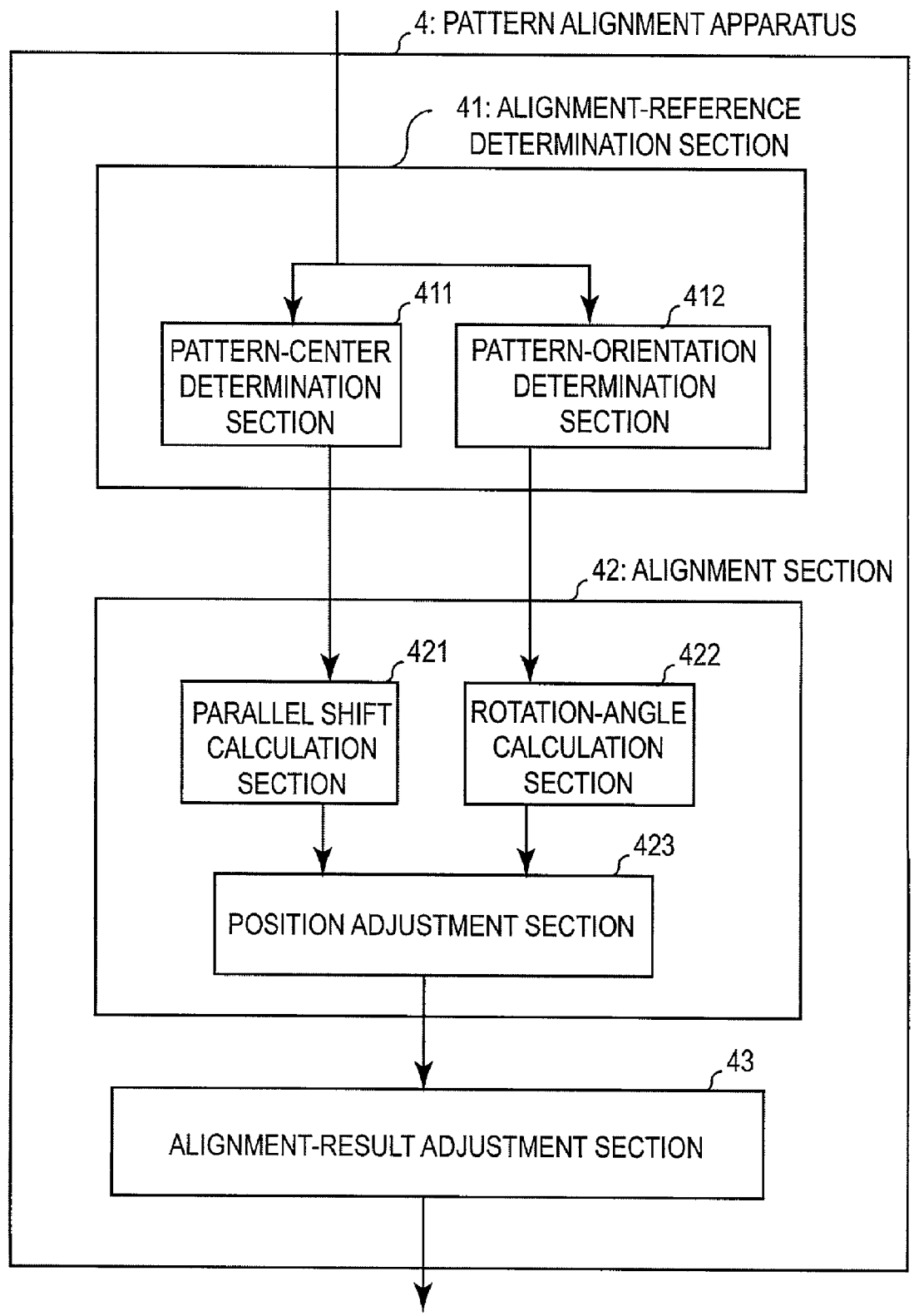
FIG. 32 is a block diagram showing a functional construction of a pattern alignment apparatus as another embodiment of the present invention.

[4-1] Structure of the Pattern Alignment Apparatus (Second Example) of the Embodiment FIG. 32 is a block diagram showing a functional construction of a pattern alignment apparatus as another embodiment of the present invention. Referring to FIG. 32, the pattern alignment apparatus 4 of the present embodiment shown includes an alignment-reference determination section 41, an alignment section 42, and an alignment-result adjusting section 43.

Also the pattern alignment apparatus 4 of the present embodiment is implemented by a computer system such as the computer system 100 shown in FIG. 2 similarly to the pattern alignment apparatus 3 described hereinabove. Also functions of the alignment-reference determination section 41, the alignment section 42 and the alignment-result adjusting section 43 of the pattern alignment apparatus 4 are implemented by a CPU or the like which executes an application program stored on a storage medium similarly to those of the components of the pattern alignment apparatus 3 described hereinabove.

Also the pattern alignment apparatus 4 shown in FIG. 32 is incorporated, for example, in a system which performs personal authentication using biometric information or a like system and performs alignment of two fingerprint-like patterns as biometric information in order to collate two groups of minutiae (for example, bifurcations, end points and so forth of ridges) extracted from two fingerprint-like patterns as biometric information upon personal authentication.

Here, the alignment of two fingerprint-like patterns signifies to detect the positional relationship and the orientational (directional) relationship between the two fingerprint-like patterns and set a plane coordinate system common to the two fingerprint-like patterns, for example, as shown in FIG. 36 based on the detected positional relationship and directional relationship. Then, based on the plane coordinate system (common coordinate axes) set commonly in this manner, two groups of minutiae extracted from the two fingerprint-like patterns are collated.

Similarly to two fingerprint-like patterns which are an object of alignment by the pattern alignment apparatus 3 described hereinabove, also fingerprint-like patterns which are an object of alignment by the pattern alignment apparatus 4 of the present embodiment are picked up in the form of a fingerprint image by the scanner 105 and inputted to the computer system 100, that is, the pattern alignment apparatus 4, when the pattern image inputting program is executed by the CPU 100-1. Or alternatively, two fingerprint-like patterns are provided in the form of a fingerprint image or pattern data through the communication network 106, the external storage apparatus 107 or the recording medium drive 108 and inputted to the computer system 100, that is, the pattern alignment apparatus 4.

In the pattern alignment apparatus 4 of FIG. 32 having the construction described above, the alignment-reference determination section 41 determines alignment references for each of the two inputted fingerprint-like patterns. The alignment-reference determination section 41 includes a pattern-center determination section 411 and a pattern-orientation determination section 412.

The pattern-center determination section 411 determines a pattern center which is used as a reference in position of each of the fingerprint-like patterns as the alignment reference. For the pattern-center determination section 411, the pattern-center determination apparatus 1 described hereinabove with reference to FIGS. 1 and 3 to 13 as the embodiment of the present invention is used.

The pattern-orientation determination section 412 determines a pattern orientation which is used as a reference in position of each of the fingerprint-like patterns as the alignment reference. For the pattern-orientation determination section 412, the pattern-orientation determination apparatus 2 described hereinabove with reference to FIGS. 14 to 26 as the embodiment of the present invention is used.

Meanwhile, the alignment section 42 performs alignment of the two fingerprint-like patterns so that the alignment references of the two fingerprint-like patterns determined by the alignment-reference determination section 41 may coincide with each other. Particularly, the alignment section 42 performs the alignment by setting a plane coordinate system common to the two fingerprint-like patterns. The alignment section 42 includes a parallel-shift calculation section 421, a rotation-angle calculation section 422, and a position adjustment section 423.

The parallel-shift calculation section 421 calculates a parallel shift by which one of the two fingerprint-like patterns should be parallelly shifted with respect to the other fingerprint-like pattern so that the pattern centers determined by the pattern-center determination section 411 coincide with each other. In other words, in order to set a plane coordinate system common to the two fingerprint-like patterns, the parallel-shift calculation section 421 determines a positional relationship of the coordinate center of the plane coordinate system between the two fingerprint-like patterns.

The rotation-angle calculation section 422 calculates a rotation angle by which one of the two fingerprint-like patterns should be rotationally shifted with respect to the other fingerprint-like pattern so that the pattern orientations determined by the pattern-orientation determination section 412 coincide with each other. In other words, in order to set a plane coordinate system common to the two fingerprint-like patterns, the rotation-angle calculation section 422 determines an orientational relationship of the coordinate axes of the plane coordinate system between the two fingerprint-like patterns.

The position adjustment section 423 adjusts the relative positions of the two fingerprint-like patterns based on the parallel shift calculated by the parallel-shift calculation section 421 and the rotation angle calculated by the rotation-angle calculation section 422 so that one of the two fingerprint-like patterns is parallelly shifted and rotationally shifted with respect to the other fingerprint-like pattern, thereby aligning the two fingerprint-like patterns. In other words, the position adjustment section 423 sets a plane coordinate system common to the two fingerprint-like patterns based on the positional relationship of the center of the plane coordinate system between the two fingerprint-like patterns determined by the parallel-shift calculation section 421 and the orientational relationship of the coordinate axes of the plane coordinate system between the two fingerprint-like patterns determined by the rotation-angle calculation section 422, thereby aligning the two fingerprint-like patterns.

The alignment-result adjustment section (alignment adjusting section) 43 adjusts a result of the alignment of the two fingerprint-like patterns based on two groups of minutiae extracted from the two fingerprint-like patterns so that the alignment result of the two fingerprint-like patterns by the alignment section 42 may be improved. In other words, the alignment-result adjusting section 43 adjusts the alignment result of the two fingerprint-like patterns by the alignment section 42, that is, adjusts the plane coordinate system set commonly to the two fingerprint-like patterns so as to improve a coincidence relationship of the two groups of minutiae extracted from the two fingerprint-like patterns, which is based on the alignment result of the two fingerprint-like patterns by the alignment section 42 between the group of object minutiae for verification and the group of registered minutiae, may be improved, that is, so that the number of minutia pairs discriminated as being in a coincidence relationship may be increased. The alignment-result adjusting section 43 has a similar construction to that of the alignment-result adjustment section 32 of the pattern alignment apparatus 3 described hereinabove with reference to FIGS. 27 to 31 as the second embodiment of the present invention.

Figure 33:
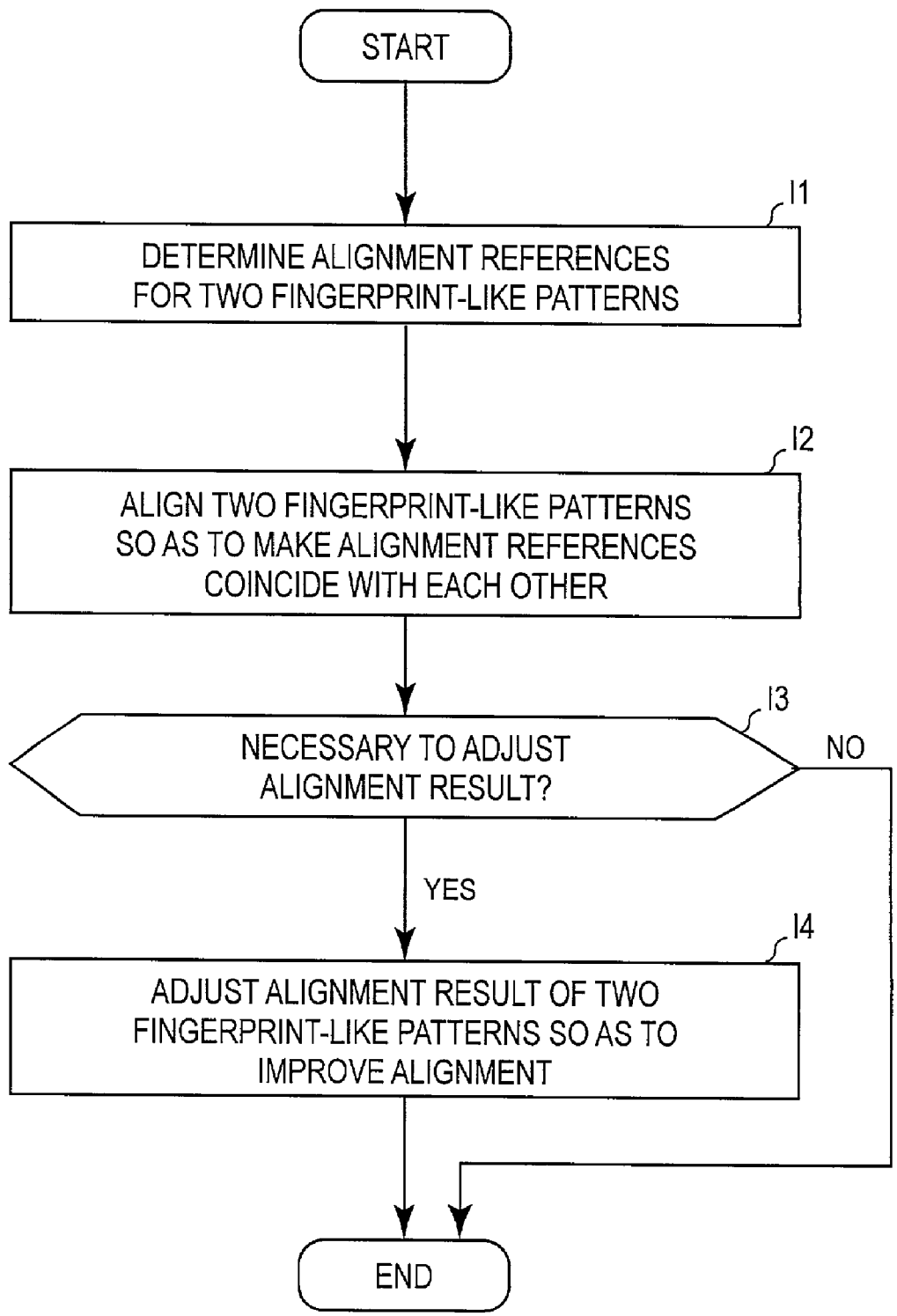
FIG. 33 is a flow chart illustrating a pattern alignment procedure by the pattern alignment apparatus of the embodiment.

[4-2] Operation of the Pattern Alignment Apparatus (Second Example) of the Embodiment Subsequently, a pattern alignment procedure executed by the pattern alignment apparatus of the present embodiment is described with reference to a flow chart (steps I1 to I4) of FIG. 33.

When two fingerprint-like patterns of an object of pattern alignment are inputted each in the form of a pattern image or pattern data described hereinabove to the pattern alignment apparatus 4 of the present embodiment, alignment references for the two fingerprint-like patterns of the object of alignment are first determined by the alignment-reference determination section 41 (step I1)

More particularly, the centers of the fingerprint-like patterns are determined as the alignment references in accordance with the procedure described hereinabove with reference to FIG. 4 by the pattern-center determination section 411, and the orientations of the fingerprint-like patterns are determined as the alignment references in accordance with the procedure described hereinabove with reference to FIG. 16 by the pattern-orientation determination section 412.

Then, alignment of the two fingerprint-like patterns is performed by the alignment section 42 so that the alignment references of the two fingerprint-like patterns determined in step I1 may coincide with each other (step I2).

In particular, in order to set a plane coordinate system common to the two fingerprint-like patterns, a positional relationship of the coordinate center of the plane coordinate system between the two fingerprint-like patterns is determined by the parallel-shift calculation section 421, and an orientational relationship of the coordinate axes of the plane coordinate system between the two fingerprint-like patterns is determined by the rotation-angle calculation section 422.

Then, a plane coordinate system common to the two fingerprint-like patterns is set based on the positional relationship of the coordinate center of the plane coordinate system between the two fingerprint-like patterns determined by the parallel-shift calculation section 421 and the orientational relationship of the coordinate axes of the plane coordinate system between the two fingerprint-like patterns determined by the rotation-angle calculation section 422.

More particularly, a parallel shift by which one of the two fingerprint-like patterns is to be parallelly shifted with respective to the other fingerprint-like pattern so that the pattern centers determined by the pattern-center determination section 411 may coincide with each other is calculated by the parallel-shift calculation section 421. Further, a rotation angle by which one of the two fingerprint-like patterns is to be rotationally shifted with respective to the other fingerprint-like pattern so that the pattern orientations determined by the pattern-orientation determination section 412 may coincide with each other is calculated by the rotation-angle calculation section 422. Then, the positions of the two fingerprint-like patterns are adjusted by parallelly and rotationally shifting one of the two fingerprint-like patterns with respective to the other fingerprint-like pattern by the position adjustment section 423 based on the parallel shift calculated by the parallel shift calculation section 421 and the rotation angle calculated by the rotation angle calculation section 422.

Then, it is discriminated whether or not it is necessary to adjust a result of the alignment in step I2 (step I3). In particular, a predetermined criterion is provided in accordance with a type of object fingerprint-like patterns or a picked up state of the fingerprint-like patterns. For example, only when the state of pattern data or a pattern image used is not favorable, it is determined that it is necessary to adjust the alignment result. Or, it is determined in advance that the alignment result is adjusted in any case.

Then, if it is discriminated that it is necessary to adjust the alignment result (YES route of step I3), then the alignment result of the two fingerprint-like patterns is adjusted based on minutiae extracted from the fingerprint-like patterns so that the alignment result of the two fingerprint-like patterns by the alignment section 42 may be improved in accordance with the procedure described hereinabove with reference to FIG. 28 (step I4). More particularly, two groups of minutiae are extracted from the two fingerprint-like patterns, and collation of the minutiae is performed based on the alignment result of the two fingerprint-like patterns in step I2. Then, the alignment result of the two fingerprint-like patterns in step I2 is adjusted, that is, the plane coordinate system set commonly to the two fingerprint-like patterns is adjusted, so that the coincidence relationship of the minutiae may be improved, that is, so that the number of minutia pairs discriminated as being in a coincidence relationship may be increased.

Then, when the adjustment of the alignment result of the two fingerprint-like patterns in step I4 is completed, the alignment result of the two fingerprint-like patterns adjusted by the alignment-result adjusting section 43, that is, the adjusted alignment result, is outputted to the display unit 103 or the printer 104 connected to the computer system 100 (a pattern verification apparatus 5) shown in FIG. 2 or to an external apparatus of the computer system 100 through outputting means connected to the computer system 100 over the communication network 106. On the other hand, if it is discriminated in step I3 that it is not necessary to adjust the alignment result (NO route of step I3), then the alignment result of the two fingerprint-like patterns by the alignment section 42 is outputted similarly. Based on the output result, collation of the minutiae extracted from the two fingerprint-like patterns or some other necessary operation is performed by an operator of the pattern alignment apparatus 4 or collation means of a computer system or the like connected to the pattern alignment apparatus 4.

In this manner, with the pattern alignment apparatus 4 of the present embodiment, auxiliary lines P, P1, P2 and P3 are generated based on local pattern orientations and the pattern center O is determined based on the auxiliary lines P, P1, P2 and P3 using a construction similar to that of the pattern-center determination apparatus 1 of the embodiment of the present invention. Therefore, contents of the determination process of the pattern center O can be limited to repetitions of simple arithmetic operation for local configurations of the fingerprint-like patterns. Therefore, the calculation amount required for the determination process of the pattern center O can be reduced significantly, and the pattern center O can be determined certainly at a high speed as an alignment reference. Further, alignment of the two fingerprint-like patterns can be preformed efficiently using the alignment reference.

Further, in order to determine the alignment reference, a construction similar to that of the pattern-orientation determination apparatus 2 of the embodiment of the present invention is used to generate a reference circle C of a predetermined radius centered at the pattern center O, determine a reference point P for indication of a pattern orientation based on the directions of the reference circle C and the directions of pattern curves at intersecting points of the reference circle C and the pattern curves, and determine the direction of a reference straight line s which passes the reference point P and the pattern center O as the pattern orientation. Consequently, a pattern orientation for reference to an orientation common to the fingerprint-like pattern images can be determined certainly at a high speed as an alignment reference through repetitions of simple arithmetic operation for local configurations of the fingerprint-like patterns. Further, alignment of the two fingerprint-like patterns can be preformed efficiently using the alignment reference.

Furthermore, when alignment of the two fingerprint-like patterns is to be performed using the alignment references (pattern centers and pattern orientations), a parallel shift by which one of the fingerprint-like patterns is to be parallelly shifted with respect to the other fingerprint-like pattern so that the pattern centers of the two fingerprint-like patterns may coincide with each other and a rotation angle by which one of the fingerprint-like patterns is to be rotationally shifted with respect to the other fingerprint-like pattern so that the pattern orientations of the two fingerprint-like patterns may coincide with each other are calculated, and the positions of the patterns are adjusted by parallelly and rotationally shifting one of the fingerprint-like pattern with respect to the other fingerprint-like pattern based on the parallel shift and the rotation angle thus calculated. Consequently, alignment of the two fingerprint-like patterns can be performed efficiently with a simple construction.

Further, an adjustment shift which augments (improves) the alignment result of the two fingerprint-like patterns by the alignment section 42 is determined based on the alignment result and shift and adjustment of the two fingerprint-like patterns are performed based on the adjustment shift using a construction similar to that of the alignment-result adjustment section 32 provided in the pattern alignment apparatus 3 of the embodiment of the present invention.

Therefore, alignment of the two fingerprint-like patterns can be performed with a higher degree of accuracy through addition of simple arithmetic operation for local configurations of the fingerprint-like patterns. Consequently, collation of minutiae extracted from the two fingerprint-like patterns and some other operation can be preformed efficiently.

[4-3] Others

The alignment-reference determination section 41 may otherwise include only one of the pattern-center determination section 411 and the pattern-orientation determination section 412 and additionally include different alignment-reference determination means for determining another kind of alignment reference.

This construction allows various combinations with various alignment means other than the pattern-center determination section 411 or the pattern-orientation determination section 412 in the present embodiment. Consequently, the pattern alignment apparatus 4 of the present embodiment can be introduced efficiently while existing alignment means remains parallelly applicable.

Further, the pattern alignment apparatus 4 may be constructed otherwise such that the CPU 100-1 of the computer system 100 (pattern alignment apparatus 4) shown in FIG. 2 executes a program for extracting two groups of minutiae from the two fingerprint-like patterns based on the alignment result of the two fingerprint-like patterns by the alignment section 42 and for collating the two groups of minutiae based on the alignment result of the two fingerprint-like patterns by the alignment section 42 or the adjusted alignment result of the two fingerprint-like patterns by the alignment-result adjusting section 43 is delivered to the program in the computer system 100 (pattern alignment apparatus 4).

With the construction just described, subsequently to completion of the alignment of the two fingerprint-like patterns, two groups of minutiae are extracted from the two fingerprint-like patterns and collated with each other automatically. Therefore, where the pattern alignment apparatus 4 of the present embodiment is applied to a fingerprint verification system of a personal authentication system or a like system, extraction and collation of minutiae from fingerprint-like patterns can be performed efficiently.

Furthermore, the pattern alignment apparatus 4 may be constructed otherwise such that it does not include the alignment adjusting section 43 and outputs a result of collation of the group of object minutiae for collation and the group of registered minutiae by the alignment section 42 as it is as a final result.

This construction allows reduction of the time required for the alignment process of the two fingerprint-like patterns and simplification of the construction of the entire apparatus.

[5] Pattern Verification Apparatus as an Embodiment of the Invention

[5-1] Structure of the Pattern Verification Apparatus of the Embodiment

Figure 34:
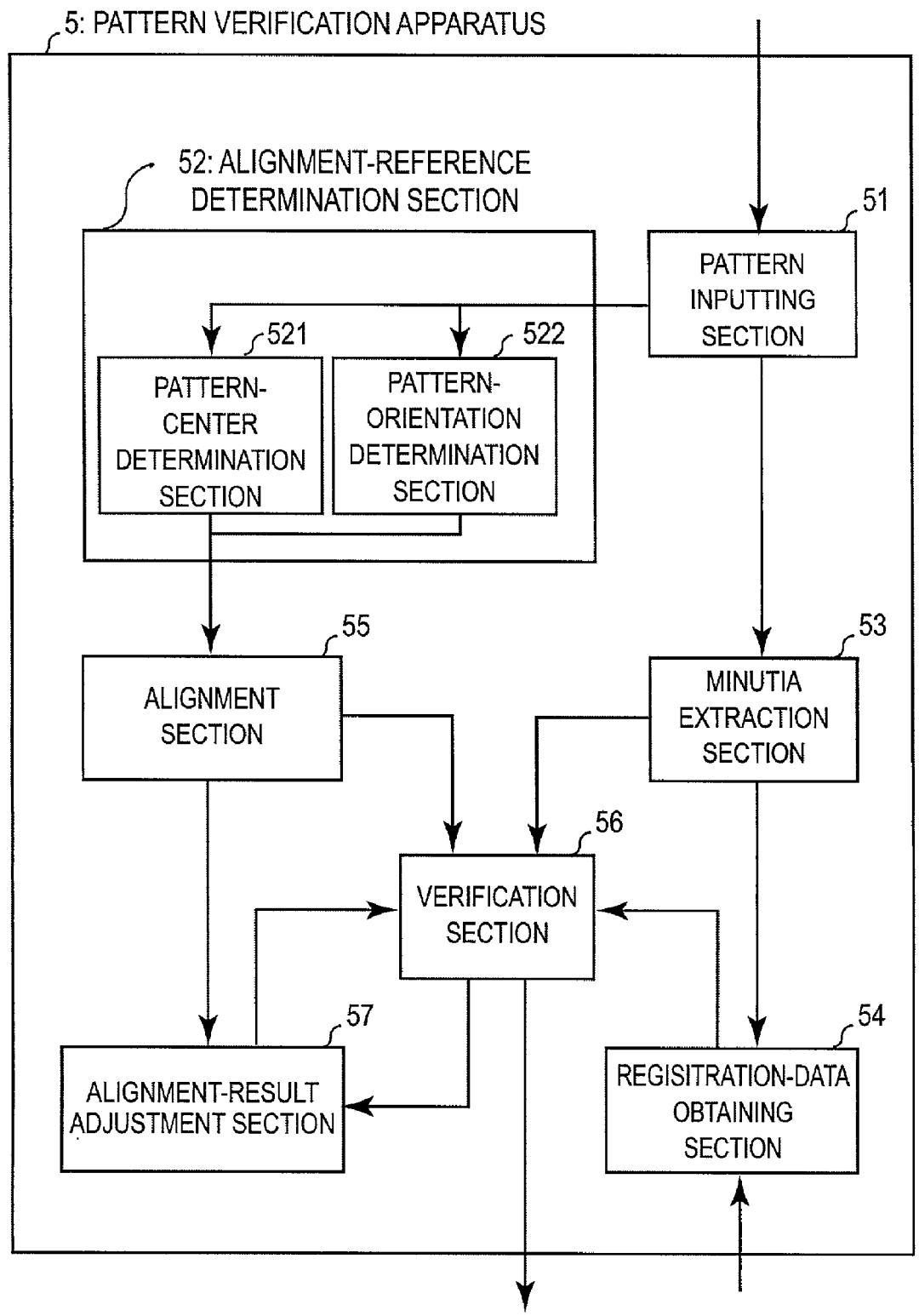
FIG. 34 is a block diagram showing a functional construction of a pattern verification apparatus as an embodiment of the present invention.

FIG. 34 is a block diagram showing a functional construction of a pattern verification apparatus 5 as an embodiment of the present invention. Referring to FIG. 34, the pattern verification apparatus 5 of the present embodiment shown includes a pattern inputting section 51, an alignment-reference determination section 52, a minutia extraction section 53, a registration-data obtaining section 54, an alignment section 55, a verification section 56, and an alignment-result adjustment section 57.

Also the pattern verification apparatus 5 of the present embodiment is implemented by a computer system such as the computer system 100 shown in FIG. 2 similarly to the pattern-center determination apparatus 1, pattern-orientation determination apparatus 2 and pattern alignment apparatus 3 and 4 of the embodiments of the present invention described hereinabove. Also functions of the pattern inputting section 51, the alignment-reference determination section 52, the minutia extraction section 53, the registration-data obtaining section 54, the alignment section 55, the verification section 56 and the alignment-result adjustment section 57 of the pattern verification apparatus 5 are implemented by a CPU or the like which executes an application program stored on a storage medium similarly to those of the components of the pattern-center determination apparatus 1, the pattern-orientation determination apparatus 2, and the pattern alignment apparatus 3 and 4 described hereinabove.

Also the pattern verification apparatus 5 shown in FIG. 34 is incorporated, for example, in a system which performs personal authentication using biometric information or a like system and verifies a group of minutiae being object for verification, which minutiae are extracted from a fingerprint-like pattern of an object of authentication (verification), that is, from an object fingerprint-like pattern, with a group of registered minutiae extracted from a fingerprint-like pattern registered in advance, that is, from a registered fingerprint-like pattern, by collating these two groups of minutiae (the group of object minutiae and the group of registered minutiae), in order to discriminate whether or not the object fingerprint-like pattern and the registered fingerprint-like pattern are identical.

As the collation of the two groups of minutiae extracted from the two fingerprint-like patterns, each minutia of one group and a respective minutia, which is assumed to corresponding to each minutia of the first group, of the other group are paired and compared with each other in terms of attributes such as the positions, types and directions of minutiae so as to check whether or not the attributes of them coincide with each other. After such collation of minutiae is performed for all or some of minutiae pairs, it is discriminated based on a result of the collation whether or not the two fingerprint-like patterns are identical.

The pattern inputting section 51 of the pattern verification apparatus 5 of FIG. 34 receives an object fingerprint-like pattern mentioned above as an input thereto. The pattern inputting section 51 may be any of the scanner 105, the communication network 106, the external storage apparatus 107 and the recording medium drive 108 described hereinabove with reference to FIG. 2. In particular, as the pattern image inputting program is executed by the CPU 100-1, the object fingerprint-like pattern is picked up in the form of a pattern image and inputted to the computer system 100 (that is, the pattern verification apparatus 5). Or else, the fingerprint-like image being an object for verification is provided in the form of a pattern image from the communication network 106, the external storage apparatus 107 or the recording medium drive 108 and inputted to the computer system 100 (that is, the pattern verification apparatus 5).

The alignment-reference determination section 52 determines an alignment reference for the object fingerprint-like pattern inputted from the pattern inputting section 51. The alignment-reference determination section 52 includes a pattern-center determination apparatus 521 and a pattern-orientation determination apparatus 522.

The pattern-center determination apparatus 521 determines a pattern center, which serves as a reference to the position of the object fingerprint-like pattern, as the alignment reference. The pattern-center determination apparatus 521 may be the pattern-center determination apparatus 1 described hereinabove as the embodiment of the present invention with reference to FIGS. 1 and 3 to 13.

The pattern-orientation determination apparatus 522 determines a pattern orientation, which serves as a reference to the orientation of the object fingerprint-like pattern, as the alignment reference. The pattern-orientation determination apparatus 522 may be the pattern-orientation determination apparatus 2 described hereinabove as the embodiment of the present invention with reference to FIGS. 14 to 26.

The minutia extraction section 53 extracts a group of minutiae being objects for verification (object minutiae) from the fingerprint-like pattern inputted from the pattern inputting section 51. More particularly, the minutia extraction section 53 detects attributes such as the positions, types and directions of the object minutiae included in the object fingerprint-like pattern inputted as a pattern image or pattern data.

The registration-data obtaining section 54 obtains registration data including the group of registered minutiae and the alignment references (hereinafter referred to as registered alignment references) of the registered fingerprint-like pattern. The registration-data obtaining section 54 may be any of the scanner 105, the communication network 106, the external storage apparatus 107 and the recording medium drive 108 described hereinabove with reference to FIG. 2. The registration data are generated based on the registered fingerprint-like pattern picked up in the form of a pattern image in advance and then stored into the external storage apparatus 107 or the recording medium drive 108 connected to the computer system 100 (that is, the pattern verification apparatus 5) described hereinabove with reference to FIG. 2 or stored into a storage apparatus (not shown), which can be accessed through the communication network 106, so that they are placed into an accessible state from the computer system 100.

The term "registered minutiae" signifies minutiae (for example, bifurcations, end points and so forth of ridges) included in the registered fingerprint-like patterns, and attributes such as the position, type and direction of the registered minutiae are detected based on the registered fingerprint-like pattern picked up in the form of a fingerprint image by such means as a scanner. Further, alignment references such as the pattern center and the pattern orientation which are used as the references to the position and the orientation of the registered fingerprint-like pattern are determined as registered alignment references. The registration data include registered minutiae each represented by attributes such as the position, type and direction and registered alignment references determined in advance.

The alignment section 55 performs alignment of the group of object minutiae and the group of registered minutiae so that the alignment references for verification determined by the alignment-reference determination section 52 and the registered alignment references obtained by the registration-data obtaining section 54 may coincide with each other. More particularly, the alignment section 55 sets a plane coordinate system (common coordinate axes) common to the object minutiae and the registered minutiae as seen in FIG. 36 to perform the alignment. The alignment section 55 may be the alignment section 42 of the pattern alignment apparatus 4 described hereinabove as the embodiment of the present invention with reference to FIGS. 32 and 33.

The verification section 56 performs verification of the object minutiae and the registered minutiae based on a result of the alignment by the alignment section 55. More particularly, the verification section 56 compares the attributes of the object minutiae and the registered minutiae with each other on the basis of the plane coordinate system set commonly to the group of object minutiae and the group of registered minutiae to detect a coincidence relationship between these minutia group and outputs a result of the detection. Thus, an operator of the pattern verification apparatus 5 or discrimination means such as a computer system connected to the pattern verification apparatus 5 discriminates based on a result outputted from the verification section 56, that is, a result of the detection of the coincidence relationship of the minutiae, whether or not the object fingerprint-like pattern for verification from which the object minutiae originate and the registered fingerprint-like pattern from which the registered minutiae originate are identical with each other.

The alignment-result adjustment section 57 adjusts the alignment result of the object minutiae and the registered minutiae by the alignment section 55 based on a result of the verification of the object minutiae with the registered minutiae by the verification section 56 so that the alignment result may be improved. In other words, the alignment-result adjustment section 57 adjusts the alignment result of the object minutiae and the registered minutiae, that is, adjusts the plane coordinate system set commonly to the object minutiae and the registered minutiae, so that the coincidence relationship between the object minutiae and the registered minutiae detected by the verification section 56 may be improved, that is, so that the number of minutia pairs which are discriminated as being in the coincidence relationship may be increased. The alignment-result adjustment section 57 may have a similar construction to that of the alignment-result adjustment section 32 of the pattern alignment apparatus 3 described hereinabove as the embodiment of the present invention with reference to FIGS. 27 to 31. However, the verification section 56 additionally has the function of the collation section 322 provided in the alignment-result adjustment section 32.

[5-2] Operation of the Pattern Verification Apparatus of the Embodiment

Now, a pattern verification procedure executed by the pattern verification apparatus 5 of the present embodiment is described with reference to a flow chart (steps J1 to J8) of FIG. 35.

Figure 35:
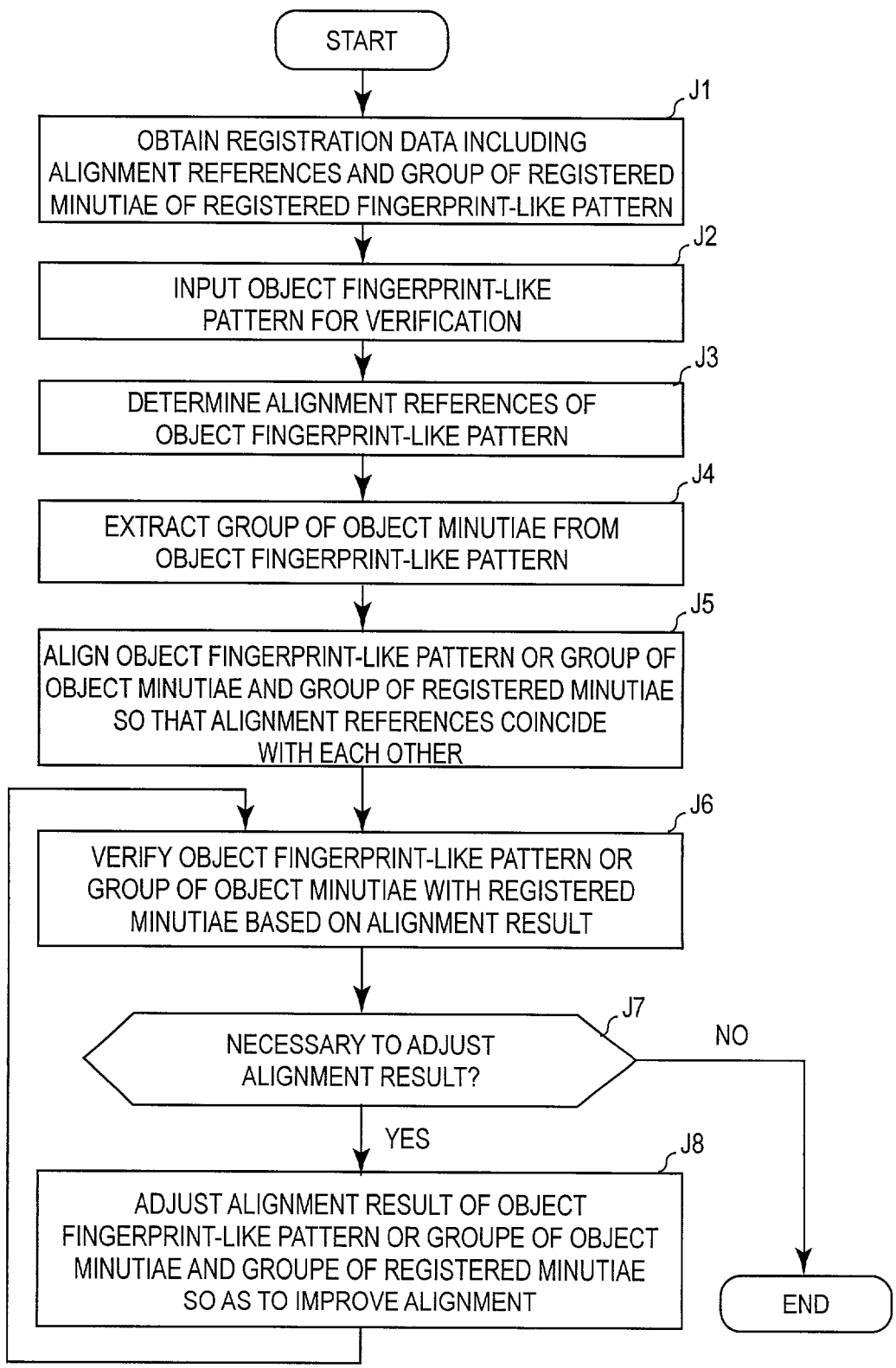
FIG. 35 is a flow chart illustrating a pattern verification procedure by the pattern verification apparatus of the present invention.

Referring to FIG. 35, registration data including the registered minutiae and the registered alignment references are first obtained by the registration-data obtaining section 54 (step J1). In particular, the registration data are stored into the external storage apparatus 107 or the recording medium drive 108 of FIG. 2 or stored into a different storage apparatus (not shown) which can be accessed through the communication network 106 so that they are placed into an accessible state from the computer system 100 (pattern verification apparatus 5).

Then, the object fingerprint-like pattern is inputted from the pattern inputting section 51 (step J2). In particular, either the object fingerprint-like pattern picked up as a pattern image by the scanner 105 is inputted to the computer system 100 (pattern verification apparatus 5), or the object fingerprint-like pattern is inputted as pattern data through the external storage apparatus 107, recording medium drive 108 or communication network 106 to the computer system 100 (pattern verification apparatus 5)

Thereafter, the alignment references of the object fingerprint-like pattern are determined by the alignment-reference determination section 52 (step J3). In particular, the pattern center of the object fingerprint-like pattern is determined as an alignment reference described above by the pattern-center determination apparatus 521 in accordance with the procedure described hereinabove with reference to FIG. 4. Then, the pattern orientation of the object fingerprint-like pattern is determined as another alignment reference described above by the pattern-orientation determination apparatus 522 in accordance with the procedure described hereinabove with reference to FIG. 16.

Further, the object minutiae are extracted from the fingerprint-like pattern inputted in step J2 by the minutia extraction section 53 (step J4). More particularly, attributes such as the position, type and direction are detected from each of minutiae (object minutiae; for example, bifurcations, end points and so forth of ridges of a fingerprint) included in the fingerprint-like pattern inputted as a pattern image or pattern data.

Then, alignment of the object minutiae and the registered minutiae is performed by the alignment section 55 so that the registered alignment references obtained in step J1 and the alignment references for verification determined in step J3 may coincide with each other (step J5). More particularly, a plane coordinate system common to the object minutiae and the registered minutiae is set in accordance with the alignment procedure by the pattern alignment apparatus 4 (alignment section 42) described hereinabove with reference to FIGS. 32 and 33 so that the registered alignment references and the alignment references for verification may coincide with each other.

Thereafter, verification of the object minutiae with the registered minutiae is performed based on a result of the alignment in step J5 by the verification section 56 (step J6). In particular, the attributes of the object minutiae and the registered minutiae are compared with each other based on the plane coordinate system set commonly to the object minutiae and the registered minutiae in step J5 to detect the coincidence relationship between the minutiae.

Then, it is discriminated whether or not it is necessary to adjust the alignment result in step J5 (step J7). More particularly, a predetermined criterion is provided in accordance with the type of the fingerprint-like pattern of the object or the condition in which the registered fingerprint-like pattern and the object fingerprint-like pattern are picked up. For example, when the number of coincidence minutia pairs falls within a predetermined range, it is discriminated that it is necessary to adjust the alignment result. Or, the number of times by which the alignment result is adjusted is determined in advance.

If it is discriminated that it is necessary to adjust the alignment result (YES route of step J7), then the alignment result of the minutia for verification and the registered minutia is adjusted by the alignment-result adjustment section 57 based on the verification result of the object minutiae with the registered minutiae in step J6 so that the alignment result of the object minutiae and the registered minutiae in step J5 may be improved in accordance with a procedure similar to the procedure described hereinabove with reference to FIG. 28 (step J8). More particularly, the alignment result of the object minutiae and the registered minutiae in step J5 is adjusted, that is, the plane coordinate system set commonly to the object minutiae and the registered minutiae is adjusted, so that the coincidence relationship between the object minutiae and the registered minutiae determined in step J6 may be improved, that is, so that the number of minutia pairs discriminated as being in a coincidence relationship may be increased.

Thereafter, verification of the object minutiae with the registered minutiae is performed again by the verification section 56 based on a new result of the alignment of the object minutiae and the registered minutiae adjusted in step J7 (step JE), and then the discrimination in step J5 of whether or not it is necessary to adjust the alignment result in step J5 is performed (step J7).

Then, if it is discriminated that it is not necessary to adjust the alignment result (NO route of step J7), then the verification result of the object minutiae with the registered minutiae by the verification section 56 is outputted to the display unit 103 or the printer 104 connected to the computer system 100 (pattern verification apparatus 5) shown in FIG. 2 or outputted to the outside of the computer system 100 through outputting means connected to the computer system 100 over the communication network 106. An operator of the pattern verification apparatus 5 or discrimination means such as a computer system connected to the pattern verification apparatus 5 discriminates based on the output result whether or not the fingerprint-like pattern from which the object minutiae originate and the registered fingerprint-like pattern from which the registered minutiae originate are identical with each other.

In this manner, with the pattern verification apparatus 5 of the present embodiment, upon determination of alignment references, auxiliary lines P, P1, P2 and P3 are generated making use of local pattern orientations and the pattern center O is determined based on the auxiliary lines P, P1, P2 and P3 in a similar manner as in the pattern-center determination apparatus 1 of the embodiment of the present invention. Therefore, contents of the determination process of the pattern center O can be limited to repetitions of simple arithmetic operation for local configurations of the fingerprint-like patterns. Therefore, the calculation amount required for the determination process of the pattern center O can be reduced significantly, and the pattern center O can be determined certainly at a high speed as an alignment reference. Further, verification of the object minutiae with the registered minutiae can be performed efficiently by performing alignment of the object minutiae and the registered minutiae using the alignment reference.

Further, in order to determine the alignment reference, a reference circle C of a predetermined radius centered at the pattern center O is generated and a reference point P for indication of a pattern orientation is determined based on the relationship between the directions of the reference circle C and the directions of pattern curves at intersecting points of the reference circle C and the pattern curves, and then the direction of a reference straight line s which passes the reference point P and the pattern center O is determined as a pattern orientation, similarly as in the pattern-orientation determination apparatus 2 of the embodiment of the present invention. Consequently, a pattern orientation as a reference to the orientation common to the fingerprint-like pattern images can be determined at a high speed and with certainty as an alignment reference through repetitions of simple arithmetic operation for local configurations of the fingerprint-like patterns. Further, alignment of the object minutiae and the registered minutiae can be preformed efficiently using the alignment reference.

Further, an adjustment shift with which the alignment result of the object minutiae and the registered minutiae by the alignment section 55 is improved is determined based on the alignment result and shift and adjustment of the object minutiae and the registered minutiae are performed based on the adjustment shift. Therefore, verification of the object minutiae with the registered minutiae can be performed with a higher degree of accuracy through addition of simple arithmetic operation for local configurations of the fingerprint-like patterns. Therefore, authentication between the object fingerprint-like pattern and the registered fingerprint-like pattern can be preformed efficiently.

[5-3] Others

The pattern verification apparatus 5 may be constructed otherwise such that picking up of the fingerprint-like pattern and generation of the registration data are performed using the pattern inputting section 51, the alignment-reference determination section 52 and the minutia extraction section 53. In this instance, in step J1 of FIG. 35, the registered fingerprint-like pattern is inputted from the pattern inputting section 51 first, and alignment references for the registered fingerprint-like pattern, that is, alignment references for registration, are determined by the alignment-reference determination section 52 and then minutiae included in the registered fingerprint-like pattern, that is, registered minutiae, are extracted by the minutia extraction section 53, whereafter the alignment references for registration and the registered minutiae are obtained as registration data by the alignment section 55.

With the pattern verification apparatus 5 of the modified construction described above, also the registered fingerprint-like pattern is subject to processes of pattern inputting, determination of alignment references and minutia extraction common to the processes for the object fingerprint-like pattern. This allows registration data regarding the registered fingerprint-like pattern to be generated efficiently making the most of an existing construction used for the object fingerprint-like pattern and thus contributes to simplification and miniaturization of the apparatus.

Further, the alignment-reference determination section 52 may otherwise include only either one of the pattern-center determination apparatus 521 and the pattern-orientation determination apparatus 522 and additionally include different alignment reference determination means for determining another alignment reference.

This construction allows various combinations with various alignment means other than the pattern-center determination apparatus 521 or the pattern orientation determination apparatus 522 in the present embodiment. Consequently, the pattern verification apparatus 5 of the present embodiment can be introduced efficiently while existing alignment means remains parallelly applicable.

Further, not only the object minutiae extracted from the object fingerprint-like pattern but also the object fingerprint-like pattern may be used to perform alignment processing by the alignment section 55 and adjustment processing of the alignment processing by the alignment result adjustment section 57. In this instance, in addition, to the pattern image or pattern data of the object fingerprint-like pattern, the alignment references for verification determined by the alignment-reference determination section 52 and the object minutiae extracted by the minutia extraction section 53 are delivered as data for verification to the alignment section 55, verification section 56 and alignment result adjustment section 57, by which respective processes are performed.

Also it is possible to adopt such a construction that the CPU 100-1 of the computer system 100 (pattern verification apparatus 5) shown in FIG. 2 executes a program for discriminating under a fixed criterion based on the verification result of the object minutiae with the registered minutiae by the verification section 56 whether or not the object fingerprint-like pattern and the registered fingerprint-like pattern are identical with each other and the verification result of the object minutiae with the registered minutiae by the verification section 56 is delivered to the program in the computer system 100 (pattern verification apparatus 5).

With the construction just described, since it is automatically discriminated subsequently to completion of the verification of the object minutiae with the registered minutiae whether or not the object fingerprint-like pattern and the registered fingerprint-like pattern are identical with each other, where the pattern verification apparatus 5 of the present embodiment is applied to a personal authentication system or a like system, personal authentication based on the verification of the fingerprint-like patterns can be performed efficiently.

Further, the pattern verification apparatus 5 may be constructed otherwise such that it does not include the alignment-result adjustment section 57 and the verification result of the object minutiae with the registered minutiae is outputted as it is as a final result.

The construction just described allows reduction of the time required for the verification process of the object minutiae with the registered minutiae and allows achievement of simplification of the construction of the entire apparatus.

The present invention is not limited to the embodiments specifically described above, and variations and modifications can be made without departing from the scope of the present invention.

What is claimed is:

1. A pattern-center determination apparatus
  for determining a pattern center of a fingerprint-like pattern, which is formed with a number of pattern curves, said apparatus comprising:
  an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments; and
  a pattern-center determination section for determining the pattern center based on one or more intersecting points at which the two or more auxiliary lines generated by said auxiliary-line generation section intersect with each other;
  wherein said auxiliary-line generation section includes:
  a start-point setting section for setting an arbitrary point of the fingerprint-like pattern as a start point;
  a reference-circle generation section for generating a reference circle of a predetermined radius centered at the start point set by said start-point setting section;
  a reference-circle-intersecting-point calculation section for calculating intersecting points of the reference circle generated by said reference-circle generation section and the pattern curves of the fingerprint-like pattern;
  an intersecting-point extraction section for extracting those two of the intersecting points calculated by said reference-circle-intersecting-point calculation section which satisfy a predetermined condition;
  an end-point calculation section for calculating a middle point of the two intersecting points extracted by said intersecting-point extraction section as an end point; and a line-segment generation section for generating a line segment interconnecting the start point set by said start-point setting section and the end point calculated by said end-point calculation section;

wherein said start-point setting section is operable to set the end point as a new start point so that said reference-circle generation section, said reference-circle-intersecting-point calculation section, said intersecting-point extraction section, said end-point calculation section and said line-segment generation section repeatedly generate a new line segment, thereby generating the auxiliary line as a number of successive line segments.

2. A pattern-center determination apparatus as claimed in claim 1, wherein said auxiliary-line generation section is operable to generate two auxiliary lines, and said pattern-center determination section is operable to determine an intersecting point at which the two auxiliary lines generated by said auxiliary-line generation section intersect with each other as the pattern center.

3. A pattern-center determination apparatus as claimed in claim 1, wherein said auxiliary-line generation section is operable to generate three or more auxiliary lines, and said pattern-center determination section includes an auxiliary-line-intersecting-point calculation section for calculating one or more intersecting points at which the three or more auxiliary lines generated by said auxiliary-line generation section intersect with each other, and a most-crowded-point calculation section for calculating a most crowded point, at which the intersecting points calculated by said auxiliary-line-intersecting-point calculation section are most crowded, so as to determine the calculated most crowded point as the pattern center.

4. A pattern-center determination apparatus for determining a pattern center of a fingerprint-like pattern, which is formed with a number of pattern curves, said apparatus comprising:

an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments; and a pattern-center determination section for determining the pattern center based on one or more intersecting points at which the two or more auxiliary lines generated by said auxiliary-line generation section intersect with each other;

wherein said auxiliary-line generation section includes:

a first-auxiliary-point setting section for setting two arbitrary points on an arbitrary one of pattern curves which form the fingerprint-like pattern as two first auxiliary points;

a start-point calculation section for calculating a middle point of the two first auxiliary points set by said first-auxiliary-point setting section as a start point;

an auxiliary-line-segment generation section for generating an auxiliary-line segment interconnecting the two first auxiliary points set by said first-auxiliary-point setting section;

a perpendicular-bisector generation section for generating a perpendicular bisector to the auxiliary-line segment generated by said auxiliary-line-segment generation section;

a perpendicular-bisector-intersecting-point calculation section for calculating that one of intersecting points of the perpendicular bisector generated by said perpendicular-bisector generation section and the pattern curves of the fingerprint-like pattern which is present on a particular side with respect to the start point and positioned nearest to the start point;

a node calculation section for calculating a point on the perpendicular bisector spaced by a predetermined distance toward the particular side from the intersecting point calculated by said perpendicular-bisector-intersecting-point calculation section as a node;

a straight-line generation section for generating a straight line which passes the node calculated by said node calculation section and intersects orthogonally with the perpendicular bisector;

a second-auxiliary-point calculation section for calculating those two of intersecting points of the straight line generated by said straight-line generation section and the pattern curves of the fingerprint-like pattern which are on the opposite sides of the node and are positioned nearest to the node as second auxiliary points;

an end-point calculation section for calculating a middle point of the two second auxiliary points calculated by said second-auxiliary-point calculation section as an end point;

a first-line-segment generation section for generating a first line segment interconnecting the start point calculated by said start-point calculation section and the node calculated by said node calculation section; and a second-line-segment generation section for generating a second line segment interconnecting the node calculated by said node calculation section and the end point calculated by said end-point calculation section;

wherein said first-auxiliary-point setting section is operable to set the two second auxiliary points as new first auxiliary points so that said start-point calculation section, said auxiliary-line-segment generation section, said perpendicular-bisector generation section, said perpendicular-bisector-intersecting-point calculation section, said node calculation section, said straight-line generation section, said second-auxiliary-point calculation section, said end-point calculation section, said first-line-segment generation section and said second-line-segment generation section repeatedly generate new first and second line segments, thereby generating the auxiliary line as a number of alternately successive first and second line segments.

5. A pattern-center determination apparatus as claimed in claim 4, wherein said auxiliary-line generation section is operable to generate two auxiliary lines, and said pattern-center determination section is operable to determine an intersecting point at which the two auxiliary lines generated by said auxiliary-line generation section intersect with each other as the pattern center.

6. A pattern-center determination apparatus as claimed in claim 4, wherein said auxiliary-line generation section is operable to generate three or more auxiliary lines, and said pattern-center determination section includes an auxiliary-line-intersecting-point calculation section for calculating one or more intersecting points at which the three or more auxiliary lines generated by said auxiliary-line generation section intersect with each other, and a most-crowded-point calculation section for calculating a most crowded point, at which the intersecting points calculated by said auxiliary-line-intersecting-point calculation section are most crowded, so as to determine the calculated most crowded point as the pattern center.

7. A pattern-center determination apparatus for determining a pattern center of a fingerprint-like pattern, which is formed with a number of pattern curves, said apparatus comprising:

an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments; and a pattern-center determination section for determining the pattern center based on one or more intersecting points at which the two or more auxiliary lines generated by said auxiliary-line generation section intersect with each other;

wherein said auxiliary-line generation section includes:

a start-point setting section for setting an arbitrary point on an arbitrary one of the pattern curves of the fingerprint-like pattern as a start point;

an auxiliary-point calculation section for calculating two points positioned on the pattern curve en which the start point set by said start-point setting section is present and spaced by a predetermined distance from the start point to the opposite sides along the pattern curve as auxiliary points;

an auxiliary-line-segment generation section for generating an auxiliary-line segment interconnecting the two auxiliary points calculated by said auxiliary-point calculation section;

a straight-line generation section for generating a straight line which passes the start point set by said start-point setting section and intersects orthogonally with the auxiliary-line segment generated by said auxiliary-line-segment generation section;

an end-point calculation section for calculating that one of intersecting points of the straight line generated by said straight-line generation section and the pattern curves of the fingerprint-like pattern which is positioned on a particular side with respect to the start point and nearest to the start point as an end point; and a line-segment generation section for generating a line segment interconnecting the start point set by said start-point setting section and the end point calculated by said end-point calculation section;

wherein said start-point setting section is operable to set the end point as a new start point so that said auxiliary-point calculation section, said auxiliary-line-segment generation section, said straight-line generation section, said end-point calculation section and said line-segment generation section repeatedly generate a new line segment, thereby generating the auxiliary line as a number of successive line segments.

8. A pattern-center determination apparatus as claimed in claim 7, wherein said auxiliary-line generation section is operable to generate two auxiliary lines, and said pattern-center determination section is operable to determine an intersecting point at which the two auxiliary lines generated by said auxiliary-line generation section intersect with each other as the pattern center.

9. A pattern-center determination apparatus as claimed in claim 7, wherein said auxiliary-line generation section is operable to generate three or more auxiliary lines, and said pattern-center determination section includes an auxiliary-line-intersecting-point calculation section for calculating one or more intersecting points at which the three or more auxiliary lines generated by said auxiliary-line generation section intersect with each other, and a most-crowded-point calculation section for calculating a most crowded point, at which the intersecting points calculated by said auxiliary-line-intersecting-point calculation section are most crowded, so as to determine the calculated most crowded point as the pattern center.

10. A pattern-center determination method for determining a pattern center of a fingerprint-like pattern, which is formed with a number of pattern curves, said method comprising the steps of:

generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments; and determining the pattern center based on one or more intersecting points at which the two or more auxiliary lines intersect with each other;

said step of determining includes a start-point setting operation for setting an arbitrary point of the fingerprint-like pattern as a start point, a reference-circle generation operation for generating a reference circle of a predetermined radius centered at the start point set by said start-point setting operation, a reference-circle-intersecting-point calculation operation for calculating intersecting points of the reference circle generated by said reference-circle generation operation and the pattern curves of the fingerprint-like pattern, an intersecting-point extraction operation for extracting those two of the intersecting points calculated by said reference-circle-intersecting-point calculation operation which satisfy a predetermined condition, an end-point calculation operation for calculating a middle point of the two intersecting points extracted by said intersecting-point extraction operation as an end point, and a line-segment generation operation for generating a line segment interconnecting the start point set by said start-point setting operation and the end point calculated by said end-point calculation operation;

wherein said start-point setting operation is operable to set the end point as a new start point so that said reference-circle generation operation, said reference-circle-intersecting-point calculation operation, said intersecting-point extraction operation, said end-point calculation operation and said line-segment generation operation repeatedly generate a new line segment, thereby generating the auxiliary line as a number of successive line segments.

11. A computer-readable recording medium on which a pattern-center determination program is recorded for use with a computer, said program being for determining a pattern center of a fingerprint-like pattern, which is formed with a number of pattern curves, and instructing the computer to function as:

an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments; and a pattern-center determination section for determining the pattern center based on one or more intersecting points at which the two or more auxiliary lines generated by said auxiliary-line generation section intersect with each other;

said auxiliary-line generation section including a start-point setting section for setting an arbitrary point of the fingerprint-like pattern as a start point, a reference-circle generation section for generating a reference circle of a predetermined radius centered at the start point set by said start-point setting section, a reference-circle-intersecting-point calculation section for calculating intersecting points of the reference circle generated by said reference-circle generation section and the pattern curves of the fingerprint-like pattern, an intersecting-point extraction section for extracting those two of the intersecting points calculated by said reference-circle-intersecting-point calculation section which satisfy a predetermined condition, an end-point calculation section for calculating a middle point of the two intersecting points extracted by said intersecting-point extraction section as an end point, and a line-segment generation section for generating a line segment interconnecting the start point set by said start-point setting section and the end point calculated by said end-point calculation section;

wherein said start-point setting section is operable to set the end point as a new start point so that said reference-circle generation section, said reference-circle-intersecting-point calculation section, said intersecting-point extraction section, said end-point calculation section and said line-segment generation section repeatedly generate a new line segment, thereby generating the auxiliary line as a number of successive line segments.

12. A pattern-orientation determination apparatus for determining a pattern orientation of a fingerprint-like pattern, which is formed with a number of pattern curves, said apparatus comprising:

a pattern-center determination section for determining a pattern center of the fingerprint-like pattern;

a reference-circle generation section for generating a reference circle of a predetermined radius centered at the pattern center determined by said pattern-center determination section;

a reference-circle-intersecting-point calculation section for calculating intersecting points of the reference circle generated by said reference-circle generation section and the pattern curves of the fingerprint-like pattern;

a reference-point determination section for determining a reference point for the pattern orientation based on a relationship between directions of the reference circle and directions of the pattern curves at the intersecting points calculated by said reference-circle-intersecting-point calculation section; and a pattern-orientation determination section for determining the pattern orientation based on the pattern center determined by said pattern-center determination section and the reference point determined by said reference-point determination section.

13. A pattern-orientation determination apparatus as claimed in claim 12, wherein said reference-point determination section includes:

an intersecting-point extraction section for extracting those two of the intersecting points calculated by said reference-circle-intersecting-point calculation section which satisfy a predetermined condition; and a reference-point calculation section for calculating a middle point of the two intersecting points extracted by said intersecting-point extraction section as the reference point.

14. A pattern-orientation determination apparatus as claimed in claim 13, wherein said pattern-orientation determination section includes a rectification section for rectifying the position of the pattern center based on those of the pattern curves which are present in the proximity of the pattern center, and said pattern-orientation determination section is operable to determine the direction of a reference straight line which passes the position of the pattern center rectified by said rectification section and the reference point as the pattern orientation.

15. A pattern-orientation determination apparatus according to claim 14, wherein said pattern-center determination section includes:

an auxiliary-line generation section for generating two or more auxiliary lines extending continuously from an outer circumference side one of the pattern curves of the fingerprint-like pattern toward an inner circumference side one of the pattern curves so that each of the auxiliary lines intersects each of the pattern curves perpendicularly or substantially perpendicularly; and a pattern-center determination section for determining the pattern center based on one or more intersecting points of the two or more auxiliary lines generated by said auxiliary-line generation section.

16. A pattern-orientation determination apparatus according to claim 13, wherein said pattern-orientation determination section is operable to determine the direction of a reference straight line which passes the pattern center and the reference point as the pattern orientation.

17. A pattern-orientation determination apparatus according to claim 16, wherein said pattern-center determination section includes:

an auxiliary-line generation section for generating two or more auxiliary lines extending continuously from an outer circumference side one of the pattern curves of the fingerprint-like pattern toward an inner circumference side one of the pattern curves so that each of the auxiliary lines intersects each of the pattern curves perpendicularly or substantially perpendicularly; and a pattern-center determination section for determining the pattern center based on one or more intersecting points of the two or more auxiliary lines generated by said auxiliary-line generation section.

18. A pattern-orientation determination apparatus according to claim 13, wherein said pattern-center determination section includes:

an auxiliary-line generation section for generating two or more auxiliary lines extending continuously from an outer circumference side one of the pattern curves of the fingerprint-like pattern toward an inner circumference side one of the pattern curves so that each of the auxiliary lines intersects each of the pattern curves perpendicularly or substantially perpendicularly; and a pattern-center determination section for determining the pattern center based on one or more intersecting points of the two or more auxiliary lines generated by said auxiliary-line generation section.

19. A pattern-orientation determination apparatus as claimed in claim 12, wherein said pattern-orientation determination section includes a rectification section for rectifying the position of the pattern center based on those of the pattern curves which are present in the proximity of the pattern center, and said pattern-orientation determination section is operable to determine the direction of a reference straight line which passes the position of the pattern center rectified by said rectification section and the reference point as the pattern orientation.

20. A pattern-orientation determination apparatus according to claim 19, wherein said pattern-center determination section includes:

an auxiliary-line generation section for generating two or more auxiliary lines extending continuously from an outer circumference side one of the pattern curves of the fingerprint-like pattern toward an inner circumference side one of the pattern curves so that each of the auxiliary lines intersects each of the pattern curves perpendicularly or substantially perpendicularly; and a pattern-center determination section for determining the pattern center based on one or more intersecting points of the two or more auxiliary lines generated by said auxiliary-line generation section.

21. A pattern-orientation determination apparatus according to claim 12, wherein said pattern-orientation determination section is operable to determine the direction of a reference straight line which passes the pattern center and the reference point as the pattern orientation.

22. A pattern-orientation determination apparatus according to claim 21, wherein said pattern-center determination section includes:

an auxiliary-line generation section for generating two or more auxiliary lines extending continuously from an outer circumference side one of the pattern curves of the fingerprint-like pattern toward an inner circumference side one of the pattern curves so that each of the auxiliary lines intersects each of the pattern curves perpendicularly or substantially perpendicularly; and a pattern-center determination section for determining the pattern center based on one or more intersecting points of the two or more auxiliary lines generated by said auxiliary-line generation section.

23. A pattern-orientation determination apparatus according to claim 12, wherein said pattern-center determination section includes:

an auxiliary-line generation section for generating two or more auxiliary lines extending continuously from an outer circumference side one of the pattern curves of the fingerprint-like pattern toward an inner circumference side one of the pattern curves so that each of the auxiliary lines intersects each of the pattern curves perpendicularly or substantially perpendicularly; and a pattern-center determination section for determining the pattern center based on one or more intersecting points of the two or more auxiliary lines generated by said auxiliary-line generation section.

24. A pattern-orientation determination method for determining a pattern orientation of a fingerprint-like pattern, which is formed with a number of pattern curves, said method comprising the steps of:

determining a pattern center of the fingerprint-like pattern;

generating a reference circle of a predetermined radius centered at the pattern center;

calculating intersecting points of the reference circle and the pattern curves of the fingerprint-like pattern;

determining a reference point for the pattern orientation based on a relationship between directions of the reference circle and directions of the pattern curves at the calculated intersecting points; and determining the pattern orientation based on the pattern center and the reference point.

25. A computer-readable recording medium on which a pattern-orientation determination program is recorded for use with a computer, said program being for determining a pattern orientation of a fingerprint-like pattern, which is formed with a number of pattern curves, and instructing the computer to function as:

a pattern-center determination section for determining a pattern center of the fingerprint-like pattern;

a reference-circle generation section for generating a reference circle of a predetermined radius centered at the pattern center determined by said pattern-center determination section;

a reference-circle-intersecting-point calculation section for calculating intersecting points of the reference circle generated by said reference-circle generation section and the pattern curves of the fingerprint-like pattern;

a reference-point determination section for determining a reference point for the pattern orientation based on a relationship between directions of the reference circle and directions of the pattern curves at the intersecting points calculated by said reference-circle-intersecting-point calculation section; and a pattern-orientation determination section for determining the pattern orientation based on the pattern center determined by said pattern-center determination section and the reference point determined by said reference-point determination section.

26. A pattern alignment apparatus for aligning two fingerprint-like patterns, each of which is formed with a number of pattern curves, said apparatus comprising:

an alignment-reference determination section for determining one or more alignment references for each of the fingerprint-like patterns; and an alignment section for aligning the two fingerprint-like patterns so that the alignment references of the two fingerprint-like patterns determined by said alignment-reference determination section coincide with each other;

said alignment-reference determination section including a pattern-center determination section for determining a pattern center of each of the fingerprint-like patterns as one of the alignment references, said pattern-center determination section having an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments, and a pattern-center determination section for determining the pattern center based on one or more intersecting points at which the two or more auxiliary lines generated by said auxiliary-line generation section intersect with each other;

said auxiliary-line generation section including a start-point setting section for setting an arbitrary point of the fingerprint-like pattern as a start point, a reference-circle generation section for generating a reference circle of a predetermined radius centered at the start point set by said start-point setting section, a reference-circle-intersecting-point calculation section for calculating intersecting points of the reference circle generated by said reference-circle generation section and the pattern curves of the fingerprint-like pattern, an intersecting-point extraction section for extracting those two of the intersecting points calculated by said reference-circle-intersecting-point calculation section which satisfy a predetermined condition, an end-point calculation section for calculating a middle point of the two intersecting points extracted by said intersecting-point extraction section as an end point, and a line-segment generation section for generating a line segment interconnecting the start point set by said start-point setting section and the end point calculated by said end-point calculation section;

wherein said start-point setting section is operable to set the end point as a new start point so that said reference-circle generation section, said reference-circle-intersecting-point calculation section, said intersecting-point extraction section, said end-point calculation section and said line-segment generation section repeatedly generate a new line segment, thereby generating the auxiliary line as a number of successive line segments.

27. A pattern alignment apparatus as claimed in claim 26, further comprising:

a minutia extraction section for extracting a group of minutiae from each of the two fingerprint-like patterns;

a collation section for collating the two group of minutiae extracted from the two fingerprint-like patterns by said minutia extraction section based on the alignment by said alignment section;

an adjustment-shift calculation section for calculating an adjustment shift of at least one of the two fingerprint-like patterns based on a result of the collation by said collation section so that the alignment of the two fingerprint-like patterns is improved; and an alignment-result adjustment section for shifting at least one of the two fingerprint-like patterns by the adjustment shift calculated by said adjustment-shift calculation section so as to adjust a result of the alignment by said alignment section.

28. A pattern alignment apparatus as claimed in claim 27, wherein the adjustment shift is at least one of a rotation angle by which one of the two fingerprint-like patterns is to be rotated around a predetermined point with respect to the other of the two fingerprint-like patterns and a shift by which one of the two fingerprint-like patterns is to be parallelly shifted with respect to the other of the two fingerprint-like patterns.

29. A pattern alignment apparatus for aligning two fingerprint-like patterns, each of which is formed with a number of pattern curves, said apparatus comprising:

an alignment-reference determination section for determining one or more alignment references for each of the fingerprint-like patterns; and an alignment section for aligning the two fingerprint-like patterns so that the alignment references of the two fingerprint-like patterns determined by said alignment-reference determination section coincide with each other;

said alignment-reference determination section including a pattern-center determination section for determining a pattern center of each of the fingerprint-like patterns as one of the alignment references, said pattern-center determination section having an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments, and a pattern-center determination section for determining the pattern center based on one or more intersecting points at which the two or more auxiliary lines generated by said auxiliary-line generation section intersect with each other;

wherein said alignment-reference determination section further includes a pattern-orientation determination section for determining a pattern orientation of each of the fingerprint-like patterns as one of the alignment references, said pattern-orientation determination section having:

a reference-circle generation section for generating a reference circle of a predetermined radius centered at the pattern center determined by said pattern-center determination section;

a reference-circle-intersecting-point calculation section for calculating intersecting points of the reference circle generated by said reference-circle generation section and the pattern curves of the fingerprint-like pattern;

a reference-point determination section for determining a reference point for the pattern orientation based on a relationship between directions of the reference circle and directions of the pattern curves at the intersecting points calculated by said reference-circle-intersecting-point calculation section; and a pattern-orientation determination section for determining the pattern orientation based on the pattern center determined by said pattern-center determination section and the reference point determined by said reference-point determination section.

30. A pattern alignment apparatus as claimed in claim 29, further comprising:

a minutia extraction section for extracting a group of minutiae from each of the two fingerprint-like patterns;

a collation section for collating the two group of minutiae extracted from the two fingerprint-like patterns by said minutia extraction section based on the alignment by said alignment section;

an adjustment-shift calculation section for calculating an adjustment shift of at least one of the two fingerprint-like patterns based on a result of the collation by said collation section so that the alignment of the two fingerprint-like patterns is improved; and an alignment-result adjustment section for shifting at least one of the two fingerprint-like patterns by the adjustment shift calculated by said adjustment-shift calculation section so as to adjust a result of the alignment by said alignment section.

31. A pattern alignment apparatus as claimed in claim 30, wherein the adjustment shift is at least one of a rotation angle by which one of the two fingerprint-like patterns is to be rotated around a predetermined point with respect to the other of the two fingerprint-like patterns and a shift by which one of the two fingerprint-like patterns is to be parallelly shifted with respect to the other of the two fingerprint-like patterns.

32. A pattern alignment apparatus for aligning two fingerprint-like patterns, each of which is formed with a number of pattern curves, said apparatus comprising:

an alignment-reference determination section for determining one or more alignment references for each of the fingerprint-like patterns; and an alignment section for aligning the two fingerprint-like patterns so that the alignment references of the two fingerprint-like patterns determined by said alignment-reference determination section coincide with each other;

said alignment-reference determination section including a pattern-orientation determination section for determining a pattern orientation of each of the fingerprint-like patterns as one of the alignment references, said pattern-orientation determination section having a pattern-center determination section for determining a pattern center of each said fingerprint-like patterns as the alignment reference, a reference-circle generation section for generating a reference circle of a predetermined radius centered at the pattern center determined by said pattern-center determination section, a reference-circle-intersecting-point calculation section for calculating intersecting points of the reference circle generated by said reference-circle generation section and the pattern curves of each said fingerprint-like pattern, a reference-point determination section for determining a reference point for the pattern orientation based on a relationship between directions of the reference circle and directions of the pattern curves at the intersecting points calculated by said reference-circle-intersecting-point calculation section, and a pattern-orientation determination section for determining the pattern orientation based on the pattern center determined by said pattern-center determination section and the reference point determined by said reference-point determination section.

33. A pattern alignment apparatus as claimed in claim 32, further comprising:

a minutia extraction section for extracting a group of minutiae from each of the fingerprint-like patterns;

a collation section for collating the two group of minutiae extracted from the two fingerprint-like patterns by said minutia extraction section based on the alignment by said alignment section;

an adjustment-shift calculation section for calculating an adjustment shift of at least one of the two fingerprint-like patterns based on a result of the collation by said collation section so that the alignment of the two fingerprint-like patterns is improved; and an alignment-result adjustment section for shifting at least one of the two fingerprint-like patterns by the adjustment shift calculated by said adjustment-shift calculation section so as to adjust a result of the alignment by said alignment section.

34. A pattern alignment apparatus as claimed in claim 33, wherein the adjustment shift is at least one of a rotation angle by which one of the two fingerprint-like patterns is to be rotated around a predetermined point with respect to the other of the two fingerprint-like patterns and a shift by which one of the two fingerprint-like patterns is to be parallelly shifted with respect to the other of the two fingerprint-like patterns.

35. A pattern verification apparatus for verifying a group of object minutiae for verification extracted from an object fingerprint-like pattern for verification with a group of registered minutiae extracted in advance from a registered fingerprint-like pattern, each of the object fingerprint-like pattern and the registered fingerprint-like pattern being formed with the number of pattern curves, said apparatus comprising:

a pattern inputting section for inputting the object fingerprint-like pattern;

an alignment-reference determination section for determining one or more alignment references of the object fingerprint-like pattern inputted by said pattern inputting section;

a minutia extraction section for extracting the group of object minutiae from the object fingerprint-like pattern inputted by said pattern inputting section;

a registration-data obtaining section for obtaining registration data regarding the registered fingerprint-like pattern, said registration data including the group of registered minutiae and one or more alignment references of the registered fingerprint-like pattern;

an alignment section for aligning the object fingerprint-like pattern or the group of object minutiae and the group of registered minutiae so that the alignment references of the object fingerprint-like pattern determined by said alignment-reference determination section and the alignment references of the registered fingerprint-like pattern obtained by said registration-data obtaining section coincide with each other; and a verification section for verifying the group of object minutiae with the group of registered minutiae based on the alignment by said alignment section;

said alignment-reference determination section including a pattern-center determination section for determining a pattern center of the object fingerprint-like pattern as one of the alignment references of the object fingerprint-like pattern, the alignment references of the registered fingerprint-like pattern including a pattern center of the registered fingerprint-like pattern;

said pattern-center determination section including an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments, and a pattern-center determination section for determining the pattern center based on one or more intersecting points at which the two or more auxiliary lines generated by said auxiliary-line generation section intersect with each other;

said auxiliary-line generation section including a start-point setting section for setting an arbitrary point of the fingerprint-like pattern as a start point, a reference-circle generation section for generating a reference circle of a predetermined radius centered at the start point set by said start-point setting section, a reference-circle-intersecting-point calculation section for calculating intersecting points of the reference circle generated by said reference-circle generation section and the pattern curves of the fingerprint-like pattern, an intersecting-point extraction section for extracting those two of the intersecting points calculated by said reference-circle-intersecting-point calculation section which satisfy a predetermined condition, an end-point calculation section for calculating a middle point of the two intersecting points extracted by said intersecting-point extraction section as an end point, and a line-segment generation section for generating a line segment interconnecting the start point set by said start-point setting section and the end point calculated by said end-point calculation section;

wherein said start-point setting section is operable to set the end point as a new start point so that said reference-circle generation section, said reference-circle-intersecting-point calculation section, said intersecting-point extraction section, said end-point calculation section and said line-segment generation section repeatedly generate a new line segment, thereby generating the auxiliary line as a number of successive line segments.

36. A pattern verification apparatus as claimed in claim 35, further comprising:

an adjustment-shift calculation section for calculating an adjustment shift of the group of object minutiae or/and the group of registered minutiae based on a result of the verification by said verification section so that the alignment of the group of object minutiae and the group of registered minutiae is improved; and an alignment-result adjustment section for shifting the group of object minutiae or/and the group of registered minutiae by the adjustment shift calculated by said adjustment-shift calculation section so as to adjusting a result of the alignment by said alignment section;

said verification section being operable to output a result of the verification between the group of object minutiae and the group of registered minutiae based on the adjustment of the alignment result by said alignment-result adjustment section.

37. A pattern verification apparatus as claimed in claim 36, wherein the adjustment shift is at least one of a rotation angle by which at least one of the group of object minutiae and the group of registered minutiae are to be rotated around a predetermined point with respect to the other of the two groups of minutiae and a shift by which at least one of the group of object minutiae and the group of registered minutiae are to be parallelly shifted with respect to the other of the two groups of minutiae.

38. A pattern verification apparatus for verifying a group of object minutiae for verification extracted from an object fingerprint-like pattern for verification with a group of registered minutiae extracted in advance from a registered fingerprint-like pattern, each of the object fingerprint-like pattern and the registered fingerprint-like pattern being formed with the number of pattern curves, said apparatus comprising:

a pattern inputting section for inputting the object fingerprint-like pattern;

an alignment-reference determination section for determining one or more alignment references of the object fingerprint-like pattern inputted by said pattern inputting section;

a minutia extraction section for extracting the group of object minutiae from the object fingerprint-like pattern inputted by said pattern inputting section;

a registration-data obtaining section for obtaining registration data regarding the registered fingerprint-like pattern, said registration data including the group of registered minutiae and one or more alignment references of the registered fingerprint-like pattern;

an alignment section for aligning the object fingerprint-like pattern or the group of object minutiae and the group of registered minutiae so that the alignment references of the object fingerprint-like pattern determined by said alignment-reference determination section and the alignment references of the registered fingerprint-like pattern obtained by said registration-data obtaining section coincide with each other; and a verification section for verifying the group of object minutiae with the group of registered minutiae based on the alignment by said alignment section;

said alignment-reference determination section including a pattern-center determination section for determining a pattern center of the object fingerprint-like pattern as one of the alignment references of the object fingerprint-like pattern, the alignment references of the registered fingerprint-like pattern including a pattern center of the registered fingerprint-like pattern;

said pattern-center determination section including an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments, and a pattern-center determination section for determining the pattern center based on one or more intersecting points at which the two or more auxiliary lines generated by said auxiliary-line generation section intersect with each other;

wherein said alignment-reference determination section further includes a pattern-orientation determination section for determining a pattern orientation of the fingerprint-like pattern for verification as one of the alignment references, the alignment references of the registered fingerprint-like pattern including a pattern orientation of the registered fingerprint-like pattern, and said pattern-orientation determination section includes
a reference-circle generation section for generating a reference circle of a predetermined radius centered at the pattern center determined by said pattern-center determination section, a reference-circle-intersecting-point calculation section for calculating intersecting points of the reference circle generated by said reference-circle generation section and the pattern curves of the registered fingerprint-like pattern, a reference-point determination section for determining a reference point for the pattern orientation based on a relationship between directions of the reference circle and directions of the pattern curves at the intersecting points calculated by said reference-circle-intersecting-point calculation section, and a pattern-orientation determination section for determining the pattern orientation based on the pattern center determined by said pattern-center determination section and the reference point determined by said reference-point determination section.

39. A pattern verification apparatus as claimed in claim 38, wherein said pattern inputting section is operable to input the registered fingerprint-like pattern, said alignment-reference determination section is operable to determine the alignment references of the registered fingerprint-like pattern inputted by said pattern inputting section, said minutia extraction section is operable to extract the group of registered minutiae from the registered fingerprint-like pattern inputted by said pattern inputting section, and said registration-data obtaining section is operable to obtain both the alignment references of the registered fingerprint-like pattern determined by said alignment-reference determination section and the group of registered minutiae extracted by said minutia extraction section as the registration data regarding the registered fingerprint-like pattern.

40. A pattern verification apparatus as claimed in claim 38, further comprising:
an adjustment-shift calculation section for calculating an adjustment shift of the group of object minutiae or/and the group of registered minutiae based on a result of the verification by said verification section so that the alignment of the group of object minutiae and the group of registered minutiae is improved; and an alignment-result adjustment section for shifting the group of object minutiae or/and the group of registered minutiae by the adjustment shift calculated by said adjustment-shift calculation section so as to adjust a result of the alignment by said alignment section;

said verification section being operable to output a result of the verification between the group of object minutiae and the group of registered minutiae based on the adjustment of the alignment by said alignment-result adjustment section.

41. A pattern verification apparatus as claimed in claim 40, wherein the adjustment shift is at least one of a rotation angle by which at least one of the group of object minutiae and the group of registered minutiae are to be rotated around a predetermined point with respect to the other of the two groups of minutiae and a shift by which at least one of the group of object minutiae and the group of registered minutiae are to be parallelly shifted with respect to the other of the two groups of minutiae.

42. A pattern verification apparatus for verifying a group of object minutiae extracted from an object fingerprint-like pattern for verification with a group of registered minutiae extracted in advance from a registered fingerprint-like pattern, each of the object fingerprint-like pattern and the registered fingerprint-like pattern being formed with the number of pattern curves, said apparatus comprising:
a pattern inputting section for inputting the object fingerprint-like pattern;

an alignment-reference determination section for determining one or more alignment references of the object fingerprint-like pattern inputted by said pattern inputting section;

a minutia extraction section for extracting the group of object minutiae from the object fingerprint-like pattern inputted by said pattern inputting section;

a registration-data obtaining section for obtaining registration data regarding the registered fingerprint-like pattern, said registration data including the group of registered minutiae and one or more alignment references of the registered fingerprint-like pattern;

an alignment section for aligning the object fingerprint-like pattern or the group of object minutiae and the group of registered minutiae so that the alignment references of the object fingerprint-like pattern determined by said alignment-reference determination section and the alignment references of the registered fingerprint-like pattern obtained by said registration-data obtaining section coincide with each other; and a verification section for verifying the group of object minutiae with the group of registered minutiae based on the alignment by said alignment section;

said alignment-reference determination section including a pattern-orientation determination section for determining a pattern orientation of the object fingerprint-like pattern as one of the alignment references, the registered alignment references of the registered fingerprint-like pattern including a pattern orientation of the registered fingerprint-like pattern;

said pattern-orientation determination section including
a pattern-center determination section for determining a pattern center of the object fingerprint-like pattern, a reference-circle generation section for generating a reference circle of a predetermined radius centered at the pattern center of the object fingerprint-like pattern determined by said pattern-center determination section, a reference-circle-intersecting-point calculation section for calculating intersecting points of the reference circle generated by said reference-circle generation section and the pattern curves of the object fingerprint-like pattern, a reference-point determination section for determining a reference point for the pattern orientation based on a relationship between directions of the reference circle and directions of the pattern curves at the intersecting points calculated by said reference-circle-intersecting-point calculation section, and a pattern-orientation determination section for determining the pattern orientation based on the pattern center determined by said pattern-center determination section and the reference point determined by said reference-point determination section.

43. A pattern verification apparatus as claimed in claim 42, wherein said pattern inputting section is operable to input the registered fingerprint-like pattern, said alignment-reference determination section is operable to determine the alignment references of the registered fingerprint-like pattern inputted by said pattern inputting section, said minutia extraction section is operable to extract the group of registered minutiae from the registered fingerprint-like pattern inputted by said pattern inputting section, and said registration-data obtaining section is operable to obtain both the alignment references of the registered fingerprint-like pattern determined by said alignment-reference determination section and the group of registered minutiae extracted by said minutia extraction section as the registration data regarding the registered fingerprint-like pattern.

44. A pattern verification apparatus as claimed in claim 42, further comprising:
an adjustment-shift calculation section for calculating an adjustment shift of the group of object minutiae or/and the group of registered minutiae based on a result of the verification by said verification section so that the alignment of the group of object minutiae and the group of registered minutiae is improved; and
an alignment-result adjustment section for shifting the group of object minutiae or/and the group of registered minutiae by the adjustment shift calculated by said adjustment-shift calculation section so as to adjust a result of the alignment by said alignment section;
said verification section being operable to output a result of the verification between the group of object minutiae and the group of registered minutiae based on the adjustment of the alignment by said alignment-result adjustment section.

45. A pattern verification apparatus as claimed in claim 44, wherein the adjustment shift is at least one of a rotation angle by which at least one of the group of object minutiae and the group of registered minutiae are to be rotated around a predetermined point with respect to the other of the two groups of minutiae and a shift by which at least one of the group of object minutiae and the group of registered minutiae are to be parallelly shifted with respect to the other of the two groups of minutiae.

46. A pattern verification apparatus as claimed in claim 35, wherein said pattern inputting section is operable to input the registered fingerprint-like pattern, said alignment-reference determination section is operable to determine the alignment references of the registered fingerprint-like pattern inputted by said pattern inputting section, said minutia extraction section is operable to extract the group of registered minutiae from the registered fingerprint-like pattern inputted by said pattern inputting section, and said registration-data obtaining section is operable to obtain both the alignment references of the registered fingerprint-like pattern determined by said alignment-reference determination section and the group of registered minutiae extracted by said minutia extraction section as the registration data regarding the registered fingerprint-like pattern.

47. A pattern alignment apparatus for aligning two fingerprint-like patterns, each of which is formed with a number of pattern curves, while adjusting the alignment of the two fingerprint-like patterns, comprising:
an alignment section for aligning the two fingerprint-like patterns;
a minutia extraction section for extracting a group of minutiae from each of the fingerprint-like patterns;
a collation section for collating the two groups of minutiae extracted from the two fingerprint-like patterns by said minutia extraction section, based on a result of the alignment by said alignment section;
an adjustment-shift calculation section for calculating an adjustment shift amount based on a result of the collation by said collation section, said adjustment shift amount being determined in such a manger that when at least one of the two fingerprint-like patterns is shifted by said adjustment shift amount, the coincidence relationship between the two groups of minutae collated by said collation section is improved;
an alignment-result adjustment section for shifting at least one of the two-fingerprint-like patterns by the adjustment shift amount calculated by said adjustment-shift calculation section so as to adjust the result of the alignment by said alignment section; and
a permissible-shift-range calculation section for calculating a permissible shift range, said permissible shift range being a shift range within which, when said collation section has discriminated that one or more minutiae of one of the two fingerprint-like patterns coincide with one or more minutiae of the other of the two fingerprint-like patterns respectively, one of the two fingerprint-like patterns can be shifted with respect to the other of the two fingerprint-like patterns while at least some of the one or more pairs of coinciding minutiae maintain the coincidence relationship,
said adjustment-shift calculation section being operable to calculate the adjustment shift within the permissible shift range calculated by said permissible-shift-range calculation section.

48. A pattern alignment apparatus as claimed in claim 47, wherein the adjustment shift is at least one of a rotation angle by which one of the two fingerprint-like patterns is to be rotated around a predetermined point with respect to the other of the two fingerprint-like patterns and a shift by which one of the two fingerprint-like patterns is to be parallelly shifted with respect to the other of the two fingerprint-like patterns.

49. A pattern-center determination method for determining a pattern center of a fingerprint-like pattern, which is formed with a number of pattern curves, said method comprising the steps of:
generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments; and
determining the pattern center based on one or more intersecting points at which the two or more auxiliary lines intersect with each other;
said step of determining includes
a first-auxiliary-point setting operation for setting two arbitrary points on an arbitrary one of pattern curves which form the fingerprint-like pattern as two first auxiliary points,
a start-point calculation operation for calculating a middle point of the two first auxiliary points set by said first-auxiliary-point setting operation as a start point,
an auxiliary-line-segment generation operation for generating an auxiliary-line segment interconnecting the two first auxiliary points set by said first-auxiliary-point setting operation,
a perpendicular-bisector generation operation for generating a perpendicular bisector to the auxiliary-line segment generated by said auxiliary-line-segment generation operation, a perpendicular-bisector-intersecting-point calculation operation for calculating that one of intersecting points of the perpendicular bisector generated by said perpendicular-bisector generation operation and the pattern curves of the fingerprint-like pattern which is present on a particular side with respect to the start point and positioned nearest to the start point, a node calculation operation for calculating a point on the perpendicular bisector spaced by a predetermined distance toward the particular side from the intersecting point calculated by said perpendicular-bisector-intersecting-point calculation operation as a node, a straight-line generation operation for generating a straight line which passes the node calculated by said node calculation operation and intersects orthogonally with the perpendicular bisector, a second-auxiliary-point calculation operation for calculating those two of intersecting points of the straight line generated by said straight-line generation operation and the pattern curves of the fingerprint-like pattern which are on the opposite sides of the node and are positioned nearest to the node as second auxiliary points, an end-point calculation operation for calculating a middle point of the two second auxiliary points calculated by said second-auxiliary-point calculation operation as an end point, a first-line-segment generation operation for generating a first line segment interconnecting the start point calculated by said start-point calculation operation and the node calculated by said node calculation operation, and a second-line-segment generation operation for generating a second line segment interconnecting the node calculated by said node calculation operation and the end point calculated by said end-point calculation operation;

wherein said first-auxiliary-point setting operation is operable to set the two second auxiliary points as new first auxiliary points so that said start-point calculation operation, said auxiliary-line-segment generation operation, said perpendicular-bisector generation operation, said perpendicular-bisector-intersecting-point calculation operation, said node calculation operation, said straight-line generation operation, said second-auxiliary-point calculation operation, said end-point calculation operation, said first-line-segment generation operation and said second-line-segment generation operation repeatedly generate new first and second line segments, thereby generating the auxiliary line as a number of alternately successive first and second line segments.

50. A pattern-center determination method for determining a pattern center of a fingerprint-like pattern, which is formed with a number of pattern curves, said method comprising the steps of:

generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments; and determining the pattern center based on one or more intersecting points at which the two or more auxiliary lines intersect with each other;

said step of determining includes a start-point setting operation for setting an arbitrary point on an arbitrary one of the pattern curves of the fingerprint-like pattern as a start point, an auxiliary-point calculation operation for calculating two points positioned on the pattern curve on which the start point set by said start-point setting operation is present and spaced by a predetermined distance from the start point to the opposite sides along the pattern curve as auxiliary points, an auxiliary-line-segment generation operation for generating an auxiliary-line segment interconnecting the two auxiliary points calculated by said auxiliary-point calculation operation, a straight-line generation operation for generating a straight line which passes the start point set by said start-point setting operation and intersects orthogonally with the auxiliary-line segment generated by said auxiliary-line-segment generation operation, an end-point calculation operation for calculating that one of intersecting points of the straight line generated by said straight-line generation operation and the pattern curves of the fingerprint-like pattern which is positioned on a particular side with respect to the start point and nearest to the start point as an end point, and a line-segment generation operation for generating a line segment interconnecting the start point set by said start-point setting operation and the end point calculated by said end-point calculation operation;

wherein said start-point setting operation is operable to set the end point as a new start point so that said auxiliary-point calculation operation, said auxiliary-line-segment generation operation, said straight-line generation operation, said end-point calculation operation and said line-segment generation operation repeatedly generate a new line segment, thereby generating the auxiliary line as a number of successive line segments.

51. A computer-readable recording medium on which a pattern-center determination program is recorded for use with a computer, said program being for determining a pattern center of a fingerprint-like pattern, which is formed with a number of pattern curves, and instructing the computer to function as:

an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments; and a pattern-center determination section for determining the pattern center based on one or more intersecting points at which the two or more auxiliary lines generated by said auxiliary-line generation section intersect with each other;

said auxiliary-line generation section including a first-auxiliary-point setting section for setting two arbitrary points on an arbitrary one of pattern curves which form the fingerprint-like pattern as two first auxiliary points, a start-point calculation section for calculating a middle point of the two first auxiliary points set by said first-auxiliary-point setting section as a start point, an auxiliary-line-segment generation section for generating an auxiliary-line segment interconnecting the two first auxiliary points set by said first-auxiliary-point setting section, a perpendicular-bisector generation section for generating a perpendicular bisector to the auxiliary-line segment generated by said auxiliary-line-segment generation section, a perpendicular-bisector-intersecting-point calculation section for calculating that one of intersecting points of the perpendicular bisector generated by said perpendicular-bisector generation section and the pattern curves of the fingerprint-like pattern which is present on a particular side with respect to the start point and positioned nearest to the start point, a node calculation section for calculating a point on the perpendicular bisector spaced by a predetermined distance toward the particular side from the intersecting point calculated by said perpendicular-bisector-intersecting-point calculation section as a node, a straight-line generation section for generating a straight line which passes the node calculated by said node calculation section and intersects orthogonally with the perpendicular bisector, a second-auxiliary-point calculation section for calculating those two of intersecting points of the straight line generated by said straight-line generation section and the pattern curves of the fingerprint-like pattern which are on the opposite sides of the node and are positioned nearest to the node as second auxiliary points, an end-point calculation section for calculating a middle point of the two second auxiliary points calculated by said second-auxiliary-point calculation section as an end point, a first-line-segment generation section for generating a first line segment interconnecting the start point calculated by said start-point calculation section and the node calculated by said node calculation section, and a second-line-segment generation section for generating a second line segment interconnecting the node calculated by said node calculation section and the end point calculated by said end-point calculation section;

wherein said first-auxiliary-point setting section is operable to set the two second auxiliary points as new first auxiliary points so that said start-point calculation section, said auxiliary-line-segment generation section, said perpendicular-bisector generation section, said perpendicular-bisector-intersecting-point calculation section, said node calculation section, said straight-line generation section, said second-auxiliary-point calculation section, said end-point calculation section, said first-line-segment generation section and said second-line-segment generation section repeatedly generate new first and second line segments, thereby generating the auxiliary line as a number of alternately successive first and second line segments.

52. A computer-readable recording medium on which a pattern-center determination program is recorded for use with a computer, said program being for determining a pattern center of a fingerprint-like pattern, which is formed with a number of pattern curves, and instructing the computer to function as:

an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments; and a pattern-center determination section for determining the pattern center based on one or more intersecting points at which the two or more auxiliary lines generated by said auxiliary-line generation section intersect with each other;

said auxiliary-line generation section including a start-point setting section for setting an arbitrary point on an arbitrary one of the pattern curves of the fingerprint-like pattern as a start point, an auxiliary-point calculation section for calculating two points positioned on the pattern curve on which the start point set by said start-point setting section is present and spaced by a predetermined distance from the start point to the opposite sides along the pattern curve as auxiliary points, an auxiliary-line-segment generation section for generating an auxiliary-line segment interconnecting the two auxiliary points calculated by said auxiliary-point calculation section, a straight-line generation section for generating a straight line which passes the start point set by said start-point setting section and intersects orthogonally with the auxiliary-line segment generated by said auxiliary-line-segment generation section, an end-point calculation section for calculating that one of intersecting points of the straight line generated by said straight-line generation section and the pattern curves of the fingerprint-like pattern which is positioned on a particular side with respect to the start point and nearest to the start point as an end point, and a line-segment generation section for generating a line segment interconnecting the start point set by said start-point setting section and the end point calculated by said end-point calculation section;

wherein said start-point setting section is operable to set the end point as a new start point so that said auxiliary-point calculation section, said auxiliary-line-segment generation section, said straight-line generation section, said end-point calculation section and said line-segment generation section repeatedly generate a new line segment, thereby generating the auxiliary line as a number of successive line segments.

53. A pattern alignment apparatus for aligning two fingerprint-like patterns, each of which is formed with a number of pattern curves, said apparatus comprising:

an alignment-reference determination section for determining one or more alignment references for each of the fingerprint-like patterns; and an alignment section for aligning the two fingerprint-like patterns so that the alignment references of the two fingerprint-like patterns determined by said alignment-reference determination section coincide with each other;

said alignment-reference determination section including a pattern-center determination section for determining a pattern center of each of the fingerprint-like patterns as one of the alignment references, said pattern-center determination section having an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments, and a pattern-center determination section for determining the pattern center based on one or more intersecting points at which the two or more auxiliary lines generated by said auxiliary-line generation section intersect with each other;

said auxiliary-line generation section including a first-auxiliary-point setting section for setting two arbitrary points on an arbitrary one of pattern curves which form the fingerprint-like pattern as two first auxiliary points, a start-point calculation section for calculating a middle point of the two first auxiliary points set by said first-auxiliary-point setting section as a start point, an auxiliary-line-segment generation section for generating an auxiliary-line segment interconnecting the two first auxiliary points set by said first-auxiliary-point setting section, a perpendicular-bisector generation section for generating a perpendicular bisector to the auxiliary-line segment generated by said auxiliary-line-segment generation section, a perpendicular-bisector-intersecting-point calculation section for calculating that one of intersecting points of the perpendicular bisector generated by said perpendicular-bisector generation section and the pattern curves of the fingerprint-like pattern which is present on a particular side with respect to the start point and positioned nearest to the start point, a node calculation section for calculating a point on the perpendicular bisector spaced by a predetermined distance toward the particular side from the intersecting point calculated by said perpendicular-bisector-intersecting-point calculation section as a node, a straight-line generation section for generating a straight line which passes the node calculated by said node calculation section and intersects orthogonally with the perpendicular bisector, a second-auxiliary-point calculation section for calculating those two of intersecting points of the straight line generated by said straight-line generation section and the pattern curves of the fingerprint-like pattern which are on the opposite sides of the node and are positioned nearest to the node as second auxiliary points, an end-point calculation section for calculating a middle point of the two second auxiliary points calculated by said second-auxiliary-point calculation section as an end point, a first-line-segment generation section for generating a first line segment interconnecting the start point calculated by said start-point calculation section and the node calculated by said node calculation section, and a second-line-segment generation section for generating a second line segment interconnecting the node calculated by said node calculation section and the end point calculated by said end-point calculation section;

wherein said first-auxiliary-point setting section is operable to set the two second auxiliary points as new first auxiliary points so that said start-point calculation section, said auxiliary-line-segment generation section, said perpendicular-bisector generation section, said perpendicular-bisector-intersecting-point calculation section, said node calculation section, said straight-line generation section, said second-auxiliary-point calculation section, said end-point calculation section, said first-line-segment generation section and said second-line-segment generation section repeatedly generate new first and second line segments, thereby generating the auxiliary line as a number of alternately successive first and second line segments.

54. A pattern alignment apparatus as claimed in claim 53, further comprising:

a minutia extraction section for extracting a group of minutiae from each of the two fingerprint-like patterns;

a collation section for collating the two group of minutiae extracted from the two fingerprint-like patterns by said minutia extraction section based on the alignment by said alignment section;

an adjustment-shift calculation section for calculating an adjustment shift of at least one of the two fingerprint-like patterns based on a result of the collation by said collation section so that the alignment of the two fingerprint-like patterns is improved; and a alignment-result adjustment section for shifting at least one of the two fingerprint-like patterns by the adjustment shift calculated by said adjustment-shift calculation section so as to adjust a result of the alignment by said alignment section.

55. A pattern alignment apparatus as claimed in claim 54, wherein the adjustment shift is at least one of a rotation angle by which one of the two fingerprint-like patterns is to be rotated around a predetermined point with respect to the other of the two fingerprint-like patterns and a shift by which one of the two fingerprint-like patterns is to be parallelly shifted with respect to the other of the two fingerprint-like patterns.

56. A pattern alignment apparatus for aligning two fingerprint-like patterns, each of which is formed with a number of pattern curves, said apparatus comprising:

an alignment-reference determination section for determining one or more alignment references for each of the fingerprint-like patterns; and an alignment section for aligning the two fingerprint-like patterns so that the alignment references of the two fingerprint-like patterns determined by said alignment-reference determination section coincide with each other;

said alignment-reference determination section including a pattern-center determination section for determining a pattern center of each of the fingerprint-like patterns as one of the alignment references, said pattern-center determination section having an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments, and a pattern-center determination section for determining the pattern center based on one or more intersecting points at which the two or more auxiliary lines generated by said auxiliary-line generation section intersect with each other;

said auxiliary-line generation section including
a start-point setting section for setting an arbitrary point on an arbitrary one of the pattern curves of the fingerprint-like pattern as a start point,
an auxiliary-point calculation section for calculating two points positioned on the pattern curve on which the start point set by said start-point setting section is present and spaced by a predetermined distance from the start point to the opposite sides along the pattern curve as auxiliary points,
an auxiliary-line-segment generation section for generating an auxiliary-line segment interconnecting the two auxiliary points calculated by said auxiliary-point calculation section,
a straight-line generation section for generating a straight line which passes the start point set by said start-point setting section and intersects orthogonally with the auxiliary-line segment generated by said auxiliary-line-segment generation section,
an end-point calculation section for calculating that one of intersecting points of the straight line generated by said straight-line generation section and the pattern curves of the fingerprint-like pattern which is positioned on a particular side with respect to the start point and nearest to the start point as an end point, and
a line-segment generation section for generating a line segment interconnecting the start point set by said start-point setting section and the end point calculated by said end-point calculation section;
wherein said start-point setting section is operable to set the end point as a new start point so that said auxiliary-point calculation section, said auxiliary-line-segment generation section, said straight-line generation section, said end-point calculation section and said line-segment generation section repeatedly generate a new line segment, thereby generating the auxiliary line as a number of successive line segments.

57. A pattern alignment apparatus as claimed in claim 56, further comprising:
a minutia extraction section for extracting a group of minutiae from each of the two fingerprint-like patterns;
a collation section for collating the two group of minutiae extracted from the two fingerprint-like patterns by said minutia extraction section based on the alignment by said alignment section;
an adjustment-shift calculation section for calculating an adjustment shift of at least one of the two fingerprint-like patterns based on a result of the collation by said collation section so that the alignment of the two fingerprint-like patterns is improved; and
a alignment-result adjustment section for shifting at least one of the two fingerprint-like patterns by the adjustment shift calculated by said adjustment-shift calculation section so as to adjust a result of the alignment by said alignment section.

58. A pattern alignment apparatus as claimed in claim 57, wherein the adjustment shift is at least one of a rotation angle by which one of the two fingerprint-like patterns is to be rotated around a predetermined point with respect to the other of the two fingerprint-like patterns and a shift by which one of the two fingerprint-like patterns is to be parallelly shifted with respect to the other of the two fingerprint-like patterns.

59. A pattern verification apparatus for verifying a group of object minutiae for verification extracted from an object fingerprint-like pattern for verification with a group of registered minutiae extracted in advance from a registered fingerprint-like pattern, each of the object fingerprint-like pattern and the registered fingerprint-like pattern being formed with the number of pattern curves, said apparatus comprising:
a pattern inputting section for inputting the object fingerprint-like pattern;
an alignment-reference determination section for determining one or more alignment references of the object fingerprint-like pattern inputted by said pattern inputting section;
a minutia extraction section for extracting the group of object minutiae from the object fingerprint-like pattern inputted by said pattern inputting section;
a registration-data obtaining section for obtaining registration data regarding the registered fingerprint-like pattern, said registration data including the group of registered minutiae and one or more alignment references of the registered fingerprint-like pattern;
an alignment section for aligning the object fingerprint-like pattern or the group of object minutiae and the group of registered minutiae so that the alignment references of the object fingerprint-like pattern determined by said alignment-reference determination section and the alignment references of the registered fingerprint-like pattern obtained by said registration-data obtaining section coincide with each other; and
a verification section for verifying the group of object minutiae with the group of registered minutiae based on the alignment by said alignment section;
said alignment-reference determination section including
a pattern-center determination section for determining a pattern center of the object fingerprint-like pattern as one of the alignment references of the object fingerprint-like pattern,
the alignment references of the registered fingerprint-like pattern including a pattern center of the registered fingerprint-like pattern;
said pattern-center determination section including
an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments, and
a pattern-center determination section for determining the pattern center based on one or more intersecting points at which the two or more auxiliary lines generated by said auxiliary-line generation section intersect with each other;
said auxiliary-line generation section including
a first-auxiliary-point setting section for setting two arbitrary points on an arbitrary one of pattern curves which form the fingerprint-like pattern as two first auxiliary points,
a start-point calculation section for calculating a middle point of the two first auxiliary points set by said first-auxiliary-point setting section as a start point,
an auxiliary-line-segment generation section for generating an auxiliary-line segment interconnecting the two first auxiliary points set by said first-auxiliary-point setting section, a perpendicular-bisector generation section for generating a perpendicular bisector to the auxiliary-line segment generated by said auxiliary-line-segment generation section, a perpendicular-bisector-intersecting-point calculation section for calculating that one of intersecting points of the perpendicular bisector generated by said perpendicular-bisector generation section and the pattern curves of the fingerprint-like pattern which is present on a particular side with respect to the start point and positioned nearest to the start point, a node calculation section for calculating a point on the perpendicular bisector spaced by a predetermined distance toward the particular side from the intersecting point calculated by said perpendicular-bisector-intersecting-point calculation section as a node, a straight-line generation section for generating a straight line which passes the node calculated by said node calculation section and intersects orthogonally with the perpendicular bisector, a second-auxiliary-point calculation section for calculating those two of intersecting points of the straight line generated by said straight-line generation section and the pattern curves of the fingerprint-like pattern which are on the opposite sides of the node and are positioned nearest to the node as second auxiliary points, an end-point calculation section for calculating a middle point of the two second auxiliary points calculated by said second-auxiliary-point calculation section as an end point, a first-line-segment generation section for generating a first line segment interconnecting the start point calculated by said start-point calculation section and the node calculated by said node calculation section, and a second-line-segment generation section for generating a second line segment interconnecting the node calculated by said node calculation section and the end point calculated by said end-point calculation section;

wherein said first-auxiliary-point setting section is operable to set the two second auxiliary points as new first auxiliary points so that said start-point calculation section, said auxiliary-line-segment generation section, said perpendicular-bisector generation section, said perpendicular-bisector-intersecting-point calculation section, said node calculation section, said straight-line generation section, said second-auxiliary-point calculation section, said end-point calculation section, said first-line-segment generation section and said second-line-segment generation section repeatedly generate new first and second line segments, thereby generating the auxiliary line as a number of alternately successive first and second line segments.

60. A pattern verification apparatus as claimed in claim 59, wherein said pattern inputting section is operable to input the registered fingerprint-like pattern, said alignment-reference determination section is operable to determine the alignment references of the registered fingerprint-like pattern inputted by said pattern inputting section, said minutia extraction section is operable to extract the group of registered minutiae from the registered fingerprint-like pattern inputted by said pattern inputting section, and said registration-data obtaining section is operable to obtain both the alignment references of the registered fingerprint-like pattern determined by said alignment-reference determination section and the group of registered minutiae extracted by said minutia extraction section as the registration data regarding the registered fingerprint-like pattern.

61. A pattern verification apparatus as claimed in claim 59, further comprising:

an adjustment-shift calculation section for calculating an adjustment shift of the group of object minutiae or/and the group of registered minutiae based on a result of the verification by said verification section so that the alignment of the group of object minutiae and the group of registered minutiae is improved; and an alignment-result adjustment section for shifting the group of object minutiae or/and the group of registered minutiae by the adjustment shift calculated by said adjustment-shift calculation section so as to adjusting a result of the alignment by said alignment section;

said verification section being operable to output a result of the verification between the group of object minutiae and the group of registered minutiae based on the adjustment of the alignment result by said alignment-result adjustment section.

62. A pattern verification apparatus as claimed in claim 61, wherein the adjustment shift is at least one of a rotation angle by which at least one of the group of object minutiae and the group of registered minutiae are to be rotated around a predetermined point with respect to the other of the two groups of minutiae and a shift by which at least one of the group of object minutiae and the group of registered minutiae are to be parallelly shifted with respect to the other of the two groups of minutiae.

63. A pattern verification apparatus for verifying a group of object minutiae for verification extracted from an object fingerprint-like pattern for verification with a group of registered minutiae extracted in advance from a registered fingerprint-like pattern, each of the object fingerprint-like pattern and the registered fingerprint-like pattern being formed with the number of pattern curves, said apparatus comprising:

a pattern inputting section for inputting the object fingerprint-like pattern;

an alignment-reference determination section for determining one or more alignment references of the object fingerprint-like pattern inputted by said pattern inputting section;

a minutia extraction section for extracting the group of object minutiae from the object fingerprint-like pattern inputted by said pattern inputting section;

a registration-data obtaining section for obtaining registration data regarding the registered fingerprint-like pattern, said registration data including the group of registered minutiae and one or more alignment references of the registered fingerprint-like pattern;

an alignment section for aligning the object fingerprint-like pattern or the group of object minutiae and the group of registered minutiae so that the alignment references of the object fingerprint-like pattern determined by said alignment-reference determination section and the alignment references of the registered fingerprint-like pattern obtained by said registration-data obtaining section coincide with each other; and a verification section for verifying the group of object minutiae with the group of registered minutiae based on the alignment by said alignment section;

said alignment-reference determination section including a pattern-center determination section for determining a pattern center of the object fingerprint-like pattern as one of the alignment references of the object fingerprint-like pattern, the alignment references of the registered fingerprint-like pattern including a pattern center of the registered fingerprint-like pattern;

said pattern-center determination section including an auxiliary-line generation section for generating a number of successive line segments from an outer circumference side of the pattern curves of the fingerprint-like pattern toward an inner circumference side of the pattern curves in such a manner that each of the line segments intersects each a respective one of the pattern curves perpendicularly or substantially perpendicularly two or more auxiliary lines, thereby generating two or more auxiliary lines each of which consists of the successive line segments, and a pattern-center determination section for determining the pattern center based on one or more intersecting points at which the two or more auxiliary lines generated by said auxiliary-line generation section intersect with each other;

said auxiliary-line generation section including a start-point setting section for setting an arbitrary point on an arbitrary one of the pattern curves of the fingerprint-like pattern as a start point, an auxiliary-point calculation section for calculating two points positioned on the pattern curve on which the start point set by said start-point setting section is present and spaced by a predetermined distance from the start point to the opposite sides along the pattern curve as auxiliary points, an auxiliary-line-segment generation section for generating an auxiliary-line segment interconnecting the two auxiliary points calculated by said auxiliary-point calculation section, a straight-line generation section for generating a straight line which passes the start point set by said start-point setting section and intersects orthogonally with the auxiliary-line segment generated by said auxiliary-line-segment generation section, an end-point calculation section for calculating that one of intersecting points of the straight line generated by said straight-line generation section and the pattern curves of the fingerprint-like pattern which is positioned on a particular side with respect to the start point and nearest to the start point as an end point, and a line-segment generation section for generating a line segment interconnecting the start point set by said start-point setting section and the end point calculated by said end-point calculation section;

wherein said start-point setting section is operable to set the end point as a new start point so that said auxiliary-point calculation section, said auxiliary-line-segment generation section, said straight-line generation section, said end-point calculation section and said line-segment generation section repeatedly generate a new line segment, thereby generating the auxiliary line as a number of successive line segments.

64. A pattern verification apparatus as claimed in claim 63, wherein said pattern inputting section is operable to input the registered fingerprint-like pattern, said alignment-reference determination section is operable to determine the alignment references of the registered fingerprint-like pattern inputted by said pattern inputting section, said minutia extraction section is operable to extract the group of registered minutiae from the registered fingerprint-like pattern inputted by said pattern inputting section, and said registration-data obtaining section is operable to obtain both the alignment references of the registered fingerprint-like pattern determined by said alignment-reference determination section and the group of registered minutiae extracted by said minutia extraction section as the registration data regarding the registered fingerprint-like pattern.

65. A pattern verification apparatus as claimed in claim 63, further comprising:

an adjustment-shift calculation section for calculating an adjustment shift of the group of object minutiae or/and the group of registered minutiae based on a result of the verification by said verification section so that the alignment of the group of object minutiae and the group of registered minutiae is improved; and an alignment-result adjustment section for shifting the group of object minutiae or/and the group of registered minutiae by the adjustment shift calculated by said adjustment-shift calculation section so as to adjusting a result of the alignment by said alignment section;

said verification section being operable to output a result of the verification between the group of object minutiae and the group of registered minutiae based on the adjustment of the alignment result by said alignment-result adjustment section.

66. A pattern verification apparatus as claimed in claim 63, wherein the adjustment shift is at least one of a rotation angle by which at least one of the group of object minutiae and the group of registered minutiae are to be rotated around a predetermined point with respect to the other of the two groups of minutiae and a shift by which at least one of the group of object minutiae and the group of registered minutiae are to be parallelly shifted with respect to the other of the two groups of minutiae.

* * * * *

UNITED STATES PATENT AND TRADEMARK OFFICE
CERTIFICATE OF CORRECTION

PATENT NO. : 7,260,246 B2
APPLICATION NO. : 09/816232
DATED : August 21, 2007
INVENTOR(S) : Yusaku Fujii Page 1 of 1

It is certified that error appears in the above-identified patent and that said Letters Patent is hereby corrected as shown below:

Col. 65, line 31, delete "en" and insert --on--, therefor.

Col. 80, line 5, delete "minutae" and insert --minutiae--, therefor.

Signed and Sealed this

Eleventh Day of March, 2008

JON W. DUDAS
*Director of the United States Patent and Trademark Office*